(12) United States Patent
Puryer Coker et al.

(10) Patent No.: US 12,310,382 B2
(45) Date of Patent: May 27, 2025

(54) DAIRY PRODUCT AND PROCESS

(71) Applicant: Fonterra Co-Operative Group Limited, Auckland (NZ)

(72) Inventors: Christina June Puryer Coker, Auckland (NZ); David Campbell Wemyss Reid, Auckland (NZ); Jeremy Paul Hill, Auckland (NZ); Andrew Keith Legg, Auckland (NZ); Stephen Thomas Dybing, Auckland (NZ); Leena Kishor, Auckland (NZ); Samuel James Harper, Auckland (NZ)

(73) Assignee: Fonterra Co-Operative Group Limited, Auckland (NZ)

( * ) Notice: Subject to any disclaimer, the term of this patent is extended or adjusted under 35 U.S.C. 154(b) by 0 days.

(21) Appl. No.: 18/280,571

(22) PCT Filed: Mar. 11, 2022

(86) PCT No.: PCT/IB2022/052184
§ 371 (c)(1),
(2) Date: Sep. 6, 2023

(87) PCT Pub. No.: WO2022/190045
PCT Pub. Date: Sep. 15, 2022

(65) Prior Publication Data
US 2024/0148011 A1    May 9, 2024

(30) Foreign Application Priority Data
Mar. 11, 2021    (AU) .................................. 2021900710

(51) Int. Cl.
| A23C 19/09 | (2006.01) |
| A23C 19/082 | (2006.01) |
| A23C 19/093 | (2006.01) |

(52) U.S. Cl.
CPC ........ *A23C 19/0917* (2013.01); *A23C 19/082* (2013.01); *A23C 19/0925* (2013.01); *A23C 19/093* (2013.01)

(58) Field of Classification Search
CPC .............. A23C 19/0917; A23C 19/082; A23C 19/0925; A23C 19/093
USPC ....................................................... 426/582
See application file for complete search history.

(56) References Cited

U.S. PATENT DOCUMENTS

| 5,068,118 A | 11/1991 | Strandholm |
| 5,169,666 A | 12/1992 | Woychik |
| 5,807,601 A | 9/1998 | Carpenter et al. |
| 10,531,673 B2 | 1/2020 | Atapattu et al. |
| 10,785,990 B2 | 9/2020 | Galal et al. |
| 2006/0062885 A1* | 3/2006 | Jacobson ............... A23D 7/003 426/582 |
| 2011/0097472 A1 | 4/2011 | Coker et al. |
| 2011/0311704 A1 | 12/2011 | Barey et al. |
| 2019/0000103 A1 | 1/2019 | Diego et al. |
| 2019/0059408 A1† | 2/2019 | Bouron |
| 2019/0216106 A1† | 7/2019 | Geistlinger |
| 2020/0359643 A1 | 11/2020 | McPherson et al. |
| 2021/0037849 A1 | 2/2021 | Pandya et al. |
| 2023/0189833 A1* | 6/2023 | Barbarini ............... A23C 20/02 426/629 |

FOREIGN PATENT DOCUMENTS

| CN | 111280263 A | 6/2020 |
| JP | 2001-069911 | 3/2001 |
| JP | 2001-069911 A | 3/2001 |
| NZ | 552352 | 7/2009 |
| WO | WO 1994/006306 A1 | 3/1994 |
| WO | 2007100264 † | 9/2007 |
| WO | WO 2007/100264 A1 | 9/2007 |
| WO | WO 2008/054232 A1 | 5/2008 |
| WO | WO 2009/108074 A1 | 9/2009 |
| WO | WO 2020/223700 A1 | 11/2020 |
| WO | WO 2022/072718 A1 | 4/2022 |
| WO | WO 2023/023195 A1 | 2/2023 |

OTHER PUBLICATIONS

Bachmann, H. P. (2001) "Cheese analogues: a review", Int. Dairy J. 11:505-515.
Brown and Ernstrom. (1988) "Milk clotting enzymes and cheese chemistry Part I: Milk clotting enzymes", Fundamentals of dairy chemistry, 3rd ed.
Davies and Law. (1980) J. Dairy Res. 47:83-90.
De Kruif et al., "Rheology of casinate fractions in relation to their water holding capacity" (2015) Food Hydrocolloids 51, 503-511.
Farrell, J. M. et al., (2004) "Nomenclature of the proteins of cow's milk—6th revision", Dairy Sci. 87:1641-1674.
International Preliminary Report on Patentability issue in application No. PCT/IB2022/052184 on Sep. 12, 2023.
International-type Search report for provisional patent application issued in Australian provisional application No. 2021900710 on Jul. 27, 2021.

(Continued)

*Primary Examiner* — Brent T O'Hern

(74) *Attorney, Agent, or Firm* — KNOBBE, MARTENS, OLSON & BEAR, LLP

(57) ABSTRACT

The invention relates to cheese and cheese-like products comprising about 0.2 to about 6% by weight $\alpha_s$-casein, β-casein, or a combination thereof, at least about 5% by weight of one or more hydrocolloids comprising one or more starches, and wherein the cheese or cheese-like product has one or more characteristics of a dairy product, such as flavour, taste, aroma, body, appearance, texture, firmness, handling, density, structure, coagulation, binding, leavening, aeration, foaming, emulsification, elasticity, viscoelasticity, melt, creaminess and mouthfeel.

15 Claims, No Drawings

Specification includes a Sequence Listing.

(56) References Cited

OTHER PUBLICATIONS

Park et al., (1984) "Comparison of four procedures of cheese meltability evaluation". J. Food Sci. 49:1158-1162, & 1170.

Sanchez et al., "Frequencies of milk protein variants and haplotypes estimated from genotypes of more than 1 million bulls and cows of 12 French cattle breeds" (2020) J. Dairy Sci. 103:9124-9141, https://doi.org/10.3168/jds.2020-18492.

Schmidt (1982) "Association of caseins and casein micelle structure" Dairy Chemistry. Col. 1. P. F. Fox, et.c Appl. Sci. Pub., Ltd., Essex, England.

Sebastiani et al., "Frequencies Evaluation of—Casein Gene Polymorphisms in Dairy Cows Reared in Central Italy" (2020) Animals, 10, 252; doi:10.3390/ani10020252.

Swaisgood, H. E. 2003. Chemistry of the caseins, Chapt. 2 in Advanced Dairy Chemistry, vol. 1. Proteins, 3rd ed. Ed. P. F. Fox and P.L.H. McSweeney. Sluwer Academic Plenum Publishers. New York.

Third Party Observation filed in application No. PCT/IB2022/052184 on Jul. 10, 2023.

International Search Report issued in application No. PCT/IB2022/052184 on May 23, 2022.

Bhat, M.Y et al., "Casein Proteins: Structural and Functional Aspects", Milk Proteins—From Structure to Biological Properties and Health Aspects [retrieved from the internet on Jul. 15, 2021] https://www.intechopen.com/books/milk-proteins-from-structure-to-biological-properties-and-health-aspects/casein-proteins-structural-and-functional-aspects Published Sep. 7, 2016.

Ingredients network.com, "SureProtein™ Milk Protein Concentrate (MPC 85)" [retrieved from the internet on Jul. 15, 2021] https://www.ingredientsnetwork.com/sureprotein-milk-protein-concentrate-mpc-85-prod134012.html Published Jul. 30, 2016 as per Wayback Machine.

Ingredion, "Colflo®67", [retrieved from the internet on Jul. 15, 2021] https://www.ingredion.com/content/dam/ingredion/technical-documents/emea/COLFLO_67_EN.pdf Published on Apr. 28, 2020.

Ahmad et al.—Quality of Processed Cheddar Cheese as a Function of Emulsifying Salt replaced by k-Carrageenan, J. of Food Properties, vol. 19, pp. 1874-1883 (2016).†

\* cited by examiner
† cited by third party

DAIRY PRODUCT AND PROCESS

FIELD OF THE INVENTION

The present invention relates to the use of protein compositions comprising one or more caseins as functional ingredients in the preparation of foods. The invention particularly relates to cheeses, cheese-like products and methods for manufacture of such products, particularly processed cheeses and processed cheese-like products.

BACKGROUND TO THE INVENTION

Cheese manufacture fractionates milk components to concentrate the milk proteins, fat, and mineral salts into highly nutritional and flavourful foods that are easier to preserve, store, and transport. Traditional cheese manufacturing methods coagulate milk proteins, primarily the caseins, to produce a curd.

Processed cheese manufacture proceeds by grinding, blending, and heating or cooking blends of natural cheeses with other permitted ingredients including salt (or sodium chloride), emulsifying salts, colours, flavours, etc. Emulsifying salts are essential in processed cheese manufacture to modify the caseins into forms that emulsify the milk fat to eliminate free fat. Cheese-like products are generally made by blending a casein source, such as rennet casein, with milk and/or vegetable fats, starches, emulsifying salts, salt, flavours, and other allowed ingredients. Manufacture of such products usually proceeds in a processed cheese cooker and employs heat and shear treatments that gelatinize any starch(s) present. Therefore, the cooking step in cheese-like product manufacture resembles processed cheese manufacture. (Bachmann, H. P. 2001. Cheese analogues: a review. Int. Dairy J. 11:505-515.)

Despite excellent nutritional value and desirable flavours, some consumers reject cheeses, processed cheeses, and many cheese-like products because these products are made with dairy, or animal proteins. Such potential customers may identify themselves as "vegetarians" or "vegans". Such customers may welcome the availability of cheeses, processed cheeses, and/or cheese-like products produced with minimal amounts of milk proteins, or with recombinant milk proteins that are not derived from milk.

It is an object of the present invention to provide improved or alternative cheeses and/or cheese-like products, or to at least provide the public with a useful choice.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

SUMMARY OF THE INVENTION

Accordingly, the invention broadly comprises a cheese or cheese-like product comprising $\alpha_s$-casein and/or $\beta$-casein, one or more hydrocolloids comprising at least one of a starch or a gum, optionally one or more non-dairy proteins and optionally one or more emulsifying salts, and having one or more characteristics of a dairy product, such as flavour, taste, aroma, body, appearance, texture, firmness, handling, density, structure, coagulation, binding, leavening, aeration, foaming, emulsification, elasticity, viscoelasticity, melt, creaminess and mouthfeel.

In one aspect the invention relates to a cheese or cheese-like product comprising
a) about 0.2 to about 35% by weight $\alpha_s$-casein, the $\alpha_s$-casein comprising $\alpha_{s1}$-casein and/or $\alpha_{s2}$-casein,
b) one or more hydrocolloids, comprising at least one of a starch or a gum,
c) optionally one or more non-dairy proteins,
d) optionally one or more emulsifying salts,
e) optionally about 15 to about 65% by weight moisture, and
f) optionally about 0.05 to about 35% by weight lipid.

In one aspect the invention relates to a cheese or cheese-like product comprising
a) about 0.2 to about 6% by weight $\alpha_s$-casein, the $\alpha_s$-casein comprising $\alpha_{s1}$-casein and/or $\alpha_{s2}$-casein,
b) one or more hydrocolloids, comprising at least one of a starch or a gum,
c) optionally one or more non-dairy proteins,
d) optionally one or more emulsifying salts,
e) optionally about 15 to about 65% by weight moisture, and
f) optionally about 0.05 to about 35% by weight lipid.

In one aspect the invention relates to a cheese or cheese-like product comprising
a) about 0.2 to about 35% by weight $\alpha_s$-casein, the $\alpha_s$-casein comprising $\alpha_{s1}$-casein and/or $\alpha_{s2}$-casein,
b) one or more hydrocolloids, comprising at least one of a starch or a gum,
c) optionally one or more non-dairy proteins,
d) optionally one or more emulsifying salts,
e) about 15 to about 65% by weight moisture, and
f) about 0.05 to about 35% by weight lipid.

In one aspect the invention relates to a cheese or cheese-like product comprising
a) about 0.2 to about 6% by weight $\alpha_s$-casein, the $\alpha_s$-casein comprising $\alpha_{s1}$-casein and/or $\alpha_{s2}$-casein,
b) one or more hydrocolloids, comprising at least one of a starch or a gum,
c) optionally one or more non-dairy proteins,
d) optionally one or more emulsifying salts,
e) about 15 to about 65% by weight moisture, and
f) about 0.05 to about 35% by weight lipid.

In a further aspect the invention provides a cheese or cheese-like product comprising
a) about 0.2 to about 6% by weight of $\alpha_s$-casein, $\beta$-casein, or a combination thereof,
b) at least about 5% by weight of one or more hydrocolloids, wherein the one or more hydrocolloids comprises one or more starches, and
c) about 0.2 to about 20% by weight total dairy protein, wherein total casein in the cheese or cheese-like product comprises
i) at least about 55% by weight $\alpha_s$-casein, and/or
ii) at least about 40% by weight $\beta$-casein.

In another aspect the invention provides a cheese or cheese-like product comprising
a) about 0.2 to about 6% by weight of $\alpha_s$-casein,
b) at least about 5% by weight of one or more hydrocolloids, wherein the one or more hydrocolloids comprises one or more starches, and
c) about 0.2 to about 20% by weight total dairy protein, wherein total casein in the cheese or cheese-like product comprises at least about 55% by weight $\alpha_s$-casein.

In a further aspect the invention provides a cheese or cheese-like product comprising
- a) about 0.2 to about 6% by weight of β-casein,
- b) at least about 5% by weight of one or more hydrocolloids, wherein the one or more hydrocolloids comprises one or more starches, and
- c) about 0.2 to about 20% by weight total dairy protein, wherein total casein in the cheese or cheese-like product comprises at least about 40% by weight β-casein.

In one aspect the invention provides a cheese or cheese-like product comprising
- a) about 0.2 to about 6% by weight $\alpha_s$-casein,
- b) at least about 5% by weight of one or more hydrocolloids, comprising at least one starch,
- c) about 0.5 to about 20% by weight total protein; wherein the $\alpha_s$-casein comprises
  - i) at least about 60% of the casein in the cheese or cheese-like product, and/or
  - ii) at least about 55% by weight of the total protein in the cheese or cheese-like product.

In another aspect the invention relates to a method for preparing a cheese or cheese-like product, the method comprising
- a) providing a composition comprising
  - i) $\alpha_s$-casein, the $\alpha_s$-casein comprising $\alpha_{s1}$-casein and/or $\alpha_{s2}$-casein,
  - ii) one or more hydrocolloids, comprising at least one of a starch or a gum,
  - iii) optionally one or more lipids
  - iv) optionally one or more non-dairy proteins,
  - v) optionally one or more emulsifying salts, and
  - vi) optionally one or more additional ingredients,
- b) heating the composition at a temperature and for a time sufficient to produce a heated cheese mass or cheese-like mass, and
- c) cooling the heated cheese mass or cheese-like mass to produce the cheese or cheese-like product, wherein the cheese or cheese-like product comprises
1. about 0.2 to about 35% by weight $\alpha_s$-casein,
2. optionally about 15 to about 65% by weight moisture, and
3. optionally about 0.05 to about 35% by weight lipid.

In another aspect the invention relates to a method for preparing a cheese or cheese-like product, the method comprising
- a) providing a composition comprising
  - i) $\alpha_s$-casein, the $\alpha_s$-casein comprising $\alpha_{s1}$-casein and/or $\alpha_{s2}$-casein,
  - ii) one or more hydrocolloids, comprising at least one of a starch or a gum,
  - iii) optionally one or more lipids
  - iv) optionally one or more non-dairy proteins,
  - v) optionally one or more emulsifying salts, and
  - vi) optionally one or more additional ingredients,
- b) heating the composition at a temperature and for a time sufficient to produce a heated cheese mass or cheese-like mass, and
- c) cooling the heated cheese mass or cheese-like mass to produce the cheese or cheese-like product, wherein the cheese or cheese-like product comprises
1. about 0.2 to about 6% by weight $\alpha_s$-casein,
2. optionally about 15 to about 65% by weight moisture, and
3. optionally about 0.05 to about 35% by weight lipid.

In another aspect the invention relates to a method for preparing a cheese or cheese-like product, the method comprising
- a) providing a composition comprising
  - i) $\alpha_s$-casein, the $\alpha_s$-casein comprising $\alpha_{s1}$-casein and/or $\alpha_{s2}$-casein,
  - ii) one or more hydrocolloids, comprising at least one of a starch or a gum,
  - iii) one or more lipids
  - iv) optionally one or more non-dairy proteins,
  - v) optionally one or more emulsifying salts, and
  - vi) optionally one or more additional ingredients,
- b) heating the composition at a temperature and for a time sufficient to produce a heated cheese mass or cheese-like mass, and
- c) cooling the heated cheese mass or cheese-like mass to produce the cheese or cheese-like product, wherein the cheese or cheese-like product comprises
1. about 0.2 to about 35% by weight $\alpha_s$-casein,
2. about 15 to about 65% by weight moisture, and
3. about 0.05 to about 35% by weight lipid.

In another aspect the invention relates to a method for preparing a cheese or cheese-like product, the method comprising
- a) providing a composition comprising
  - i) $\alpha_s$-casein, the $\alpha_s$-casein comprising $\alpha_{s1}$-casein and/or $\alpha_{s2}$-casein,
  - ii) one or more hydrocolloids, comprising at least one of a starch or a gum,
  - iii) one or more lipids,
  - iv) optionally one or more non-dairy proteins,
  - v) optionally one or more emulsifying salts, and
  - vi) optionally one or more additional ingredients,
- b) heating the composition at a temperature and for a time sufficient to produce a heated cheese mass or cheese-like mass, and
- c) cooling the heated cheese mass or cheese-like mass to produce the cheese or cheese-like product, wherein the cheese or cheese-like product comprises
1. about 0.2 to about 6% by weight $\alpha_s$-casein,
2. about 15 to about 65% by weight moisture, and
3. about 0.05 to about 35% by weight lipid.

In one aspect the invention provides a method for preparing a cheese or cheese-like product, the method comprising
- a) providing a cheese composition comprising
  - i) $\alpha_s$-casein, β-casein, or a combination thereof,
  - ii) one or more hydrocolloids, comprising one or more starches,
  - iii) optionally one or more lipids, and
  - iv) optionally one or more additional ingredients,
- b) heating the composition at a temperature and for a time sufficient to produce a heated cheese mass or cheese-like mass, and
- c) cooling the heated cheese mass or cheese-like mass to produce the cheese or cheese-like product, wherein the cheese or cheese-like product comprises
- i) about 0.2 to about 6% by weight of $\alpha_s$-casein, β-casein, or a combination thereof, and
- ii) at least about 5% by weight of one or more hydrocolloids, and
- iii) about 0.2 to about 20% by weight total dairy protein, wherein total casein in the cheese or cheese-like product comprises
1. at least about 55% by weight $\alpha_s$-casein, and/or
2. at least about 40% by weight β-casein.

In another aspect the invention provides a method for preparing a cheese or cheese-like product, the method comprising a) providing a cheese composition comprising
   i) $\alpha_s$-casein,
   ii) one or more hydrocolloids, comprising one or more starches,
   iii) optionally one or more lipids, and
   iv) optionally one or more additional ingredients,
b) heating the composition at a temperature and for a time sufficient to produce a heated cheese mass or cheese-like mass, and
c) cooling the heated cheese mass or cheese-like mass to produce the cheese or cheese-like product,
wherein the cheese or cheese-like product comprises
   i) about 0.2 to about 6% by weight of $\alpha_s$-casein, and
   ii) at least about 5% by weight of one or more hydrocolloids, and
   iii) about 0.2 to about 20% by weight total dairy protein,
wherein total casein in the cheese or cheese-like product comprises at least about 55% by weight $\alpha_s$-casein.

In a further aspect the invention provides a method for preparing a cheese or cheese-like product, the method comprising
a) providing a cheese composition comprising
   i) $\beta$-casein,
   ii) one or more hydrocolloids, comprising one or more starches,
   iii) optionally one or more lipids, and
   iv) optionally one or more additional ingredients,
b) heating the composition at a temperature and for a time sufficient to produce a heated cheese mass or cheese-like mass, and
c) cooling the heated cheese mass or cheese-like mass to produce the cheese or cheese-like product,
wherein the cheese or cheese-like product comprises
   i) about 0.2 to about 6% by weight of $\beta$-casein, and
   ii) at least about 5% by weight of one or more hydrocolloids, and
   iii) about 0.2 to about 20% by weight total dairy protein,
wherein total casein in the cheese or cheese-like product comprises at least about 40% by weight $\beta$-casein.

In yet another aspect the invention provides a method for preparing a cheese or cheese-like product, the method comprising
a) providing a cheese composition comprising
   i) $\alpha_s$-casein,
   ii) one or more hydrocolloids, comprising at least one starch,
   iii) optionally one or more lipids, and
   iv) optionally one or more additional ingredients,
b) heating the composition at a temperature and for a time sufficient to produce a heated cheese mass or cheese-like mass, and
c) cooling the heated cheese mass or cheese-like mass to produce the cheese or cheese-like product,
wherein the cheese or cheese-like product comprises
   i) about 0.2 to about 6% by weight of $\alpha_s$-casein,
   ii) at least about 5% by weight of one or more hydrocolloids, and
   iii) about 0.5 to about 20% by weight total protein, and wherein the $\alpha_s$-casein comprises
      a. at least about 60% of the casein in the cheese or cheese-like product, and/or
      b. at least about 55% by weight of the total protein in the cheese or cheese-like product.

The following embodiments may relate to any of the above aspects.

In various embodiments the cheese or cheese-like product comprises about 0.2% w/w to about 6% w/w $\alpha_s$-casein, $\beta$-casein, or a combination thereof. In various embodiments the cheese or cheese-like product comprises at least about 0.2, 0.5, 1, 1.5, 2, 2.5, 3, 3.5, 4, 4.5, 5, 5.5, or at least about 6% by weight of $\alpha_s$-casein, $\beta$-casein, or a combination thereof, and suitable ranges may be selected from between any two of these values, for example, from about 0.2 to about 5.5, about 0.2 to about 5, about 0.2 to about 4.5, about 0.2 to about 4, about 0.2 to about 3.5, about 0.2 to about 3, about 0.2 to about 2.5, about 0.2 to about 2, about 0.2 to about 1.5, about 0.2 to about 1, about 0.5 to about 5.5, about 0.5 to about 5, about 0.5 to about 4.5, about 0.5 to about 4, about 0.5 to about 3.5, about 0.5 to about 3, about 0.5 to about 2.5, about 0.5 to about 2, about 0.5 to about 1.5, about 0.5 to about 1, about 1 to about 5.5, about 1 to about 5, about 1 to about 4.5, about 1 to about 4, about 1 to about 3.5, about 1 to about 3, about 1 to about 2.5, about 1 to about 2, about 1 to about 1.5, about 1.5 to about 5.5, about 1.5 to about 5, about 1.5 to about 4.5, about 1.5 to about 4, about 1.5 to about 3.5, about 1.5 to about 3, about 1.5 to about 2.5, or about 1.5 to about 2% by weight of $\alpha_s$-casein, $\beta$-casein, or a combination thereof.

In various embodiments the $\alpha_s$-casein comprises $\alpha_{s1}$-casein, $\alpha_{s2}$-casein, or a combination thereof. In various embodiments the cheese or cheese-like product comprises about 0.2% w/w to about 6% w/w $\alpha_s$-casein. For example, the cheese or cheese-like product comprises about 0.5% w/w to about 5.5% w/w $\alpha_s$-casein, from about 0.5% w/w to about 5.0% w/w $\alpha_s$-casein, from about 0.5% w/w to about 4.5% w/w $\alpha_s$-casein, from about 0.5% w/w to about 4% w/w $\alpha_s$-casein, from about 0.5% w/w to about 3.5% w/w $\alpha_s$-casein, from about 0.5% w/w to about 3% w/w $\alpha_s$-casein, from about 0.5% w/w to about 2.5% w/w $\alpha_s$-casein, or from about 0.5% w/w to about 2% w/w $\alpha_s$-casein.

In other representative embodiments, the cheese or cheese-like product comprises from about 1% w/w to about 5.5% w/w $\alpha_s$-casein, from about 1% w/w to about 5.0% w/w $\alpha_s$-casein, from about 1% w/w to about 4.5% w/w $\alpha_s$-casein, from about 1% w/w to about 4% w/w $\alpha_s$-casein, from about 1% w/w to about 3.5% w/w $\alpha_s$-casein, from about 1% w/w to about 3% w/w $\alpha_s$-casein, from about 1% w/w to about 2.5% w/w $\alpha_s$-casein, or from about 1% w/w to about 2% w/w $\alpha_s$-casein.

In other representative embodiments, the cheese or cheese-like product comprises from about 1.5% w/w to about 5.5% w/w $\alpha_s$-casein, from about 1.5% w/w to about 5.0% w/w $\alpha_s$-casein, from about 1.5% w/w to about 4.5% w/w $\alpha_s$-casein, from about 1.5% w/w to about 4% w/w $\alpha_s$-casein, from about 1.5% w/w to about 3.5% w/w $\alpha_s$-casein, from about 1.5% w/w to about 3% w/w $\alpha_s$-casein, from about 1.5% w/w to about 2.5% w/w $\alpha_s$-casein, or about 2% w/w $\alpha_s$-casein.

In various embodiments the cheese or cheese-like product comprises about 0.2% w/w to about 6% w/w $\beta$-casein. For example, the cheese or cheese-like product comprises about 0.5% w/w to about 5.5% w/w $\beta$-casein, from about 0.5% w/w to about 5.0% w/w $\beta$-casein, from about 0.5% w/w to about 4.5% w/w $\beta$-casein, from about 0.5% w/w to about 4% w/w $\beta$-casein, from about 0.5% w/w to about 3.5% w/w $\beta$-casein, from about 0.5% w/w to about 3% w/w $\beta$-casein, from about 0.5% w/w to about 2.5% w/w $\beta$-casein, or from about 0.5% w/w to about 2% w/w $\beta$-casein.

In other representative embodiments, the cheese or cheese-like product comprises from about 1% w/w to about 5.5% w/w $\beta$-casein, from about 1% w/w to about 5.0% w/w $\beta$-casein, from about 1% w/w to about 4.5% w/w $\beta$-casein, from about 1% w/w to about 4% w/w β-casein, from about 1% w/w to about 3.5% w/w β-casein, from about 1% w/w to about 3% w/w β-casein, from about 1% w/w to about 2.5% w/w β-casein, or from about 1% w/w to about 2% w/w β-casein.

In other representative embodiments, the cheese or cheese-like product comprises from about 1.5% w/w to about 5.5% w/w β-casein, from about 1.5% w/w to about 5.0% w/w β-casein, from about 1.5% w/w to about 4.5% w/w β-casein, from about 1.5% w/w to about 4% w/w β-casein, from about 1.5% w/w to about 3.5% w/w β-casein, from about 1.5% w/w to about 3% w/w β-casein, from about 1.5% w/w to about 2.5% w/w β-casein, or about 2% w/w β-casein.

$\alpha_s$-Caseins generally account for about 45-50% of the casein in cow's milk. In some embodiments, the $\alpha_s$-casein comprises at least 10%, 20%, 30%, 40%, 50%, 60%, 70%, 80%, 90% or 95% of the casein in the cheese or cheese-like product. Preferably, the $\alpha_s$-casein comprises at least 50%, preferably at least 65%, of the casein in the cheese or cheese-like product. In some embodiments, the casein in the cheese or cheese-like product may comprise only $\alpha_s$-casein, in particular only $\alpha_{s2}$-casein. In various embodiments the $\alpha_s$-casein comprises or consists of $\alpha_{s1}$-casein, $\alpha_{s2}$-casein, or a combination thereof. The $\alpha_s$-casein the cheese or cheese-like product may comprise from 0% to 100% $\alpha_{s1}$-casein, $\alpha_{s2}$-casein, or a combination thereof.

In various embodiments the cheese or cheese-like product comprises at least about 0, 0.01, 0.1, 0.2, 0.3, 0.4, 0.5, 0.6, 0.7, 0.8, 0.9, 1, 2, 3, 4, 5, 6, 7, 8, 9, 10, 15, 16, 17, 18, 19, 20, 25 or at least about 30% by weight total casein. Total casein in the cheese or cheese-like product is the sum of all casein protein contributed by all casein-containing ingredients in the cheese or cheese-like product. Various ranges can be selected from between these values, for example, the cheese or cheese-like product may comprise from about 0 to about 30, about 0.01 to about 30, about 0.1 to about 30, about 0.2 to about 30, about 0.5 to about 30, about 1 to about 30, about 0 to about 25, 0.01 to about 25, about 0.1 to about 25, about 0.2 to about 25, about 0.5 to about 25, about 0 to about 20, 0.01 to about 20, about 0.1 to about 20, about 0.2 to about 20, about 0.5 to about 20, about 0.2 to about 19, about 0.5 to about 19, about 1 to about 19, about 0.2 to about 18, about 0.5 to about 18, about 1 to about 18, about 0.2 to about 17, about 0.5 to about 17, about 1 to about 17, about 0.1 to about 17, about 0.2 to about 16, about 0.5 to about 16, about 1 to about 16, about 0.2 to about 15, about 0.5 to about 15, about 1 to about 25, about 2 to about 25, about 3 to about 25, about 5 to about 25, about 1 to about 20, about 2 to about 20, about 3 to about 20, about 5 to about 20, about 0 to about 10, about 0.01 to about 10, about 0.2 to about 10, about 0.5 to about 10, about 1 to about 10% by weight total casein.

In various embodiments total casein in the cheese or cheese-like product comprises at least about 55%, 56%, 57%, 58%, 59%, 60%, 61%, 62%, 63%, 64%, 65%, 70%, 75%, 80%, 85%, 90%, 95% or 100% by weight $\alpha_s$-casein, and suitable ranges may be selected from between any two of these values. For example, in various embodiments, total casein in the cheese or cheese-like product comprises about 55% to about 100%, about 56% to about 100%, about 57% to about 100%, about 58% to about 100%, about 59% to about 100%, about 60% to about 100%, about 61% to about 100%, about 62% to about 100%, about 63% to about 100%, about 64% to about 100%, about 65% to about 100%, about 70% to about 100%, about 75% to about 100%, about 80% to about 100%, about 85% to about 100%, about 90% to about 100%, about 95% to about 100%, about 55% to about 95%, about 56% to about 95%, about 57% to about 95%, about 58% to about 95%, about 59% to about 95%, about 60% to about 95%, about 61% to about 95%, about 62% to about 95%, about 63% to about 95%, about 64% to about 95%, about 65% to about 95%, about 70% to about 95%, about 75% to about 95%, about 80% to about 95%, about 85% to about 95%, about 90% to about 95%, about 55% to about 90%, about 56% to about 90%, about 57% to about 90%, about 58% to about 90%, about 59% to about 90%, about 60% to about 90%, about 61% to about 90%, about 62% to about 90%, about 63% to about 90%, about 64% to about 90%, about 65% to about 90%, about 70% to about 90%, about 75% to about 90%, about 80% to about 90%, about 85% to about 90%, about 55% to about 85%, about 56% to about 85%, about 57% to about 85%, about 58% to about 85%, about 59% to about 85%, about 60% to about 85%, about 61% to about 85%, about 62% to about 85%, about 63% to about 85%, about 64% to about 85%, about 65% to about 85%, about 70% to about 85%, about 75% to about 85%, about 80% to about 85%, about 55% to about 80%, about 56% to about 80%, about 57% to about 80%, about 58% to about 80%, about 59% to about 80%, about 60% to about 80%, about 61% to about 80%, about 62% to about 80%, about 63% to about 80%, about 64% to about 80%, about 65% to about 80%, about 70% to about 80%, about 75% to about 80%, about 55% to about 75%, about 56% to about 75%, about 57% to about 75%, about 58% to about 75%, about 59% to about 75%, about 60% to about 75%, about 61% to about 75%, about 62% to about 75%, about 63% to about 75%, about 64% to about 75%, about 65% to about 75%, about 70% to about 75%, about 55% to about 70%, about 56% to about 70%, about 57% to about 70%, about 58% to about 70%, about 59% to about 70%, about 60% to about 70%, about 61% to about 70%, about 62% to about 70%, about 63% to about 70%, about 64% to about 70%, about 65% to about 70%, about 55% to about 65%, about 56% to about 65%, about 57% to about 65%, about 58% to about 65%, about 59% to about 65%, about 60% to about 65%, about 61% to about 65%, about 62% to about 65%, about 63% to about 65%, about 64% to about 65%, about 55% to about 60%, about 56% to about 60%, about 57% to about 60%, about 58% to about 60%, or about 59% to about 60% by weight $\alpha_s$-casein.

In various embodiments, the $\alpha_s$-casein in the cheese or cheese-like product comprises from about 50% to about 100% $\alpha_{s1}$-casein. In some cases, the cheese or cheese-like product comprises $\alpha_s$-casein protein and total casein comprises 100% $\alpha_{s1}$-casein. In some cases, the cheese or cheese-like product comprises $\alpha_s$-casein protein and total casein comprises at least 50% $\alpha_{s1}$-casein. The $\alpha_s$-casein protein in the cheese or cheese-like product may comprise from 50% $\alpha_{s1}$-casein to 70% $\alpha_{s1}$-casein, 50% $\alpha_{s1}$-casein to 90% $\alpha_{s1}$-casein, 50% $\alpha_{s1}$-casein to 100% $\alpha_{s1}$-casein, 70% $\alpha_{s1}$-casein to 90% $\alpha_{s1}$-casein, 70% $\alpha_{s1}$-casein to 100% $\alpha_{s1}$-casein, or 90% $\alpha_{s1}$-casein to 100% $\alpha_{s1}$-casein. The $\alpha_s$-casein protein in the cheese or cheese-like product may comprise about 50% $\alpha_{s1}$-casein, 70% $\alpha_{s1}$-casein, 90% $\alpha_{s1}$-casein, or 100% $\alpha_{s1}$-casein.

In various embodiments, the $\alpha_s$-casein in the cheese or cheese-like product comprises from about 50% to 100% $\alpha_{s2}$-casein. In some cases, the cheese or cheese-like product comprises $\alpha_s$-casein protein and total $\alpha_s$-casein comprises 100% $\alpha_{s2}$-casein. In some cases, the cheese or cheese-like product comprises $\alpha_s$-casein protein and total casein comprises at least 50% $\alpha_{s2}$-casein. The $\alpha_s$-casein protein in the cheese or cheese-like product may comprise from 50% $\alpha_{s2}$-casein to 70% $\alpha_{s2}$-casein, 50% $\alpha_{s2}$-casein to 90% $\alpha_{s2}$- casein, 50% $\alpha_{s2}$-casein to 100% $\alpha_{s2}$-casein, 70% $\alpha_{s2}$-casein to 90% $\alpha_{s2}$-casein, 70% $\alpha_{s2}$-casein to 100% $\alpha_{s2}$-casein, or 90% $\alpha_{s2}$-casein to 100% $\alpha_{s2}$-casein. The $\alpha_s$-casein protein in the cheese or cheese-like product may comprise about 50% $\alpha_{s2}$-casein, 70% $\alpha_{s2}$-casein, 90% $\alpha_{s2}$-casein, or 100% $\alpha_{s2}$-casein.

In various embodiments, the $\alpha_s$-casein in the cheese or cheese-like product is a mixture of $\alpha_{s1}$-casein, $\alpha_{s2}$-casein. The casein in the cheese or cheese-like product may comprise, for example from 1% $\alpha_{s2}$-casein to 99% $\alpha_{s2}$-casein and from 99% $\alpha_{s1}$-casein to 1% $\alpha_{s1}$-casein, respectively. In some embodiments, the $\alpha_s$-casein in the cheese or cheese-like product is a mixture of $\alpha_{s1}$-casein and $\alpha_{s2}$-casein in ratio of 10:90, 20:80, 30:70, 40:60, 50:50, 60:40, 70:30, 80:20, or 90:10.

In various embodiments total casein in the cheese or cheese-like product comprises at least about 30%, 32%, 34%, 35%, 36%, 38%, 40%, 41%, 42%, 43%, 44%, 45%, 46%, 47%, 48%, 49%, 50%, 52%, 54%, 55%, 60%, 65%, 70%, 75%, 80%, 85%, 90%, 95% or 100% by weight β-casein, and suitable ranges may be selected from between any two of these values. For example, in various embodiments, total casein in the cheese or cheese-like product comprises about 30% to about 100%, 32% to about 100%, about 34% to about 100%, about 35% to about 100%, about 36% to about 100%, about 38% to about 100%, about 40% to about 100%, about 41% to about 100%, about 42% to about 100%, about 43% to about 100%, about 44% to about 100%, about 45% to about 100%, about 46% to about 100%, about 47% to about 100%, about 48% to about 100%, about 49% to about 100%, about 50% to about 100%, about 55% to about 100%, about 60% to about 100%, about 30% to about 95%, about 40% to about 95%, about 45% to about 95%, about 50% to about 95%, about 52% to about 95%, about 55% to about 95%, about 60% to about 95%, about 65% to about 95%, about 70% to about 95%, about 75% to about 95%, about 80% to about 95%, about 85% to about 95%, about 90% to about 95%, about 30% to about 90%, about 35% to about 90%, about 40% to about 90%, about 42% to about 90%, about 44% to about 90%, about 45% to about 90%, about 47% to about 90%, about 50% to about 90%, about 55% to about 90%, about 60% to about 90%, about 65% to about 90%, about 70% to about 90%, about 75% to about 90%, about 80% to about 90%, about 85% to about 90%, about 30% to about 85%, about 35% to about 85%, about 40% to about 85%, about 42% to about 85%, about 44% to about 85%, about 45% to about 85%, about 46% to about 85%, about 47% to about 85%, about 48% to about 85%, about 50% to about 85%, about 55% to about 85%, about 60% to about 85%, about 65% to about 85%, about 70% to about 85%, about 75% to about 85%, about 80% to about 85%, about 30% to about 80%, about 35% to about 80%, about 40% to about 80%, about 42% to about 80%, about 44% to about 80%, about 45% to about 80%, about 50% to about 80%, about 55% to about 80%, about 60% to about 80%, about 62% to about 80%, about 65% to about 80%, about 70% to about 80%, about 75% to about 80%, about 30% to about 75%, about 35% to about 75%, about 40% to about 75%, about 42% to about 75%, about 44% to about 75%, about 45% to about 75%, about 48% to about 75%, about 50% to about 75%, about 55% to about 75%, about 60% to about 75%, about 65% to about 75%, about 70% to about 75%, about 30% to about 70%, about 35% to about 70%, about 40% to about 70%, about 42% to about 70%, about 44% to about 70%, about 45% to about 70%, about 47% to about 70%, about 50% to about 70%, about 55% to about 70%, about 60% to about 70%, about 65% to about 70%, about 30% to about 65%, about 35% to about 65%, about 40% to about 65%, about 42% to about 65%, about 44% to about 65%, about 45% to about 65%, about 47% to about 65%, about 50% to about 65%, about 55% to about 65%, about 60% to about 65%, about 35% to about 60%, about 40% to about 60%, about 45% to about 60%, about 50% to about 60%, or about 55% to about 60% by weight β-casein.

In various embodiments, $\alpha_s$-casein comprises at least about 1, 2, 5, 10, 15, 20, 25, 30, 35, 40, 45, 50, 55, 60, 65, 70, 75, 80, 85, 90, 95, 99 or at least about 100% by weight of the total protein in the cheese or cheese-like product, and various ranges may be selected from between any of these values. The total protein in the composition is the sum of all protein contributed by all protein-containing ingredients in the composition. For example, $\alpha_s$-casein may comprise from about 30% to about 90%, about 50% to about 95%, or about 30% to about 100% w/w of total protein content of the cheese or cheese-like product. In some embodiments, $\alpha_s$-casein may comprise at least 30% w/w of total protein content of the cheese or cheese-like product. In some embodiments, $\alpha_s$-casein may comprise at least 50% w/w of total protein content of the cheese or cheese-like product. In some embodiments, $\alpha_s$-casein may comprise at least 90% or at least 95% w/w of total protein content of the cheese or cheese-like product. In some embodiments, $\alpha_s$-casein may comprise from 30% to 35%, 30% to 40%, 30% to 50%, 30% to 55%, 30% to 70%, 30% to 75%, 30% to 80%, 30% to 85%, 30% to 90%, 35% to 40%, 35% to 50%, 35% to 55%, 35% to 70%, 35% to 75%, 35% to 80%, 35% to 85%, 35% to 90%, 40% to 50%, 40% to 55%, 40% to 70%, 40% to 75%, 40% to 80%, 40% to 85%, 40% to 90%, 50% to 55%, 50% to 70%, 50% to 75%, 50% to 80%, 50% to 85%, 50% to 90%, 55% to 70%, 55% to 75%, 55% to 80%, 55% to 85%, 55% to 90%, 70% to 75%, 70% to 80%, 70% to 85%, 70% to 90%, 75% to 80%, 75% to 85%, 75% to 90%, 80% to 85%, 80% to 90%, 85% to 90% or 90 to 95% w/w of total protein content of the cheese or cheese-like product. The $\alpha_s$-casein may comprise 30%, 35%, 40%, 50%, 55%, 70%, 75%, 80%, 85%, 90%, 95% or 99% w/w of total protein content of the cheese or cheese-like product. The $\alpha_s$-casein may comprise at least 30%, 35%, 40%, 50%, 55%, 70%, 75%, 80% 85% or 90% w/w of total protein content of the cheese or cheese-like product. The $\alpha_s$-casein may comprise at most 40%, 50%, 55%, 70%, 75%, 80%, 85%, 90% or 95% w/w of total protein content of the cheese or cheese-like product.

In various embodiments, β-casein comprises at least about 1, 2, 5, 10, 15, 20, 25, 30, 35, 40, 45, 50, 55, 60, 65, 70, 75, 80, 85, 90, 95, 99 or at least about 100% by weight of the total protein in the cheese or cheese-like product, and various ranges may be selected from between any of these values. For example, β-casein may comprise from about 30% to about 90%, about 50% to about 95%, or about 30% to about 100% w/w of total protein content of the cheese or cheese-like product. In some embodiments, β-casein may comprise at least 30% w/w of total protein content of the cheese or cheese-like product. In some embodiments, β-casein may comprise at least 50% w/w of total protein content of the cheese or cheese-like product. In some embodiments, β-casein may comprise at least 90% or at least 95% w/w of total protein content of the cheese or cheese-like product. In some embodiments, β-casein may comprise from 30% to 35%, 30% to 40%, 30% to 50%, 30% to 55%, 30% to 70%, 30% to 75%, 30% to 80%, 30% to 85%, 30% to 90%, 35% to 40%, 35% to 50%, 35% to 55%, 35% to 70%, 35% to 75%, 35% to 80%, 35% to 85%, 35% to 90%, 40% to 50%, 40% to 55%, 40% to 70%, 40% to 75%, 40% to 80%, 40% to 85%, 40% to 90%, 50% to 55%, 50% to 70%, 50% to 75%, 50% to 80%, 50% to 85%, 50% to 90%, 55% to 70%, 55% to 75%, 55% to 80%, 55% to 85%, 55% to 90%, 70% to 75%, 70% to 80%, 70% to 85%, 70% to 90%, 75% to 80%, 75% to 85%, 75% to 90%, 80% to 85%, 80% to 90%, 85% to 90% or 90 to 95% w/w of total protein content of the cheese or cheese-like product. The β-casein may comprise 30%, 35%, 40%, 50%, 55%, 70%, 75%, 80%, 85%, 90%, 95% or 99% w/w of total protein content of the cheese or cheese-like product. The β-casein may comprise at least 30%, 35%, 40%, 50%, 55%, 70%, 75%, 80% 85% or 90% w/w of total protein content of the cheese or cheese-like product. The β-casein may comprise at most 40%, 50%, 55%, 70%, 75%, 80%, 85%, 90% or 95% w/w of total protein content of the cheese or cheese-like product.

In various embodiments the cheese or cheese-like product may comprise less than about 5, 4, 3, 2 or about 1% by weight non-dairy animal protein. In various embodiments the cheese or cheese-like product may comprise from about 0 to about 5%, about 0 to about 4%, about 0 to about 3%, about 0 to about 2% or about 0 to about 1% by weight non-dairy animal protein. In some embodiments the cheese or cheese-like product may comprise no non-dairy animal protein.

In various embodiments the $\alpha_s$-casein and/or β-casein is provided by a protein ingredient comprising an $\alpha_s$-casein enriched fraction, a β-casein enriched fraction, recombinant $\alpha_{s1}$-casein, recombinant $\alpha_{s2}$-casein, recombinant β-casein, or any combination of any two or more thereof.

In various embodiments the $\alpha_s$-casein comprises, or is provided by a protein ingredient comprising, an $\alpha_s$-casein enriched fraction, recombinant $\alpha_{s1}$-casein, recombinant $\alpha_{s2}$-casein, or any combination of any two or more thereof.

In various embodiments, the cheese or cheese-like product further comprises κ-casein, β-casein, or any combination thereof. In various embodiments, the cheese or cheese-like product further comprises κ-casein, β-casein, p-κ-casein, or any combination of any two or more thereof.

When the $\alpha_s$-casein is provided by a dairy starting material, the dairy starting material preferably comprises an $\alpha_s$-casein enriched fraction. In various embodiments at least about 15, 20, 25, 30, 35, 40, 45, 50, 55, 60, 65, 70, 75, 80, 90, 95, 99 or 100% of the total casein in the starting material is provided by an $\alpha_s$-casein enriched casein, and various ranges may be selected from between any two of these values. Preferably, total casein in the starting material comprises at least 20%, preferably at least 40% and most preferably at least 60% $\alpha_s$-casein enriched casein.

In various embodiments the β-casein comprises, or is provided by a protein ingredient comprising, a β-casein enriched fraction, recombinant β-casein, or a combination thereof.

In various embodiments, the cheese or cheese-like product further comprises κ-casein, $\alpha_s$-casein, or any combination thereof. In various embodiments, the cheese or cheese-like product further comprises κ-casein, $\alpha_s$-casein, p-κ-casein, or any combination of any two or more thereof.

When the β-casein is provided by a dairy starting material, the dairy starting material preferably comprises a β-casein enriched fraction. In various embodiments at least about 15, 20, 25, 30, 35, 40, 45, 50, 55, 60, 65, 70, 75, 80, 90, 95, 99 or 100% of the total casein in the starting material is provided by a β-casein enriched fraction, and various ranges may be selected from between any two of these values. Preferably, total casein in the starting material comprises at least 20%, preferably at least 40% and most preferably at least 60% β-casein enriched casein.

In various embodiments the protein ingredient may comprise an $\alpha_s$-casein enriched fraction, and:
a) total casein in the protein ingredient comprises at least about 50%, 55%, 60%, 65%, 70%, 80%, 85%, 90% or 95% by weight $\alpha_s$-casein, and/or
b) the protein ingredient comprises $\alpha_s$-casein and β-casein in a weight ratio of at least about 50:50, 55:45, 60:40, 65:35, 70:30, 75:25, or at least about 80:20.

In various embodiments the protein ingredient may comprise a β-casein enriched fraction, and:
a) total casein in the β-casein enriched fraction comprises at least about 30%, 35%, 40%, 45%, 50%, 55%, 60%, 65%, 70%, 80%, 85%, 90% or 95% by weight β-casein, and/or
b) the β-casein enriched fraction comprises β-casein and $\alpha_s$-casein in a weight ratio of at least about 50:50, 55:45, 60:40, 65:35, 70:30, 75:25, or at least about 80:20.

The preferred total casein concentration of the cheese or cheese-like product is in the range 1-30% (w/w), more preferably 2-20% (w/w). In various embodiments, the total casein concentration of the cheese or cheese-like product is about 4%, about 5%, about 6%, about 7%, about 8%, about 9%, about 10%, about 11%, about 12%, about 13%, about 14%, about 15%, about 16%, about 17%, about 18% or about 19% w/w. In various embodiments the total casein concentration of the cheese or cheese-like product is from about 1 to about 25, about 1 to about 20, about 1 to about 15, about 1 to about 10, about 1 to about 6, about 2 to about 25, about 2 to about 20, about 2 to about 15, about 2 to about 10, or about 2 to about 6% by weight.

In various embodiments, the cheese or cheese-like product comprises at least about 0, 0.01, 0.1, 0.2, 0.5, 1, 2, 3, 4, 5, 6, 7, 8, 9, 10, 15, 20, 25 or at least about 30% by weight total protein, and various ranges can be selected from between these values, for example, from about 0 to about 30, about 0.01 to about 30, about 0.2 to about 30, about 0.5 to about 30, about 1 to about 30, about 0 to about 25, 0.01 to about 25, about 0.1 to about 25, about 0.2 to about 25, about 0.5 to about 25, about 0 to about 20, 0.01 to about 20, about 0.1 to about 20, about 0.2 to about 20, about 0.5 to about 20, about 0.1 to about 15, about 0.2 to about 15, about 0.5 to about 15, about 1 to about 15, about 1 to about 25, about 2 to about 25, about 3 to about 25, about 5 to about 25, about 1 to about 20, about 2 to about 20, about 3 to about 20, about 5 to about 20, about 0 to about 10, about 0.01 to about 10, about 0.2 to about 10, about 0.5 to about 10, about 1 to about 10%, about 0.2 to about 7%, about 0.5 to about 7%, about 1 to about 7%, about 0.2 to about 5%, about 0.5 to about 5%, about 1 to about 5%, about 0.2 to about 4%, about 0.5 to about 4%, about 1 to about 4%, about 0.2 to about 3%, about 0.5 to about 3%, or about 1 to about 3%, by weight total protein.

In various embodiments the cheese or cheese-like product comprises at least about 0, 0.01, 0.1, 0.2, 0.3, 0.4, 0.5, 0.6, 0.7, 0.8, 0.9, 1, 2, 3, 4, 5, 6, 7, 8, 9, 10, 15, 16, 17, 18, 19, 20, 25 or at least about 30% by weight total dairy protein. Total dairy protein in the cheese or cheese-like product is the sum of all dairy protein contributed by all dairy protein-containing ingredients in the cheese or cheese-like product. Various ranges can be selected from between these values, for example, the cheese or cheese-like product may comprise from about 0 to about 30, about 0.01 to about 30, about 0.1 to about 30, about 0.2 to about 30, about 0.5 to about 30, about 1 to about 30, about 0 to about 25, 0.01 to about 25, about 0.1 to about 25, about 0.2 to about 25, about 0.5 to about 25, about 0 to about 20, 0.01 to about 20, about 0.1 to about 20, about 0.2 to about 20, about 0.5 to about 20, about 0.2 to about 19, about 0.5 to about 19, about 1 to about 19, about 0.2 to about 18, about 0.5 to about 18, about 1 to about 18, about 0.2 to about 17, about 0.5 to about 17, about 1 to about 17, about 0.1 to about 17, about 0.2 to about 16, about 0.5 to about 16, about 1 to about 16, about 0.2 to about 15, about 0.5 to about 15, about 1 to about 25, about 2 to about 25, about 3 to about 25, about 5 to about 25, about 1 to about 20, about 2 to about 20, about 3 to about 20, about 5 to about 20, about 0 to about 10, about 0.01 to about 10, about 0.2 to about 10, about 0.5 to about 10, about 1 to about 10% by weight total dairy protein.

In various embodiments the cheese or cheese-like product comprises one or more non-dairy proteins. In various embodiments the one or more non-dairy proteins may comprise or consist of one or more plant proteins or hydrolysed plant proteins.

In various embodiments the cheese or cheese-like product comprises at least about 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.5, 2, 2.5, 3, 3.5, 4, 4.5 or at least about 5% w/w hydrocolloids. Suitable ranges may be selected from any of these values, for example from about 0.1 to about 5, 0.1 to about 4, 0.1 to about 3, 0.1 to about 2, about 0.1 to about 1, about 0.1 to about 0.75, about 0.1 to about 0.5, about 0.1 to about 0.3, about 0.15 to about 1, about 0.15 to about 0.75, about 0.15 to about 0.5, about 0.15 to about 0.3, about 2 to about 1, about 0.2 to about 0.75, about 0.2 to about 0.5, about 0.2 to about 0.3, about 0.3 to about 1, about 0.3 to about 0.75, about 0.3 to about 0.5, about 0.5 to about 1, about 0.5 to about 0.75, or about 0.75 to about 1% w/w of the cheese or cheese-like product. In various embodiments the cheese or cheese-like product comprises one type of hydrocolloid. However, cheese or cheese-like products comprising more than one type of hydrocolloids are also contemplated herein.

In various embodiments the cheese or cheese-like product comprises at least about 5, 6, 7, 8, 9, 10, 11, 12, 13, 14, 15, 16, 17, 18, 19, 20, 22, 24, 25, 26, 28, 30, 35 or 40% by weight hydrocolloids. Suitable ranges may be selected from any of these values, for example, the cheese or cheese-like product may comprise from about 5 to about 40%, about 6 to about 40%, about 7 to about 40%, about 8 to about 40%, about 9 to about 40%, about 10 to about 40%, about 11 to about 40%, about 12 to about 40%, about 13 to about 40%, about 14 to about 40%, about 15 to about 40%, about 16 to about 40%, about 17 to about 40%, about 18 to about 40%, about 19 to about 40%, about 20 to about 40%, about 22 to about 40%, about 24 to about 40%, about 25 to about 40%, about 26 to about 40%, about 28 to about 40%, about 30 to about 40%, about 35 to about 40%, about 5 to about 35%, about 6 to about 35%, about 7 to about 35%, about 8 to about 35%, about 9 to about 35%, about 10 to about 35%, about 11 to about 35%, about 12 to about 35%, about 13 to about 35%, about 14 to about 35%, about 15 to about 35%, about 16 to about 35%, about 17 to about 35%, about 18 to about 35%, about 19 to about 35%, about 20 to about 35%, about 22 to about 35%, about 24 to about 35%, about 25 to about 35%, about 26 to about 35%, about 28 to about 35%, about 30 to about 35%, about 5 to about 30%, about 6 to about 30%, about 7 to about 30%, about 8 to about 30%, about 9 to about 30%, about 10 to about 30%, about 11 to about 30%, about 12 to about 30%, about 13 to about 30%, about 14 to about 30%, about 15 to about 30%, about 16 to about 30%, about 17 to about 30%, about 18 to about 30%, about 19 to about 30%, about 20 to about 30%, about 22 to about 30%, about 24 to about 30%, about 25 to about 30%, about 26 to about 30%, about 28 to about 30%, about 5 to about 28%, about 6 to about 28%, about 7 to about 28%, about 8 to about 28%, about 9 to about 28%, about 10 to about 28%, about 11 to about 28%, about 12 to about 28%, about 13 to about 28%, about 14 to about 28%, about 15 to about 28%, about 16 to about 28%, about 17 to about 28%, about 18 to about 28%, about 19 to about 28%, about 20 to about 28%, about 22 to about 28%, about 24 to about 28%, about 25 to about 28%, about 26 to about 28%, about 5 to about 26%, about 6 to about 26%, about 7 to about 26%, about 8 to about 26%, about 9 to about 26%, about 10 to about 26%, about 11 to about 26%, about 12 to about 26%, about 13 to about 26%, about 14 to about 26%, about 15 to about 26%, about 16 to about 26%, about 17 to about 26%, about 18 to about 26%, about 19 to about 26%, about 20 to about 26%, about 22 to about 26%, about 24 to about 26%, about 25 to about 26%, about 5 to about 24%, about 6 to about 24%, about 7 to about 24%, about 8 to about 24%, about 9 to about 24%, about 10 to about 24%, about 11 to about 24%, about 12 to about 24%, about 13 to about 24%, about 14 to about 24%, about 15 to about 24%, about 16 to about 24%, about 17 to about 24%, about 18 to about 24%, about 19 to about 24%, about 20 to about 24%, about 22 to about 24%, about 5 to about 22%, about 6 to about 22%, about 7 to about 22%, about 8 to about 22%, about 9 to about 22%, about 10 to about 22%, about 11 to about 22%, about 12 to about 22%, about 13 to about 22%, about 14 to about 22%, about 15 to about 22%, about 16 to about 22%, about 17 to about 22%, about 18 to about 22%, about 19 to about 22%, about 20 to about 22%, about 5 to about 20%, about 6 to about 20%, about 7 to about 20%, about 8 to about 20%, about 9 to about 20%, about 10 to about 20%, about 11 to about 20%, about 12 to about 20%, about 13 to about 20%, about 14 to about 20%, about 15 to about 20%, about 16 to about 20%, about 17 to about 20%, about 18 to about 20%, about 19 to about 20%, about 5 to about 18%, about 6 to about 18%, about 7 to about 18%, about 8 to about 18%, about 9 to about 18%, about 10 to about 18%, about 11 to about 18%, about 12 to about 18%, about 13 to about 18%, about 14 to about 18%, about 15 to about 18%, about 16 to about 18%, about 17 to about 18%, about 5 to about 16%, about 6 to about 16%, about 7 to about 16%, about 8 to about 16%, about 9 to about 16%, about 10 to about 16%, about 11 to about 16%, about 12 to about 16%, about 13 to about 16%, about 14 to about 16%, about 15 to about 16%, about 5 to about 14%, about 6 to about 14%, about 7 to about 14%, about 8 to about 14%, about 9 to about 14%, about 10 to about 14%, about 11 to about 14%, about 12 to about 14%, about 13 to about 14%, about 5 to about 12%, about 6 to about 12%, about 7 to about 12%, about 8 to about 12%, about 9 to about 12%, about 10 to about 12%, about 11 to about 12%, about 5 to about 10%, about 6 to about 10%, about 7 to about 10%, about 8 to about 10%, about 9 to about 10%, about 5 to about 8%, about 6 to about 8%, about 7 to about 8%, or about 5 to about 6% by weight hydrocolloids.

In various embodiments, the cheese or cheese-like product comprises one or more starches. In various embodiments, the cheese or cheese-like product comprises two or more starches. In various embodiments, the cheese or cheese-like product comprises three or more starches. In various embodiments the starch comprises potato starch, maize starch, rice starch, tapioca (cassava) starch, wheat starch, pea starch, sweet potato starch, banana starch, barley starch, oat starch, sago starch, amaranth starch, arrowroot starch, canna starch, sorghum starch, or any combination of any two or more thereof. In various embodiments the starch comprises potato starch, maize starch, rice starch, tapioca (cassava) starch, wheat starch, pea starch, sweet potato starch, banana starch, barley starch, oat starch, sago starch, amaranth starch, arrowroot starch, canna starch, sorghum starch, chia seed starch, fava bean starch, jackfruit starch, bamboo starch, chickpea starch, cassava starch, carrot starch, or any combination of any two or more thereof. Particularly preferred starches include maize, potato, cassava, and rice starch.

In various embodiments the starch comprises a modified starch, for example, a pre-gelatinised starch, a thin-boiling starch, an oxidised starch, or octenyl succinic anhydride (OSA) modified starch.

In one embodiment the starch comprises modified potato starch.

In various embodiments the cheese or cheese-like product comprises at least about 1, 2, 3, 4, 5, 6, 7, 8, 9, 10, 11, 12, 13, 14, 15, 16, 17, 18, 19, 20, 22, 24, 25, 26, 27, or at least about 30% by weight starch. In various embodiments the cheese or cheese-like product comprises from about 4 to about 30%, about 5 to about 30%, about 6 to about 30%, about 7 to about 30%, about 8 to about 30%, about 9 to about 30%, about 10 to about 30%, about 12 to about 30%, about 15 to about 30%, about 18 to about 30%, about 20 to about 30%, about 5 to about 25%, about 6 to about 25%, about 7 to about 25%, about 8 to about 30, 25 about 9 to about 25%, about 10 to about 25%, about 12 to about 25%, about 15 to about 25%, about 18 to about 25%, or about 20 to about 30% by weight starch. In various embodiments the cheese or cheese-like product comprises from about 4 to about 10%, about 4 to about 9%, about 4 to about 8%, about 5 to about 7%, about 5 to about 10%, about 5 to about 9%, about 6 to about 8%, about 6 to about 13%, about 6% to about 12%, about 6 to about 10%, about 7 to about 15%, about 7 to about 14%, about 7 to about 12%, about 8 to about 10%, about 8 to about 15%, about 8 to about 12%, about 9 to about 18%, about 9 to about 16%, about 9 to about 14%, about 10 to about 20%, about 10 to about 18%, about 10 to about 16%, about 10 to about 14%, about 12 to about 20%, about 12 to about 18%, about 12 to about 16%, about 13 to about 20%, about 13 to about 19%, about 13 to about 18%, about 13 to about 17%, about 14 to about 16%, about 14 to about 20%, about 14 to about 19%, about 14 to about 18%, about 15 to about 17%, about 15 to about 20%, about 15 to about 19%, about 15 to about 18%, about 20 to about 30%, about 20 to about 28%, about 20 to about 26%, about 20 to about 24%, about 21 to about 23%, about 22 to about 30%, about 22 to about 28%, about 22 to about 26%, about 22 to about 24%, about 24 to about 30%, about 24 to about 28% or about 24 to about 26% w/w starch.

In various embodiments, the cheese or cheese-like product comprises one or more gums. In various embodiments, the cheese or cheese-like product comprises two or more gums. In various embodiments, the cheese or cheese-like product comprises three or more gums. In various embodiments the gum comprises xanthan gum, guar gum, locust bean gum, tragacanth gum, acacia gum, karaya gum, tara gum, gellan gum, konjac gum (konjac mannan), carboxymethylcellulose (CMC), tragacanth, agar, pectin, alginate, carrageenan (κ-carrageenan, ι-carrageenan, λ-carrageenan), Arabic gum, or any combination of any two or more thereof. In various embodiments the gum comprises xanthan gum, guar gum, locust bean gum, tragacanth gum, acacia gum, karaya gum, tara gum, gellan gum, konjac gum (konjac mannan), carboxymethylcellulose (CMC), tragacanth, agar, pectin, alginate, carrageenan (κ-carrageenan, ι-carrageenan, λ-carrageenan), Arabic gum, pectin, alginate, flaxseed gum, guar gum, or any combination of any two or more thereof.

In various embodiments the gum comprises one or more carrageenans (κ-carrageenan, ι-carrageenan, λ-carrageenan), or any combination of any two or more thereof.

In various embodiments the cheese or cheese-like product comprises at least about 0, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or about 2.0% by weight of one or more gums. Suitable ranges may be selected from any of these values, for example from 0 to about 1.9%, 0 to about 1.8%, 0 to about 1.7%, 0 to about 1.6%, 0 to about 1.5%, 0 to about 1.4%, 0 to about 1.3%, 0 to about 1.2%, 0 to about 1.1%, 0 to about 1.0%, 0 to about 0.9%, 0 to about 0.8%, 0 to about 0.7%, 0 to about 0.6%, 0 to about 0.5%, 0 to about 0.4%, 0 to about 0.3%, 0 to about 0.2%, 0 to about 0.1%, about 0.1 to about 1.9%, about 0.1 to about 1.8%, about 0.1 to about 1.7%, about 0.1 to about 1.6%, about 0.1 to about 1.5%, about 0.1 to about 1.4%, about 0.1 to about 1.3%, about 0.1 to about 1.2%, about 0.1 to about 1.1%, about 0.1 to about 1.0%, about 0.1 to about 0.9%, about 0.1 to about 0.8%, about 0.1 to about 0.7%, about 0.1 to about 0.6%, about 0.1 to about 0.5%, about 0.1 to about 0.4%, about 0.1 to about 0.3%, or about 0.1 to about 0.2% by weight of one or more gums. In a preferred embodiment, the cheese or cheese-like product comprises 0 to about 0.8%, more preferably about 0.1 to about 0.24% by weight of one or more gums.

In various embodiments the cheese or cheese-like product may have a pH of about 3 to about 7, preferably about 4 to about 6. The cheese or cheese-like product may have a pH of at least 4. The cheese or cheese-like product may have a pH of at most 6. The cheese or cheese-like product may have a pH of 4 to 4.5, 4 to 5, 4 to 5.1, 4 to 5.2, 4 to 5.5, 4 to 6, 4.5 to 5, 4.5 to 5.1, 4.5 to 5.2, 4.5 to 5.5, 4.5 to 6, 5 to 5.1, 5 to 5.2, 5 to 5.5, 5 to 6, 5.1 to 5.2, 5.1 to 5.5, 5.1 to 6, 5.2 to 5.5, 5.2 to 6, 5.5 to 6, 5.6 to 6, 5.6 to 5.9 or 5.6 to 5.8. The cheese or cheese-like product may have a pH of about 3, about 3.5, about 4, about 4.5, about 5, about 5.1, about 5.2, about 5.5, about 5.6, about 5.7, about 6, about 6.5, or about 7. The cheese or cheese-like product may have a pH of at least 3, 3.5, 4, 4.5, 5, 5.1, 5.2, 5.5, or 5.7. The cheese or cheese-like product may have a pH of at most 4.5, 5, 5.1, 5.2, 5.5, 5.6, 5.7, 6, 6.5, or 7. Preferably, the cheese or cheese-like product has a pH of from about 4.6 to about 5.5, about 4.6 to about 5.6, about 4.6 to about 5.4, from about 4.6 to about 5.2, from about 4.6 to about 5.0, from about 4.7 to about 5.0, or from about 4.7 to about 4.9.

In various embodiments the cheese or cheese-like product may comprise
  a) one or more emulsifying salts,
  b) about 15 to about 65% by weight moisture,
  c) about 0.05 to about 35% by weight lipid, or
  d) any combination of any two or more of a)-c).

In various embodiments the cheese or cheese-like product comprises one or more vegetable or animal lipids.

In some embodiments the cheese or cheese-like product comprises at least about 0.01, 0.1, 0.25, 0.5, 0.75, 1, 2, 2.5, 3, 4, 5, 6, 7, 7.5, 8, 9, 10, 11, 12, 12.5, 13, 14, 15, 16, 17, 17.5, 18, 19, 20, 21, 22, 22.5, 23, 24, 25, 26, 27, 27.5, 28, 29, 30, 31, 32, 33, 34 or at least about 35% by weight lipid, and suitable ranges may be selected from between any of these values, for example, from about 0.01 to about 35%, about 0.5 to about 35%, about 1 to about 35%, about 5 to about 35%, 0.01 to about 30%, about 0.5 to about 30%, about 1 to about 30%, about 5 to about 30%, 0.01 to about 25%, about 0.5 to about 25%, about 1 to about 25%, or about 5 to about 25% by weight lipid.

In various embodiments the cheese is a processed cheese or the cheese-like product is a processed cheese-like product, such as a processed cheese spread or "slice-on-slice" processed cheese. In other embodiments the cheese or cheese-like product is a pasta filata cheese or pasta filata cheese-like product, such as mozzarella or a mozzarella-like product, pizza cheese or a pizza cheese analogue, or a spreadable cheese.

In one embodiment, the cheese or cheese-like product has a Schreiber melt test value ≥3, but more preferably a melt test value between about 6 to about 7.

In various embodiments the method may comprise
a) providing an aqueous composition comprising $\alpha_s$-casein, $\beta$-casein, or a combination thereof
b) adding the one or more hydrocolloids, lipid and, optionally, the one or more additional ingredients, to the aqueous composition to produce a cheese composition,
c) heating the cheese composition at a temperature and for a time sufficient to produce a heated cheese mass or cheese-like mass, and
d) cooling the heated cheese mass or cheese-like mass to produce the cheese or cheese-like product.

In various embodiments the method may comprise
a) providing an aqueous composition comprising $\alpha_s$-casein, $\beta$-casein, or a combination thereof,
b) adding lipid to the aqueous composition and mixing to form an emulsion,
c) adding the emulsion to a second aqueous composition comprising the one or more hydrocolloids and, optionally, the one or more additional ingredients, to produce a cheese,
d) heating the cheese composition at a temperature and for a time sufficient to produce a heated cheese mass or cheese-like mass, and
e) cooling the heated cheese mass or cheese-like mass to produce the cheese or cheese-like product.

In various embodiments the method may comprise dispersing the $\alpha_s$-casein and/or $\beta$-casein in water at a temperature of from about 20 to about 50° C. to substantially completely dissolve the $\alpha_s$-casein and/or $\beta$-casein to produce the aqueous composition.

In various embodiments the method may comprise dispersing $\alpha_s$-casein in water at a temperature of from about 40 to about 55° C. to substantially completely dissolve the $\alpha_s$-casein to produce the aqueous composition.

In various embodiments the method may comprise dispersing $\beta$-casein in water at a temperature of from about 15 to about 30° C., or at ambient temperature, to substantially completely dissolve the $\beta$-casein to produce the aqueous composition.

In various embodiments the method may comprise providing an aqueous composition comprising a protein ingredient comprising an $\alpha_s$-casein enriched fraction, a $\beta$-casein enriched fraction, recombinant $\alpha_{s1}$-casein, recombinant $\alpha_{s2}$-casein, recombinant $\beta$-casein, or any combination of any two or more thereof.

In various embodiments the method comprises heating at a temperature of at least about 70, 75, 80, 85, 90, 95, 100, 105, 110, 115 or 120° C., and suitable ranges may be selected from any two or these values, for example, from about 70 to about 120° C., 70 to about 110° C., about 70 to about 100° C., about 70 to about 95° C., about 70 to about 90° C., about 70 to about 85° C., about 70 to about 80° C., about 75 to about 120° C., 75 to about 110° C., about 75 to about 100° C., about 75 to about 95° C., about 75 to about 90° C., about 75 to about 85° C., or about 75 to about 80° C.

In various embodiments the method may comprise subjecting the composition to mixing under agitation during heating.

In various embodiments the method comprises adjusting the pH during, after, or both during and after heating to a pH of from about 4 to about 6.

In various embodiments the method comprises heating for a period of at least about 1, 2, 3, 4, 5, 6, 7, 8, 9, 10, 12, 14, 15, 20, 35, 30, 35, 40, 45, 50 or 60 minutes, and suitable ranges may be selected from between any two or these values, for example, from about 1 to about 60 minutes, about 1 to about 45 minutes, about 1 to about 30 minutes, about 1 to about 15 minutes, about 3 to about 60 minutes, about 3 to about 45 minutes, about 3 to about 30 minutes, from about 3 to about 15 minutes, about 3 to about 12 minutes or about 3 to about 10 minutes.

The term "variant" as used herein may include proteins comprising an amino acid sequence having at least about 70%, 75%, 80%, 85%, 90%, 95%, 96%, 97%, 98% or at least about 99% sequence identity to the sequence of any native (wild type) $\alpha_{s1}$-casein, $\alpha_{s2}$-casein, or $\beta$-casein from any species, but particularly any native bovine, ovine, caprine, buffalo, equine, camel, or human $\alpha_{s1}$-casein, $\alpha_{s2}$-casein, or $\beta$-casein sequence, including any sequence of SEQ ID Nos: 1-40. In some embodiments the amino acid sequence of such variants may comprise truncations or elongations at the N-terminus and/or the C-terminus with respect to the native sequence, for example, elongations or truncations of from about 1 to about 10 residues. In some embodiments, variants may contain from 1 to 10 amino acid insertions, deletions, and/or substitutions (collectively) with respect to the native sequence. In some embodiments the variants comprise one or more post-translational modifications that differ to a native $\alpha_{s1}$-casein, $\alpha_{s2}$-casein, or $\beta$-casein protein, including glycosylation and or phosphorylation at one or more residues.

The term "comprising" as used in this specification and claims means "consisting at least in part of". When interpreting statements in this specification and claims which include the term "comprising", other features besides the features prefaced by this term in each statement can also be present. Related terms such as "comprise" and "comprised" are to be interpreted in similar manner.

As used herein the term "and/or" means "and" or "or", or both.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

To those skilled in the art to which the invention relates, many changes in construction and differing embodiments and applications of the invention will suggest themselves without departing from the scope of the invention as defined in the appended claims. The disclosures and the descriptions herein are purely illustrative and are not intended to be in any sense limiting.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

DETAILED DESCRIPTION OF THE INVENTION

The present invention relates to the use of protein compositions comprising one or more caseins as functional ingredients in the preparation of cheeses, cheese-like products and methods for manufacture of such products, particularly processed cheeses and processed cheese-like products. Preferably, the cheese and cheese-like products of the invention are produced with minimal amounts of milk proteins, or with recombinant milk proteins that are not derived from milk, to produce cheese-like products that are acceptable to those who wish to lower their dairy intake, or who identify as vegetarians and vegans. The invention particularly makes use of $\alpha_s$-casein, $\beta$-casein, and/or blends of $\alpha_s$-caseins, $\beta$-caseins, and, optionally, specific $\alpha_s$-casein and/or $\beta$-casein fractions that, when combined with starches and/or gums, produce processed cheese-like structure, flavour and mouthfeel, using surprisingly low amounts of protein.

The present invention utilises casein proteins that interact with other proteins, simple carbohydrates, complex carbohydrates, fats, oils, gums, emulsifying agents, salt (sodium and/or potassium chloride), ions (both cations and anions), starches and/or other GRAS ingredients to produce functional ingredients and foods.

Caseins and Casein Compositions

The present invention utilises casein proteins or blends of casein proteins, in particular, $\alpha_s$-casein and/or $\beta$-casein, to produce cheese, such as processed cheese, and cheese-like products.

Following casein synthesis in mammary gland tissue, posttranslational phosphorylation occurs at selected serine residues in the primary structures of each of these caseins. The caseins in milk then form ionic bonds with calcium phosphate in combination with hydrophobic interactions between other caseins to create aggregates identified as casein micelles. (Farrell, J. M., Jr., R. Jimenez-Flores, G. T. Bleck, E. M. Brown, J. E. Butler, L. K. Creamer, C. L. Hicks, C. M. Hollar, K. F. Ng-Kwai-Hang, and H. E. Swaisgood. 2004. Nomenclature of the proteins of cow's milk, 6th revision. Dairy Sci. 87:1641-1674).

Casein proteins for use herein may include $\alpha_{s1}$-casein, $\alpha_{s2}$-casein, $\beta$-casein, $\gamma$-casein, $\kappa$-casein, p-$\kappa$-casein, and/or variants thereof. In various embodiments, the casein may be $\alpha_s$-casein or $\beta$-casein.

Cow's milk typically comprises about 48% $\alpha_s$-casein as a proportion of total casein, and about 36% $\beta$-casein as a proportion of total casein, as shown in Table 1 below (Davies and Law. 1980. J. Dairy Res. 47:83-90).

An average ratio of casein proteins in cow's milk is about 3:0.8:3:1 of $\alpha_{s1}$-casein:$\alpha_{s2}$-casein:$\beta$-casein:$\kappa$-casein (Brown and Ernstrom. 1988. Milk clotting enzymes and cheese chemistry Part I: Milk clotting enzymes in Fundamentals of dairy chemistry $3^{rd}$ ed.; Schmidt, 1982. Association of caseins and casein micelle structure. In Dairy Chemistry. Col. 1. P. F. Fox, et. c Appl. Sci. Pub., Ltd., Essex, England).

TABLE 1

| Theoretical milk casein content | |
|---|---|
| Casein type | Casein (% by weight) |
| $\alpha_{s1}$-casein | 38 |
| $\alpha_{s2}$-casein | 10 |
| $\beta$-casein | 36 |
| $\kappa$-casein | 13 |
| $\gamma$-casein | 3 |
| Total | 100.00 |

In various embodiments the $\alpha_s$-casein may comprise $\alpha_{s1}$-casein, $\alpha_{s2}$-casein, or a combination thereof.

In various embodiments, the $\alpha_s$-casein may be encoded by a protein sequence selected from SEQ ID NO. 1-26 or a variant thereof with at least 70%, 75%, 80%, 85%, 90%, 95%, 96%, 98%, or 99% sequence identity.

In various embodiments the $\alpha_s$-casein comprises, or is provided by an ingredient that comprises or is enriched in, $\alpha_{s1}$-casein and/or $\alpha_{s2}$-casein, for example, $\alpha_s$-casein-enriched fractions.

The term "$\alpha_s$-casein-enriched fraction" as used herein refers to compositions fractionated from milk having a ratio of $\alpha_s$-casein to $\beta$-casein that is greater than that of skim milk (1:0.94, as measured by polyacrylamide gel electrophoresis followed by staining with Coomassie Blue and densitometry. Other suitable analytical methods are also known to the skilled addressee). Preferably, the ratio is higher than 1.3:1, more preferably higher than 1.6:1, more preferably higher than 2:1, most preferably higher than 3:1. $\alpha_s$-Casein-enriched fractions are enriched in at least one of $\alpha_{s1}$ and $\alpha_{s2}$-casein, generally both, relative to casein in the casein source from which it was prepared (generally cows' milk).

In some embodiments, the $\alpha_s$-casein-enriched fractions comprise at least about 55% by weight $\alpha_s$-casein relative to total casein, preferably about 60%, more preferably about 65%, more preferably about 70%, more preferably about 75%, most preferably about 80% by weight $\alpha_s$-casein relative to total casein. In a preferred embodiment, the $\alpha_s$-casein-enriched fractions comprise at least about 55% by weight $\alpha_s$-casein relative to total casein.

In some embodiments, the $\alpha_s$-casein-enriched fractions may be prepared as described in published PCT application WO2007/100264 or WO 2009/108074 (hereby incorporated by reference in their entirety). Other methods that may be used will be apparent to those skilled in the art. For example, cold microfiltration may be used for at least part of the enrichment or depletion, for example, as described in U.S. Pat. No. 5,169,666.

In various embodiments, $\alpha_s$-casein enriched fractions are prepared by fractionating lactic casein as described herein in the examples. Briefly, pasteurised skim milk is incubated with dairy starter cultures under acid conditions to produce lactic casein.

The lactic casein is dispersed in water to produce a slurry comprising solubilised casein. The temperature is adjusted to less than about 7° C. and the pH of the slurry adjusted to about pH 10. Calcium chloride (dihydrate) is added to the slurry to produce a coagulum. The curd is obtained, washed and dried to provide an $\alpha_s$-casein enriched fraction.

In various embodiments the $\alpha_s$-casein comprises one or more recombinant $\alpha_s$-casein proteins. The use of recombinant proteins provides for the manufacture of cheeses or cheese-like products that comprise no ingredients derived from animals.

In various embodiments the recombinant $\alpha_s$-casein protein comprises a variant of an $\alpha_s$-casein protein.

In various embodiments the recombinant $\alpha_s$-casein comprises a native $\alpha_{s1}$-casein protein, a native $\alpha_{s2}$-casein protein, a variant of $\alpha_{s1}$-casein or $\alpha_{s2}$-casein, or a combination thereof. In various embodiments the recombinant $\alpha_s$-casein protein has an amino acid sequence of any one of SEQ ID Nos: 1-26. In various embodiments the variant of $\alpha_{s1}$-casein or $\alpha_{s2}$-casein has an amino acid sequence having at least about 70%, 75%, 80%, 85%, 90%, 95%, 96%, 98%, or 99% sequence identity to a sequence of SEQ ID Nos: 1-26.

In various embodiments, the β-casein may be encoded by a protein sequence selected from SEQ ID NO. 27-40 or a variant thereof with at least 70%, 75%, 80%, 85%, 90%, 95%, 96%, 98%, or 99% sequence identity.

In various embodiments the β-casein comprises, or is provided by an ingredient that comprises or is enriched in, β-casein, for example, β-casein-enriched fractions.

The term "β-casein-enriched fraction" as used herein refers to compositions fractionated from milk having a ratio of β-casein to $\alpha_s$-casein that is greater than that of skim milk (0.94:1, as measured by polyacrylamide gel electrophoresis followed by staining with Coomassie Blue and densitometry. Other suitable analytical methods are also known to the skilled addressee). Preferably, the ratio is higher than 1:1, more preferably higher than 1.2:1, more preferably higher than 1.4:1, more preferably higher than 1.5:1, more preferably higher than 1.6:1, most preferably higher than 1.7:1. β-casein enriched fractions are enriched in β-casein relative to casein in the casein source from which it was prepared (generally cows' milk).

In some embodiments, the β-casein-enriched fractions comprise at least about 40% by weight β-casein relative to total casein, preferably at least about 45%, more preferably at least about 50%, more preferably at least about 52%, most preferably at least about 54%, by weight β-casein relative to total casein. In a preferred embodiment, the β-casein-enriched fractions comprise at least about 40% by weight β-casein relative to total casein.

In some embodiments, the β-casein-enriched fractions may be prepared as described in published PCT application WO2007/100264 or WO2009/108074 (hereby incorporated by reference in their entirety). Other methods that may be used will be apparent to those skilled in the art. For example, cold microfiltration may be used for at least part of the enrichment or depletion, for example, as described in U.S. Pat. No. 5,169,666.

In various embodiments, β-casein enriched fractions are prepared by fractionating lactic casein as described herein in the examples. Briefly, pasteurised skim milk is incubated with dairy starter cultures under acid conditions to produce lactic casein.

The lactic casein is dispersed in water to produce a slurry comprising solubilised casein. The temperature is adjusted to less than about 7° C. and the pH of the slurry adjusted to about pH 10. Calcium chloride (dihydrate) is added to the slurry to produce a coagulum. The liquid is obtained, and pH adjusted to 4.3-4.4 to produce a second coagulum. This second coagulum is washed and dried to provide a β-casein enriched fraction.

In various embodiments the β-casein comprises one or more recombinant β-casein proteins.

In various embodiments the recombinant β-casein comprises a native recombinant β-casein, a variant of β-casein, or a combination thereof. In various embodiments the recombinant β-casein protein has an amino acid sequence of any one of SEQ ID Nos: 27-40. In various embodiments the variant of $\alpha_{s1}$-casein or $\alpha_{s2}$-casein has an amino acid sequence having at least about 70%, 75%, 80%, 85%, 90%, 95%, 96%, 98%, or 99% sequence identity to a sequence of SEQ ID Nos: 27-40.

Recombinant Expression

One or more proteins used in the formation of the cheese or cheese-like products may be produced recombinantly. In some cases, the $\alpha_s$-casein and/or β-casein is produced recombinantly.

$\alpha_{s1}$-casein, $\alpha_{s2}$-casein, and/or β-casein can have an amino acid sequence from any species. For example, recombinant $\alpha_s$-casein and/or β-casein may have an amino acid sequence of cow, human, sheep, goat, buffalo, bison, pig, horse or camel $\alpha_s$-casein and/or β-casein. The casein nucleotide sequence may be codon-optimized for increased efficiency of production. Exemplary $\alpha_s$-casein protein sequences are provided as SEQ ID NOs: 1-26 and exemplary β-casein protein sequences are provided as SEQ ID NOs: 27-40 in Table 2 below. Recombinant $\alpha_s$-casein and/or β-casein can be a non-naturally occurring variant of an $\alpha_s$-casein and/or β-casein. Such a variant can comprise one or more amino acid insertions, deletions, or substitutions relative to a native casein sequence. For example, such variants may include an amino acid sequence or peptide truncated at the N-terminus and/or C-terminus, preferably by from 1 to 10 amino acids, for example by 1, 2, 3, or about 5 amino acids, relative to a native casein sequence. Such variants may include an amino acid sequence or peptide elongated at the N-terminus and/or C-terminus, preferably by from 1 to 10 amino acids, for example by 1, 2, 3, or about 5 amino acids, relative to a native casein sequence. In some embodiments, variants may contain from 1 to 10 amino acid insertions, deletions, and/or substitutions (collectively) with respect to the native sequence. For example, such variants may have from 1 to about 5 amino acid insertions, deletions, and/or substitutions (collectively) with respect to the native sequence. The degree and location of glycosylation or other post-translation modifications may vary depending on the chosen host cells and the nature of the host cellular environment. Partial hydrolytic products of $\alpha_s$-casein and/or β-casein are also encompassed by the term "variant".

Such a variant can have at least 80%, 85%, 90%, 95%, 96%, 97%, 98%, or 99% sequence identity to SEQ ID NOs: 1-40. The term "sequence identity" as used herein in the context of amino acid sequences is defined as the percentage of amino acid residues in a candidate sequence that are identical with the amino acid residues in a selected sequence, after aligning the sequences and introducing gaps, if necessary, to achieve the maximum percent sequence identity, and not considering any conservative substitutions as part of the sequence identity. Alignment for purposes of determining percent amino acid sequence identity can be achieved in various ways that are within the skill in the art, for instance, using publicly available computer software such as BLAST, BLAST-2, ALIGN, ALIGN-2 or Megalign (DNASTAR) software. Those skilled in the art can determine appropriate parameters for measuring alignment, including any algorithms needed to achieve maximal alignment over the full-length of the sequences being compared.

A recombinant $\alpha_s$-casein and/or β-casein is recombinantly expressed in a host cell. As used herein, a "host" or "host cell" denotes any protein production host selected or genetically modified to produce a desired product. Exemplary hosts include fungi, such as filamentous fungi, as well as bacteria, yeast, algae, plant, insect, and mammalian cells.

Host cells comprising genetic constructs, such as expression constructs, as disclosed herein are useful in methods well known in the art (e.g. Sambrook et al., Molecular Cloning: A Laboratory Manual, 2nd Ed. Cold Spring Harbor Press, 1987; Ausubel et al., Current Protocols in Molecular Biology, Greene Publishing, 1987) for recombinant production of polypeptides disclosed herein. Such methods may involve the culture of host cells in an appropriate medium in conditions suitable for or conducive to expression of a polynucleotide or polypeptide disclosed herein. The expressed recombinant polypeptide, which may optionally be secreted into the culture, may then be separated from the medium, host cells or culture medium by methods well known in the art (e.g. Deutscher, Ed, 1990, Methods in Enzymology, Vol 182, Guide to Protein Purification).

In some cases, a bacterial host cell such as *Lactococcus lactis*, *Bacillus subtilis* or *Escherichia coli* may be used to produce α-, β- and/or κ-casein proteins. Other host cells include bacterial host such as, but not limited to, *Lactococci* sp., *Lactococcus lactis*, *Bacillus subtilis*, *Bacillus amyloliquefaciens*, *Bacillus licheniformis* and *Bacillus megaterium*, *Brevibacillus choshinensis*, *Mycobacterium smegmatis*, *Rhodococcus erythropolis* and *Corynebacterium glutamicum*, Lactobacilli sp., *Lactobacillus fermentum*, *Lactobacillus casei*, *Lactobacillus acidophilus*, *Lactobacillus plantarum* and *Synechocystis* sp. 6803.

In some embodiments, the host cell is a yeast cell selected from the list consisting of *Saccharomyces cerevisiae*, *Schizosaccharomyces pombe*, *Yarrowia lipolytica*, *Candida glabrata*, *Ashbya gossypii*, *Cyberlindnera jadinii*, *Pichia pastoris*, *Pichia methanolica*, *Kluyveromyces lactis*, *Hansenula polymorpha*, *Candida boidinii*, *Arxula adeninivorans*, *Xanthophyllomyces dendrorhous*, and *Candida albicans* species. In some embodiments, the yeast cell is a *Saccharomycete*.

In some embodiments, the host cell is a fungal cell selected from the list consisting of *Aspergillus* spp. and *Trichoderma* spp.

Expression of a target protein can be provided by an expression vector, a plasmid, a nucleic acid integrated into the host genome or other means. For example, a vector for expression can include: (a) a promoter element, (b) a signal peptide, (c) a heterologous casein sequence, and (d) a terminator element.

Methods for producing and using genetic constructs and expression vectors are well known in the art and are described generally in Sambrook et al., Molecular Cloning: A Laboratory Manual, 2nd Ed. Cold Spring Harbor Press, 1987; Ausubel et al., Current Protocols in Molecular Biology, Greene Publishing, 1987).

Expression vectors that can be used for expression of $\alpha_s$-casein and/or β-casein include those containing an expression cassette with elements (a), (b), (c) and (d). In some embodiments, the signal peptide (c) need not be included in the vector. In some cases, a signal peptide may be part of the native signal sequence of the casein protein, for instance, the protein may comprise a native signal sequence as bolded in SEQ ID NOs: 1, 3, 5, 7, 9, 11, 13, 15, 17, 19, 21, 23, 25, 27, 29, 31, 33, 35, 37, or 39. In some cases, the vector comprises a polynucleotide encoding a protein sequence as exemplified in SEQ ID NOs: 1, 3, 5, 7, 9, 11, 13, 15, 17, 19, 21, 23, 25, 27, 29, 31, 33, 35, 37, or 39. In some cases, the vector may comprise a polynucleotide encoding a mature protein sequence, as exemplified in SEQ ID NOs: 2, 4, 6, 8, 10, 12, 14, 16, 18, 20, 22, 24, 26, 28, 30, 32, 34, 36, 38, or 40 with a heterologous signal sequence. In general, the expression cassette is designed to mediate the transcription of the transgene when integrated into the genome of a cognate host microorganism or when present on a plasmid or other replicating vector maintained in a host cell.

To aid in the amplification of the vector prior to transformation into the host microorganism, a replication origin (e) may be contained in the vector. To aid in the selection of microorganism stably transformed with the expression vector, the vector may also include a selection marker (f). The expression vector may also contain a restriction enzyme site (g) that allows for linearization of the expression vector prior to transformation into the host microorganism to facilitate the expression vectors stable integration into the host genome. In some embodiments the expression vector may contain any subset of the elements (b), (e), (f), and (g), including none of elements (b), (e), (f), and (g). Other expression elements and vector element known to one of skill in the art can be used in combination or substituted for the elements described herein. For example, because many microorganisms are capable of expressing multiple gene products from a polycistronic mRNA, multiple polypeptides can be expressed under the control of a single regulatory region for those microorganisms, if desired. These might include one or more $\alpha_s$-casein proteins, one or more β-casein proteins, one or more different dairy proteins (e.g. one or more caseins), and/or one or more non-dairy proteins.

TABLE 2

Sequences

| SEQ ID No. | Name | Sequence |
|---|---|---|
| 1 | Bovine $\alpha_{s1}$-casein | MKLLILTCLVAVALARPKHPIKHQGLPQEVLNENLLRFFV APFPEVFGKEKVNELSKDIGSESTEDQAMEDIKQMEAESI SSSEEIVPNSVEQKHIQKEDVPSERYLGYLEQLLRLKKYKV PQLEIVPNSAEERLHSMKEGIHAQQKEPMIGVNQELAYFY PELFRQFYQLDAYPSGAWYYVPLGTQYTDAPSFSDIPNPIG SENSEKTTMPLW |
| 2 | Bovine $\alpha_{s1}$-casein mature protein | RPKHPIKHQGLPQEVLNENLLRFFVAPFPEVFGKEKVNELS KDIGSESTEDQAMEDIKQMEAESISSSEEIVPNSVEQKHI QKEDVPSERYLGYLEQLLRLKKYKVPQLEIVPNSAEERLHS MKEGIHAQQKEPMIGVNQELAYFYPELFRQFYQLDAYPSG AWYYVPLGTQYTDAPSFSDIPNPIGSENSEKTTMPLW |
| 3 | Ovine $\alpha_{s1}$-casein | MKLLILTCLVAVALARPKHPIKHQGLSSEVLNENLLRFV VAPFPEVFRKENINELSKDIGSESIEDQAMEDAKQMKAGS SSSSEEIVPNSAEQKYIQKEDVPSERYLGYLEQLLRLKKYN VPQLEIVPKSAEEQLHSMKEGNPAHQKQPMIAVNQELAYF |

TABLE 2-continued

Sequences

| SEQ ID No. | Name | Sequence |
|---|---|---|
| | | YPQLFRQFYQLDAYPSGAWYYLPLGTQYTDAPSFSDIPNPI GSENSGKITMPLW |
| 4 | Ovine α$_{s1}$-casein mature protein | RPKHPIKHQGLSSEVLNENLLRFVVAPFPEVFRKENINELS KDIGSESIEDQAMEDAKQMKAGSSSSEEIVPNSAEQKYI QKEDVPSERYLGYLEQLLRLKKYNVPQLEIVPKSAEEQLHS MKEGNPAHQKQPMIAVNQELAYFYPQLFRQFYQLDAYPS GAWYYLPLGTQYTDAPSFSDIPNPIGSENSGKITMPLW |
| 5 | Caprine α$_{s1}$-casein | MKLLILTCLVAVALARPKHPINHRGLSPEVPNENLLRFVV APFPEVFRKENINELSKDIGSESTEDQAMEDAKQMKAGSS SSSEEIVPNSAEQKYIQKEDVPSERYLGYLEQLLRLKKYNV PQLEIVPKSAEEQLHSMKEGNPAHQKQPMIAVNQELAYFY PQLFRQFYQLDAYPSGAWYYLPLGTQYTDAPSFSDIPNPIG SENSGKTTMPLW |
| 6 | Caprine α$_{s1}$-casein mature protein | RPKHPINHRGLSPEVPNENLLRFVVAPFPEVFRKENINELS KDIGSESTEDQAMEDAKQMKAGSSSSEEIVPNSAEQKY IQKEDVPSERYLGYLEQLLRLKKYNVPQLEIVPKSAEEQLH SMKEGNPAHQKQPMIAVNQELAYFYPQLFRQFYQLDAYPS GAWYYLPLGTQYTDAPSFSDIPNPIGSENSGKTTMPLW |
| 7 | Buffalo α$_{s1}$-casein | MKLLILTCLVAVALARPKQPIKHQGLPQGVLNENLLRFF VAPFPEVFGKEKVNELSTDIGSESTEDQAMEDIKQMEAES ISSSEEIVPISVEQKHIQKEDVPSERYLGYLEQLLRLKKYNV PQLEIVPNLAEEQLHSMKEGIHAQQKEPMIGVNQELAYFY PQLFRQFYQLDAYPSGAWYYVPLGTQYPDAPSFSDIPNPI GSENSEKTTMPLW |
| 8 | Buffalo α$_{s1}$-casein mature protein | RPKQPIKHQGLPQGVLNENLLRFFVAPFPEVFGKEKVNELS TDIGSESTEDQAMEDIKQMEAESISSSEEIVPISVEQKHIQ KEDVPSERYLGYLEQLLRLKKYNVPQLEIVPNLAEEQLHSM KEGIHAQQKEPMIGVNQELAYFYPQLFRQFYQLDAYPSGA WYYVPLGTQYPDAPSFSDIPNPIGSENSEKTTMPLW |
| 9 | Equine α$_{s1}$-casein | MKLLILTCLVAVALARPKLPHRQPEIIQNEQDSREKVLK ERKFPSFALEYINELNRQRELLKEKQKDEHKEYLIEDPEQQ ESSSTSSSEEVVPINTEQKRIPREDMLYQHTLEQLRRLSKY NQLQLQAIHAQEQLIRMKENSQRKPMRVVNQEQAYFYLE PFQPSYQLDVYPYAAWFHPAQIMQHVAYSPFHDTAKLIAS ENSEKTDIIPEW |
| 10 | Equine α$_{s1}$-casein mature protein | RPKLPHRQPEIIQNEQDSREKVLKERKFPSFALEYINELNR QRELLKEKQKDEHKEYLIEDPEQQESSSTSSSEEVVPINTE QKRIPREDMLYQHTLEQLRRLSKYNQLQLQAIHAQEQLIR MKENSQRKPMRVVNQEQAYFYLEPFQPSYQLDVYPYAAW FHPAQIMQHVAYSPFHDTAKLIASENSEKTDIIPEW |
| 11 | Camel α$_{s1}$-casein | MKLLILTCLVAVALARPKYPLRYPEVFQNEPDSIEEVLNK RKILELAVVSPIQFRQENIDELKDTRNEPTEDHIMEDTERK ESGSSSSEEVVSSTTEQKDILKEDMPSQRYLEELHRLNKY KLLQLEAIRDQKLIPRVKLSSHPYLEQLYRINEDNHPQLGE PVKVVTQEQAYFHLEPFPQFFQLGASPYVAWYYPPQVMQY IAHPSSYDTPEGIASEDGGKTDVMPQWW |
| 12 | Camel α$_{s1}$-casein mature protein | RPKYPLRYPEVFQNEPDSIEEVLNKRKILELAVVSPIQFRQE NIDELKDTRNEPTEDHIMEDTERKESGSSSSEEVVSSTTE QKDILKEDMPSQRYLEELHRLNKYKLLQLEAIRDQKLIPRV KLSSHPYLEQLYRINEDNHPQLGEPVKVVTQEQAYFHLEPF PQFFQLGASPYVAWYYPPQVMQYIAHPSSYDTPEGIASED GGKTDVMPQWW |
| 13 | Human α$_{s1}$-casein | MRLLILTCLVAVALARPKLPLRYPERLQNPSESSEPIPLE SREEYMNGMNRQRNILREKQTDEIKDTRNESTQNCVVAE PEKMESSISSSSEEMSLSKCAEQFCRLNEYNQLQLQAAHA QEQIRRMNENSHVQVPFQQLNQLAAYPYAVWYYPQIMQY VPFPPFSDISNPTAHENYEKNNVMLQW |
| 14 | Human α$_{s1}$-casein mature protein | RPKLPLRYPERLQNPSESSEPIPLESREEYMNGMNRQRNIL REKQTDEIKDTRNESTQNCVVAEPEKMESSISSSSEEMSL SKCAEQFCRLNEYNQLQLQAAHAQEQIRRMNENSHVQVP FQQLNQLAAYPYAVWYYPQIMQYVPFPPFSDISNPTAHEN YEKNNVMLQW |
| 15 | Bovine α$_{s2}$-casein | MKFFIFTCLLAVALAKNTMEHVSSSEESIISQETYKQEK NMAINPSKENLCSTFCKEVVRNANEEEYSIGSSSEESAEV |

TABLE 2-continued

Sequences

| SEQ ID No. | Name | Sequence |
|---|---|---|
| | | ATEEVKITVDDKHYQKALNEINQFYQKFPQYLQYLYQGPIV LNPWDQVKRNAVPITPTLNREQLSTSEENSKKTVDMESTE VFTKKTKLTEEEKNRLNFLKKISQRYQKFALPQYLKTVYQH QKAMKPWIQPKTKVIPYVRYL |
| 16 | Bovine α$_{s2}$-casein mature protein | KNTMEHVSSSEESIISQETYKQEKNMAINPSKENLCSTFC KEVVRNANEEEYSIGSSSEESAEVATEEVKITVDDKHYQK ALNEINQFYQKFPQYLQYLYQGPIVLNPWDQVKRNAVPIT PTLNREQLSTSEENSKKTVDMESTEVFTKKTKLTEEEKNRL NFLKKISQRYQKFALPQYLKTVYQHQKAMKPWIQPKTKVI PYVRYL |
| 17 | Ovine α$_{s2}$-casein | MKFFIFTCLLAVALAKHKMEHVSSSEEPINISQEIYKQE KNMAIHPRKEKLCTTSCEEVRNADEEEYSIRSSSEESAE VAPEEVKITVDDKHYQKALNEINQFYQKFPQYLQYLYQGPI VLNPWDQVKRNAGPFTPTVNREQLSTSEENSKKTIDMES TEVFTKKTKLTEEEKNRLNFLKKISQYYQKFAWPQYLKTVD QHQKAMKPWTQPKTNAIPYVRYL |
| 18 | Ovine α$_{s2}$-casein mature protein | KHKMEHVSSSEEPINISQEIYKQEKNMAIHPRKEKLCTTS CEEVRNADEEEYSIRSSSEESAEVAPEEVKITVDDKHYQ KALNEINQFYQKFPQYLQYLYQGPIVLNPWDQVKRNAGPF TPTVNREQLSTSEENSKKTIDMESTEVFTKKTKLTEEEKNR LNFLKKISQYYQKFAWPQYLKTVDQHQKAMKPWTQPKTN AIPYVRYL |
| 19 | Caprine α$_{s2}$-casein | MKFFIFTCLLAVALAKHKMEHVSSSEEPINIFQEIYKQEK NMAIHPRKEKLCTTSCEEVRNANEEEYSIRSSSEESAEV APEEIKITVDDKHYQKALNEINQFYQKFPQYLQYPYQGPIV LNPWDQVKRNAGPFTPTVNREQLSTSEENSKKTIDMEST EVFTKKTKLTEEEKNRLNFLKKISQYYQKFAWPQYLKTVD QHQKAMKPWTQPKTNAIPYVRYL |
| 20 | Caprine α$_{s2}$-casein mature protein | KHKMEHVSSSEEPINIFQEIYKQEKNMAIHPRKEKLCTTSC EEVRNANEEEYSIRSSSEESAEVAPEEIKITVDDKHYQKA LNEINQFYQKFPQYLQYPYQGPIVLNPWDQVKRNAGPFTP TVNREQLSTSEENSKKTIDMESTEVFTKKTKLTEEEKNRLN FLKKISQYYQKFAWPQYLKTVDQHQKAMKPWTQPKTNAI PYVRYL |
| 21 | Buffalo α$_{s2}$-casein | MKFFIFTCLLAVALAKHTMEHVSSSEESIISQETYKQEK NMAIHPSKENLCSTFCKEVIRNANEEEYSIGSSSEESAEVA TEEVKITVDDKHYQKALNEINQFYQKFPQYLQYLYQGPIVL NPWDQVKRNAVPITPTLNREQLSTSEENSKKTVDMESTE VFTKKTKLTEEDKNRLNFLKKISQHYQKFAWPQYLKTVYQ YQKAMKPWTQPKTNVIPYVRYL |
| 22 | Buffalo α$_{s2}$-casein mature protein | KHTMEHVSSSEESIISQETYKQEKNMAIHPSKENLCSTFC KEVIRNANEEEYSIGSSSEESAEVATEEVKITVDDKHYQK ALNEINQFYQKFPQYLQYLYQGPIVLNPWDQVKRNAVPIT PTLNREQLSTSEENSKKTVDMESTEVFTKKTKLTEEDKNR LNFLKKISQHYQKFAWPQYLKTVYQYQKAMKPWTQPKTN VIPYVRYL |
| 23 | Equine α$_{s2}$-casein | MKFFIFTCLLAVALAKHNMEHRSSSEDSVNISQEKFKQ EKYVVIPTSKESICSTSCEEATRNINEMESAKFPTEREEKE VEEKHHLKQLNKINQFYEKLNFLQYLQALRQPRIVLTPWD QTKTGDSPFIPIVNTEQLFTSEEIPKKTVDMESTEVVTEKT ELTEEEKNYLKLLYYEKFTLPQYFKIVRQHQTTMDPRSHRK TNSYQIIPVLRYF |
| 24 | Equine α$_{s2}$-casein mature protein | KHNMEHRSSSEDSVNISQEKFKQEKYVVIPTSKESICSTS CEEATRNINEMESAKFPTEREEKEVEEKHHLKQLNKINQFY EKLNFLQYLQALRQPRIVLTPWDQTKTGDSPFIPIVNTEQL FTSEEIPKKTVDMESTEVVTEKTELTEEEKNYLKLLYYEKFT LPQYFKIVRQHQTTMDPRSHRKTNSYQIIPVLRYF |
| 25 | Camel α$_{s2}$-casein | MKFFIFTCLLAVVLAKHEMDQGSSSEESINVSQQKFKQ VKKVAIHPSKEDICSTFCEEAVRNIKEVESAEVPTENKISQ FYQKWKFLQYLALHQGQIVMNPWDQGKTRAYPFIPTVN TEQLSISEESTEVPTEESTEVFTKKTELTEEEKDHQKFLNKI YQYYQTFLWPEYLKTVYQYQKTMTPWNHIKRYF |
| 26 | Camel α$_{s2}$-casein mature protein | KHEMDQGSSSEESINVSQQKFKQVKKVAIHPSKEDICSTF CEEAVRNIKEVESAEVPTENKISQFYQKWKFLQYLQALHQ GQIVMNPWDQGKTRAYPFIPTVNTEQLSISEESTEVPTEE |

TABLE 2-continued

Sequences

| SEQ ID No. | Name | Sequence |
|---|---|---|
| | | STEVFTKKTELTEEEKDHQKFLNKIYQYYQTFLWPEYLKTV
YQYQKTMTPWNHIKRYF |
| 27 | Bovine β-casein | MKVLILACLVALALARELEELNVPGEIVESLSSSEESITRI
NKKIEKFQSEEQQQTEDELQDKIHPFAQTQSLVYPFPGPIP
NSLPQNIPPLTQTPVVVPPFLQPEVMGVSKVKEAMAPKHK
EMPFPKYPVEPFTESQSLTLTDVENLHLPLPLLQSWMHQP
HQPLPPTVMFPPQSVLSLSQSKVLPVPQKAVPYPQRDMPI
QAFLLYQEPVLGPVRGPFPIIV |
| 28 | Bovine β-Casein Mature protein | RELEELNVPGEIVESLSSSEESITRINKKIEKFQSEEQQQTE
DELQDKIHPFAQTQSLVYPFPGPIPNSLPQNIPPLTQTPVV
VPPFLQPEVMGVSKVKEAMAPKHKEMPFPKYPVEPFTESQ
SLTLTDVENLHLPLPLLQSWMHQPHQPLPPTVMFPPQSVL
SLSQSKVLPVPQKAVPYPQRDMPIQAFLLYQEPVLGPVRG
PFPIIV |
| 29 | Ovine β-Casein | MKVLILACLVALALAREQEELNVVGETVESLSSSEESIT
HINKKIEKFQSEEQQQTEDELQDKIHPFAQAQSLVYPFTG
PIPNSLPQNILPLTQTPVVVPPFLQPEIMGVPKVKETMVPK
HKEMPFPKYPVEPFTESQSLTLTDVEKLHLPLPLVQSWMH
QPPQPLPPTVMFPPQSVLSLSQPKVLPVPQKAVPQRDMPI
QAFLLYQEPVLGPVRGPFPILV |
| 30 | Ovine β-casein mature protein | REQEELNVVGETVESLSSSEESITHINKKIEKFQSEEQQQT
EDELQDKIHPFAQAQSLVYPFTGPIPNSLPQNILPLTQTPV
VVPPFLQPEIMGVPKVKETMVPKHKEMPFPKYPVEPFTESQ
SLTLTDVEKLHLPLPLVQSWMHQPPQPLPPTVMFPPQSVL
SLSQPKVLPVPQKAVPQRDMPIQAFLLYQEPVLGPVRGPFP
ILV |
| 31 | Caprine β-casein | MKVLILACLVALAIAREQEELNVVGETVESLSSSEESIT
HINKKIEKFQSEEQQQTEDELQDKIHPFAQAQSLVYPFTG
PIPNSLPQNILPLTQTPVVVPPFLQPEIMGVPKVKETMVPK
HKEMPFPKYPVEPFTESQSLTLTDVEKLHLPLPLVQSWMH
QPPQPLSPTVMFPPQSVLSLSQPKVLPVPQKAVPQRDMPI
QAFLLYQEPVLGPVRGPFPILV |
| 32 | Caprine β-casein mature protein | REQEELNVVGETVESLSSSEESITHINKKIEKFQSEEQQQT
EDELQDKIHPFAQAQSLVYPFTGPIPNSLPQNILPLTQTPV
VVPPFLQPEIMGVPKVKETMVPKHKEMPFPKYPVEPFTESQ
SLTLTDVEKLHLPLPLVQSWMHQPPQPLSPTVMFPPQSVL
SLSQPKVLPVPQKAVPQRDMPIQAFLLYQEPVLGPVRGPFP
ILV |
| 33 | Buffalo β-casein | MKVLILACLVALALARELEELNVPGEIVESLSSSEESITH
INKKIEKFQSEEQQQMEDELQDKIHPFAQTQSLVYPFPGPI
PKSLPQNIPPLTQTPVVVPPFLQPEIMGVSKVKEAMAPKHK
EMPFPKYPVEPFTESQSLTLTDVENLHLPLPLLQSWMHQPP
QPLPPTVMFPPQSVLSLSQSKVLPVPQKAVPYPQRDMPIQ
AFLLYQEPVLGPVRGPFPIIV |
| 34 | Buffalo β-casein mature protein | RELEELNVPGEIVESLSSSEESITHINKKIEKFQSEEQQQM
EDELQDKIHPFAQTQSLVYPFPGPIPKSLPQNIPPLTQTPVV
VPPFLQPEIMGVSKVKEAMAPKHKEMPFPKYPVEPFTESQ
SLTLTDVENLHLPLPLLQSWMHQPPQPLPPTVMFPPQSVL
SLSQSKVLPVPQKAVPYPQRDMPIQAFLLYQEPVLGPVRG
PFPIIV |
| 35 | Equine β-casein | MKILILACLVALALAREKEELNVSSETVESLSSNEPDSS
SEESITHINKEKLQKFKHEGQQQREVERQDKISRFVQPQP
VVYPYAEPVPYAVVPQSILPLAQPPILPFLQPEIMEVSQAKE
TILPKRKVMPFLKSPIVPFSERQILNPTNGENLRLPVHLIQP
FMHQVPQSLLQTLMLPSQPVLSPPQSKVAPFPQPVVPYPQ
RDTPVQAFLLYQDPRLGPTGELDPATQPIVAVHNPVIV |
| 36 | Equine β-casein mature protein | REKEELNVSSETVESLSSNEPDSSSEESITHINKEKLQKFK
HEGQQQREVERQDKISRFVQPQPVVYPYAEPVPYAVVPQS
ILPLAQPPILPFLQPEIMEVSQAKETILPKRKVMPFLKSPIVP
FSERQILNPTNGENLRLPVHLIQPFMHQVPQSLLQTLMLPS
QPVLSPPQSKVAPFPQPVVPYPQRDTPVQAFLLYQDPRLG
PTGELDPATQPIVAVHNPVIV |
| 37 | Camel β-casein | MKVLILACRVALALAREKEEFKTAGEALESISSSEESITH
INKQKIEKFKIEEQQQTEDEQQDKIYTFPQPQSLVYSHTEP
IPYPILPQNFLPPLQPAVMVPFLQPKVMDVPKTKETIIPKRK |

TABLE 2-continued

Sequences

| SEQ ID No. | Name | Sequence |
|---|---|---|
|  |  | EMPLLQSPVVPFTESQSLTLTDLENLHLPLPLLQSLMYQIPQ PVPQTPMIPPQSLLSLSQFKVLPVPQQMVPYPQRAMPVQA VLPFQEPVPDPVRGLHPVPQPLVPVIA |
| 38 | Camel β-casein mature protein | REKEEFKTAGEALESISSSEESITHINKQKIEKFKIEEQQQT EDEQQDKIYTFPQPQSLVYSHTEPIPYPILPQNFLPPLQPAV MVPFLQPKVMDVPKTKETIIPKRKEMPLLQSPVVPFTESQS LTLTDLENLHLPLPLLQSLMYQIPQPVPQTPMIPPQSLLSLS QFKVLPVPQQMVPYPQRAMPVQAVLPFQEPVPDPVRGLHP VPQPLVPVIA |
| 39 | Human β-casein | MKVLILACLVALALARETIESLSSSEESITEYKQKVEKVK HEDQQQGEDEHQDKIYPSFQPQPLIYPFVEPIPYGFLPQNI LPLAQPAVVLPVPQPEIMEVPKAKDTVYTKGRVMPVLKSPT IPFFDPQIPKLTDLENLHLPLPLLQPLMQQVPQPIPQTLALP PQPLWSVPQPKVLPIPQQVVPYPQRAVPVQALLLNQELLLN PTHQIYPVTQPLAPVHNPISV |
| 40 | Human β-casein mature protein | RETIESLSSSEESITEYKQKVEKVKHEDQQQGEDEHQDKI YPSFQPQPLIYPFVEPIPYGFLPQNILPLAQPAVVLPVPQPEI MEVPKAKDTVYTKGRVMPVLKSPTIPFFDPQIPKLTDLENL HLPLPLLQPLMQQVPQPIPQTLALPPQPLWSVPQPKVLPIP QQVVPYPQRAVPVQALLLNQELLLNPTHQIYPVTQPLAPVH NPISV |

Gram positive bacteria (such as *Lactococcus lactis* and *Bacillus subtilis*) may be used to secrete target proteins into the media, and gram-negative bacteria (such as *Escherichia coli*) may be used to secrete target proteins into periplasm or into the media. In some embodiments, the bacterially-expressed proteins expressed may not have any post-translational modifications (PTMs), which means they are not glycosylated and/or may not be phosphorylated.

Target casein proteins may be expressed and produced in *L. lactis* both in a nisin-inducible expression system (regulated by PnisA promoter), lactate-inducible expression system (regulated by P170 promoter) or other similar inducible systems, as well as a constitutively expressed system (regulated by P secA promoter), wherein both are in a food-grade selection strain, such as NZ3900 using vector pNZ8149 (lacF gene supplementation/rescue principle). The secretion of functional proteins may be enabled by the signal peptide of Usp45 (SP(usp45)), the major Sec-dependent protein secreted by *L. lactis*. For example, $\alpha_{s1}$-casein and $\alpha_{s2}$-casein may be co-expressed or individually expressed in *L. lactis* using a synthetic operon.

Cheese and Cheese-Like Products

The present invention generally relates to cheese or cheese-like products comprising
 a) about 0.2 to about 6% by weight of $\alpha_s$-casein, β-casein, or a combination thereof,
 b) at least about 5% by weight of one or more hydrocolloids, wherein the one or more hydrocolloids comprise one or more starches, and
 c) from about 0.2 to about 20% by weight total dairy protein, wherein total casein in the cheese or cheese-like product comprises
  i) at least about 55% by weight $\alpha_s$-casein, and/or
  ii) at least about 40% by weight β-casein.

Also described herein are cheese and cheese-like products comprising
 a) about 0.2 to about 35% by weight $\alpha_s$-casein,
 b) one or more hydrocolloids, comprising at least one of a starch or a gum.

The invention particularly reduces the total casein content required to form cheese and cheese-like products, particularly processed cheese and processed cheese-like products, while still achieving the desirable properties of such cheeses and cheese-like products.

The invention also may reduce or eliminate the amount of emulsifying salts needed to produce processed cheese and/or analogue type products. Processed cheese manufacture requires the use of emulsifying salts to modify casein conformation into forms that simultaneously emulsify milk fat, while creating a gel upon cooling that produces the desired body and texture. However, the use of $\alpha_s$-casein and/or β-casein according to the invention may both emulsify fat and form the desired body and texture upon cooling without the use of emulsifying salts.

The term "cheese-like product" as used herein, refers to products having one or more characteristics of a particular cheese, for example, products that, when consumed, impart the sensation of consuming cheese. In some embodiments, the cheese-like products may not meet the standard for a particular cheese, for example the Codex Alimentarius standard (found at http://www.fao.org/fao-who-codexalimentarius/codex-texts/list-standards/en/). In some embodiments the cheese-like product comprises no animal-derived ingredients. Such products are frequently referred to as "vegan cheeses". Cheese-like products may comprise proteins, fats and/or lipids made by genetic engineering and/or fermentation to replicate the protein and/or fatty acid composition of milk fat.

In an exemplary embodiment the cheese-like product is a processed cheese-like product.

As used herein, the term "processed cheese-like product" refers to products having one or more of the characteristics of a processed cheese, and includes products such as processed cheese spread or an analogue cheese. As used herein, the term "processed cheese" refers to cheeses prepared by cooking and melting cheese or a blend of cheeses, and includes processed cheeses prepared as described herein in the Examples. When the hot processed cheese is formed, it is a homogeneous pumpable, fluid cheese material that may be cast or formed into sheets to produce blocks, loaves, slices or other desired forms using techniques such as rolling and/or cutting. Processed cheese is sometimes referred to as "process cheese", and the terms are synonymous.

In various embodiments the cheese-like product is a vegetarian or vegan cheese.

The invention also relates to the use of unusually low amounts of $\alpha_s$-casein and/or $\beta$-casein to produce cheese and cheese-like products. Typical processed cheeses, such as those described herein in the Examples, may comprise from about 12 to 25% by weight total protein. In contrast, cheeses and cheese-like products produced according to the invention may comprise 0.2 to about 10% by weight total protein, 0.2 to about 9% by weight total protein or about 0.2 to 5% by weight total protein.

An exemplary cheese or cheese-like product of the invention may comprise:
 a) from about 0.05 to about 35% lipid,
 b) from about 15 to about 65% by weight moisture,
 c) from about 0.25 to about 7.5% by weight of simple carbohydrates,
 d) from about 0 to about 45% by weight of complex carbohydrates,
 e) from about 0 to about 0.75% by weight of one or more gums,
 f) from about 0.25 to about 3.5% salt, and
 g) from about 0.15 to about 5.0% by weight of minerals, cations, and/or anions.

In some embodiments the cheese or cheese-like product may comprise at least about 0.05, 1, 2, 2.5, 3, 4, 5, 6, 7, 7.5, 8, 9, 10, 11, 12, 12.5, 13, 14, 15, 16, 17, 17.5, 18, 19, 20, 21, 22, 22.5, 23, 24, 25, 26, 27, 27.5, 28, 29, 30, 31, 32, 33, 34 or 35% by weight lipid, and useful ranges may be selected between any of these values (for example, from about 0.05 to about 35, 1% to about 30%, about 5% to about 30%, about 10% to about 30%, about 17% to about 20%, about 20% to about 30%, about 25% to about 30%, about 27% to about 30%, about 27.5% to about 30%, about 1% to about 27.5% by weight fat, about 5% to about 27.5%, about 10% to about 27.5%, about 17% to about 27.5%, about 17% to about 27%, about 20% to about 25%, about 1% to about 22% by weight fat, about 5% to about 22%, about 10% to about 22%, about 17% to about 22%, about 1% to about 20%, about 5% to about 20%, about 10% to about 20%, about 1% to about 10% or about 1% to about 5% by weight lipid).

In one embodiment the cheese or cheese-like product is a reduced fat cheese or cheese-like product. In one embodiment the reduced fat cheese or cheese-like product comprises from about 0.5% to about 10% by weight lipid.

In some embodiments cheeses and cheese-like products of the invention may have the desired flavour, body, appearance, structure, texture, firmness, fibrosity, density, elasticity, springiness, melt, stretch, water binding capacity, creaminess and/or mouthfeel of equivalent cheeses produced by standard methods. Additionally, the proteins may perform specific physicochemical tasks such as forming desired gels, coagula, emulsions, foams, etc. The elasticity and functional properties of the gels produced by the protein blends of the invention may allow processing on processed cheese manufacturing and packaging equipment, including chill rolls, casting belts, free slice casting equipment, etc. Preferably all ingredients meet vegan/vegetarian specifications and expectations.

In one embodiment, the processed cheese or processed cheese-like product has a melt value of from about 3 to about 10, preferably from about 6 to about 7 on the Schreiber melt test. The Schreiber melt test was designed for use on processed cheese products, and especially for "slice" processed cheese products.

These techniques are described in Park, J., J. R. Rosenau, and M. Peleg. 1984. "Comparison of four procedures of cheese meltability evaluation". J. Food Sci. 49:1158-1162, & 1170 and Zehren, V, L., and D. D. Nusbaum, 1962. Process Cheese. Cheese Reporter Publishing Co., Inc. Madison, WI.

Briefly, the Schreiber melt test is conducted by performing the following steps:
 cut a circular disk of cheese to a 39.5 mm diameter and thickness of about 4.7 mm, that is set into a glass (100×20 mm thin walled) petri dish bottom,
 place the petri dish cover on the sample and place in the refrigerator for 10 minutes at 4° C.,
 place prepared sample into a preheated 232° C. forced draft oven and bake for 5 minutes,
 cool for 30 minutes, and
 remove petri dish lid and place dish upon Schreiber melt test chart (a chart containing a series of concentric circles starting at 39.5 mm in diameter, with the diameter of each succeeding circle 2 mm greater.
 report the Schreiber melt test score as listed on the concentric circles (i.e. sequentially 0 to 12).

A melt value of from about 6 to about 7 on the Schreiber melt test indicates an acceptable processed cheese performance. A melt value of greater than 6 on the Schreiber melt test indicates an unacceptable cheese performance.

In various embodiments, the cheese or cheese-like product comprises:
 a) about 1 to about 3.5%, preferably about 1.5% to about 2.5% w/w $\alpha_s$-casein,
 b) about 15 to about 30%, preferably about 18 to about 27% w/w starch,
 c) about 0.1 to about 0.24%, preferably about 0.12 to about 0.2% w/w gum,
 d) optionally one or more non-dairy proteins,
 e) optionally one or more emulsifying salts,
 f) about 45 to about 65%, preferably about 50 to about 60% w/w moisture, and
 g) about 12 to about 26%, preferably about 15 to about 22% w/w lipid.

An exemplary cheese or cheese-like product comprises:
 a) about 2% w/w $\alpha_s$-casein,
 b) about 22.5% w/w starch,
 c) about 0.16% w/w carrageenan,
 d) optionally one or more non-dairy proteins,
 e) optionally one or more emulsifying salts,
 f) about 58% w/w moisture,
 g) about 19% w/w vegetable fat, and
 h) about 1% w/w salt.

In various embodiments, the cheese or cheese-like product comprises:
 a) about 1.0 to about 5.0% total protein,
 b) about 0.90 to about 5.0% dairy protein,
 c) about 0.5 to about 4.5%, preferably about 0.8% to about 2.5% w/w $\alpha_s$-casein, and/or about 1.0% to about 2.0%, preferably about 1.2% to about 1.7% $\beta$-casein,
 d) about 15 to about 30%, preferably about 18 to about 27% w/w starch, preferably wherein the starch comprises about 65% to about 75% oxidised thin-boiling potato starch by weight of total starch, about 16% to about 22% OSA modified potato starch by weight of total starch, and about 11% to about 16% acetylated distarch phosphate modified potato starch by weight of total starch, e) about 0.1 to about 0.24%, preferably about 0.12 to about 0.2% w/w gum,
f) optionally one or more non-dairy proteins,
g) optionally one or more emulsifying salts,
h) about 45 to about 65%, preferably about 50 to about 60% w/w moisture, and
i) about 12 to about 26%, preferably about 15 to about 22% w/w lipid.

An exemplary cheese or cheese-like product comprises:
a) about 1.0% w/w total protein,
b) about 1.0% w/w dairy protein,
c) about 0.8% w/w $\alpha_s$-casein,
d) about 18.4% w/w starch,
e) about 0.16% w/w carrageenan,
f) optionally one or more non-dairy proteins,
g) optionally one or more emulsifying salts,
h) about 56% w/w moisture,
i) about 19% w/w vegetable fat, and
j) about 1% w/w salt.

Another exemplary cheese or cheese-like product comprises:
a) about 3% w/w total protein,
b) about 3% w/w dairy protein,
c) about 2.5% w/w $\alpha_s$-casein,
d) about 18.4% w/w starch,
e) about 0.16% w/w carrageenan,
f) optionally one or more non-dairy proteins,
g) optionally one or more emulsifying salts,
h) about 56% w/w moisture,
i) about 19% w/w vegetable fat, and
j) about 1% w/w salt.

Another exemplary cheese or cheese-like product comprises:
a) about 3.0% w/w total protein,
b) about 3.0% w/w dairy protein,
c) about 1.3% w/w $\alpha_s$-casein,
d) about 1.3% w/w $\beta$-casein,
e) about 18.4% w/w starch,
f) about 0.16% w/w carrageenan,
g) optionally one or more non-dairy proteins,
h) optionally one or more emulsifying salts,
i) about 56% w/w moisture,
j) about 19% w/w vegetable fat, and
k) about 1% w/w salt.

Another exemplary cheese or cheese-like product comprises:
a) about 3.0% w/w total protein,
b) about 3.0% w/w dairy protein,
c) about 1.6% w/w $\beta$-casein,
d) about 18.4% w/w starch,
e) about 0.16% w/w carrageenan,
f) optionally one or more non-dairy proteins,
g) optionally one or more emulsifying salts,
h) about 56% w/w moisture,
i) about 19% w/w vegetable fat, and
j) about 1% w/w salt.

Another exemplary cheese or cheese-like product comprises:
a) about 5% w/w total protein,
b) about 5% w/w dairy protein,
c) about 4.2% w/w $\alpha_s$-casein,
d) about 18.4% w/w starch,
e) about 0.16% w/w carrageenan,
f) optionally one or more non-dairy proteins,
g) optionally one or more emulsifying salts,
h) about 56% w/w moisture,
i) about 19% w/w vegetable fat, and
j) about 1% w/w salt.

In various embodiments, the cheese or cheese-like product comprises:
a) about 1.0 to about 5.0% total protein,
b) about 0.90 to about 5.0% dairy protein,
c) about 0.5 to about 6.0%, preferably about 0.8% to about 4.5% w/w $\alpha_s$-casein,
d) about 15 to about 30%, preferably about 18 to about 27% w/w starch, preferably wherein the starch comprises about 65% to about 75% oxidised thin-boiling potato starch by weight of total starch, about 16% to about 22% OSA modified maize starch by weight of total starch, and about 10% to about 15% hydroxypropyl distarch phosphate modified tapioca starch by weight of total starch,
e) about 0.1 to about 0.24%, preferably about 0.12 to about 0.2% w/w gum,
f) optionally one or more non-dairy proteins,
g) optionally one or more emulsifying salts,
h) about 45 to about 65%, preferably about 50 to about 60% w/w moisture, and
i) about 12 to about 26%, preferably about 15 to about 22% w/w lipid.

An exemplary cheese or cheese-like product comprises:
a) about 1.0% w/w total protein,
b) about 1.0% w/w dairy protein,
c) about 0.8% w/w $\alpha_s$-casein,
d) about 18.5% w/w starch,
e) about 0.15% w/w locust bean gum,
f) optionally one or more non-dairy proteins,
g) optionally one or more emulsifying salts,
h) about 56% w/w moisture,
i) about 19% w/w vegetable fat, and
j) about 1% w/w salt.

Another exemplary cheese or cheese-like product comprises:
a) about 5.0% w/w total protein,
b) about 5.0% w/w dairy protein,
c) about 4.1% w/w $\alpha_s$-casein,
d) about 18.5% w/w starch,
e) about 0.15% w/w locust bean gum,
f) optionally one or more non-dairy proteins,
g) optionally one or more emulsifying salts,
h) about 56% w/w moisture,
i) about 19% w/w vegetable fat, and
j) about 1% w/w salt.

Hydrocolloids

Hydrocolloids are useful as thickening or gelling agents in food products.

The cheese or cheese products described herein comprise one or more hydrocolloids. In various embodiments the one or more hydrocolloids comprise one or more starches, one or more gums, or a combination thereof.

In various embodiments the one or more hydrocolloids comprise one or more starches.

In various embodiments the starch comprises potato starch, maize starch, rice starch, tapioca (cassava) starch, wheat starch, pea starch, sweet potato starch, banana starch, barley starch, oat starch, sago starch, amaranth starch, arrowroot starch, canna starch, sorghum starch, chia seed starch, fava bean starch, jackfruit starch, bamboo starch, chickpea starch, cassava starch, carrot starch, or any combination of any two or more thereof. Particularly preferred starches include maize, potato, cassava, tapioca and rice starch.

In some embodiments the starch may be modified. Starches may be modified by physical, chemical or enzymatic means to produce modified starches with altered and/or enhanced properties, such as resistance to gelatinisation and/or retrogradation, improved stability, low viscosity when heated, enhanced gelling, and/or improved emulsification with fat.

In various embodiments the starch comprises a modified starch, for example, a pre-gelatinised starch, a thin-boiling starch, an oxidised starch, octenyl succinic anhydride (OSA) modified starch, or an acetylated distarch phosphate.

In various embodiments the starch comprises a modified potato starch, modified maize starch and/or a modified tapioca starch. In various embodiments the modified starch is selected from an oxidised thin boiling potato starch, an octenyl succinic anhydride (OSA) modified potato starch, an acetylated distarch phosphate modified potato starch, an octenyl succinic anhydride (OSA) modified maize starch, or a hydroxypropyl distarch phosphate modified tapioca starch, or a combination of any two or more thereof.

In various embodiments the one or more gums comprise xanthan gum, guar gum, locust bean gum, tragacanth gum, acacia gum, karaya gum, tara gum, gellan gum, konjac gum (konjac mannan), carboxymethylcellulose (CMC), tragacanth, agar, pectin, alginate, carrageenan (κ-carrageenan, ι-carrageenan, λ-carrageenan), Arabic gum, pectin, alginate, flaxseed gum, guar gum, or any combination of any two or more thereof.

Other useful hydrocolloids include carboxymethylcellulose (CMC), tragacanth and plant-derived hydrocolloids, such as agar, alginate, carrageenan (κ-carrageenan, ι-carrageenan, λ-carrageenan), Arabic gum, and mixtures thereof. Preferred hydrocolloids include, for example, agar, pectin, xanthan gum, carboxymethylcellulose (CMC), and carrageenan (κ-carrageenan, ι-carrageenan, λ-carrageenan) and mixtures of such. A particularly preferred hydrocolloid is carrageenan.

Lipid

In various embodiments the cheese or cheese-like product comprises one or more vegetable or animal lipids.

In various embodiments the one or more lipids may comprise one or more vegetable or animal lipids.

Exemplary plant oils include, for example coconut oil, corn oil, cottonseed oil, canola oil, olive oil, palm oil, ground nut oil, safflower oil, sesame oil, soybean oil, sunflower oil, nut oil, hazelnut oil, almond oil, cashew oil, macadamia oil, pecan oil, pistachio oil, walnut oil, oils from melon and gourd seeds, bottle gourd oil, buffalo gourd oil, pumpkin seed oil, watermelon seed oil, acai oil, blackcurrant seed oil, borage seed oil, evening primrose oil, carob seed oil, amaranth oil, apricot oil, argan oil, artichoke oil, avocado oil, babassu oil, ben oil, borneo tallow nut oil, cohune oil, coriander seed oil, flax oil, flax seed oil, coriander seeds oil, grape seed oil, hemp oil, kapok seed oil, kiwi fruit oil, lallemantia oil, linseed oil, mustard oil, okra seed oil, perilla seed oil, pequi oil, pine nut oil, poppyseed oil, prune kernel oil, quinoa oil, ramtil oil, rice bran oil, tea oil, wheat germ oil, hydrogenated vegetable oil, cocoa butter, shea butter any derivative of palm kernel oil, cocoa butter or shea butter, for example a derivative obtained by fractionation, partial or full hydrogenation and/or extraction, or any combination of any two or more thereof.

In various embodiments the vegetable lipid comprises one or more vegetable oils, coconut oil, one or more lecithins, or any combination thereof.

In various embodiments the vegetable oil comprises canola (rapeseed) oil, corn oil, sunflower oil, olive oil, soybean oil, or any combination of any two or more thereof.

In various embodiments the one or more lecithins may comprise soy lecithin.

In various embodiments the lipid source is or comprises a milk lipid. Preferably the milk lipid is selected from cream, high fat cream, plastic cream, beta serum or anhydrous milk fat.

In various embodiments the vegetable or animal lipid may be derived from natural sources. In other embodiments, the vegetable or animal lipid may be produced recombinantly.

Dairy Proteins

The term "dairy protein" as used herein refers to any protein that is naturally present in the milk of a mammal, or any variant thereof. The term includes unpurified proteins as well as partially or completely purified or isolated proteins, and includes full-length and processed (mature) dairy proteins, as well as protein fragments. The term also includes dairy proteins that have been produced from non-milk sources, such as recombinantly expressed dairy proteins.

Dairy proteins include caseins, such as $\alpha_{s1}$-casein, $\alpha_{s2}$-casein, β-casein, κ-casein, and p-κ-casein; and whey proteins including β-lactoglobulin, α-lactalbumin, serum albumin, and immunoglobulins. Some examples of casein proteins are listed in Table 2.

Non-Dairy Proteins

The term "non-dairy protein" as used herein refers to any protein, excluding dairy proteins. The term "non-dairy animal protein" as used herein refers to any non-dairy protein that is naturally present in an animal. Examples of non-dairy animal proteins include gelatin (such as gelatin produced from pork) and collagen.

In various embodiments the non-dairy protein comprises algal protein, hydrolysed algal protein, plant protein or hydrolysed plant protein.

In various embodiments the plant protein may comprise, for example, canola (rapeseed), legume, cereal, nut, or seed protein or any combination of any two or more thereof, optionally wherein any one or more of the plant proteins is a hydrolysed plant protein. In various embodiments the legume protein comprises pea, chickpea, bean, lupin, lentil or soy protein, or any combination of any two or more thereof, optionally wherein any one or more of the plant proteins is a hydrolysed plant protein. In various embodiments the cereal protein comprises rice, wheat, sorghum, maize, corn, or barley protein, or any combination of any two or more thereof, optionally wherein any one or more of the plant proteins is hydrolysed plant protein. In various embodiments the nut protein comprises almond, or cashew protein, or any combination thereof, optionally wherein any one or more of the plant proteins is a hydrolysed plant protein. In various embodiments the seed protein comprises chia, hemp or flax (linseed) protein, or any combination of any two or more thereof, optionally wherein any one or more of the plant proteins is hydrolysed plant protein.

In various embodiments the non-dairy protein comprises a soy protein material, for example soy protein flour, soy protein concentrate, soy protein isolate, and mixtures thereof.

In various embodiments the cheese or cheese-like product comprises at least about 0, 0.01, 0.1, 0.5, 1, 2, 3, 4, 5, 6, 7, 8, 9, 10, 15, 16, 17, 18, 19 or at least about 20% w/w non-dairy protein, and various ranges can be selected from between these values, for example, from about 0 to about 17, about 0 to about 15, about 0 to about 10, about 0 to about 8, about 0 to about 5, about 0.01 to about 17, about 0.01 to about 15, about 0.01 to about 10, about 0.01 to about 8, about 0.01 to about 5, about 0.1 to about 17, about 0.1 to about 15, 0.1 to about 10, 0.1 to about 8, 1 to about 8, 1 to about 5, or 5 to about 8% w/w of the non-dairy protein. Preferably the cheese or cheese-like product comprises about 0, 0.01, 0.1, 0.5, 1, 2, 3, 4, 5, 6, 7, or at about 8% w/w non-dairy protein, and suitable ranges may be selected from any of these values. In one embodiment, the cheese or cheese-like product contains essentially no non-dairy protein.

In various embodiments the non-dairy protein may be derived from natural sources. In other embodiments, the non-dairy protein may be produced recombinantly.

Emulsifying Salts

In various embodiments the cheese or cheese-like product comprises one or more emulsifying salts. In various embodiments the emulsifying salt comprises one or more sodium emulsifying salts, one or more potassium emulsifying salts, one or more calcium emulsifying salts, or any combination thereof. For example, the emulsifying salt may comprise sodium, potassium and/or calcium salts of the mono, di, and polyphosphoric acids, sodium, potassium and/or calcium salts of citric acid, citric acid and/or phosphoric acid with sodium hydrogen carbonate and/or calcium carbonate.

In various embodiments the potassium emulsifying salt comprises potassium citrate, tripotassium citrate, potassium dihydrogen orthophosphate, dipotassium phosphate, dipotassium dihydrogen orthophosphate, dipotassium dihydrogen orthophosphate-3-hydrate, dipotassium dihydrogen orthophosphate-6-hydrate, dipotassium dihydrogen diphosphate, tripotassium orthophosphate and tripotassium orthophosphate-3-hydrate and tripotassium orthophosphate-6-hydrate, tetrapotassium diphosphate, tetrapotassium diphosphate-3-hydrate, tetrapotassium pyrophosphate, pentapotassium triphosphate, Kurroll's salt ((KPO3)n), or any combination of any two or more thereof.

In various embodiments the sodium emulsifying salt comprises monosodium phosphate, disodium phosphate, trisodium phosphate, sodium metaphosphate (sodium hexametaphosphate), sodium acid pyrophosphate, tetrasodium pyrophosphate, sodium aluminium phosphate, sodium citrate, sodium tartrate, sodium potassium tartrate, and any combination of any two or more thereof.

In various embodiments the cheese or cheese-like product may comprise a calcium salt. The calcium salt may be selected from monocalcium phosphate, dicalcium phosphate, tricalcium phosphate, calcium chloride, calcium carbonate, calcium citrate, calcium glubionate, calcium lactate, calcium gluconate, calcium acetate, equivalents thereof and/or combinations thereof.

In various embodiments the concentration of calcium in the cheese or cheese-like product may be from about 0 mM to about 260 mM. In some embodiments the concentration of calcium in the cheese or cheese-like product may be from about 10 mM to about 55 mM. In some embodiments the concentration of calcium in the cheese or cheese-like product may be at least 10 mM or at most 50 mM. In some embodiments, the concentration of calcium in the cheese or cheese-like product may be 28 mM or no more than 28 mM or may be 55 mM or no more than 55 mM. The concentration of calcium in the cheese or cheese-like product may be 10 mM to 15 mM, 10 mM to 20 mM, 10 mM to 25 mM, 10 mM to 30 mM, 10 mM to 35 mM, 10 mM to 40 mM, 10 mM to 45 mM, 10 mM to 50 mM, 10 mM to 55 mM, 15 mM to 20 mM, 15 mM to 25 mM, 15 mM to 30 mM, 15 mM to 35 mM, 15 mM to 40 mM, 15 mM to 45 mM, 15 mM to 50 mM, 15 mM to 55 mM, 20 mM to 25 mM, 20 mM to 30 mM, 20 mM to 35 mM, 20 mM to 40 mM, 20 mM to 45 mM, 20 mM to 50 mM, 20 mM to 55 mM, 25 mM to 30 mM, 25 mM to 35 mM, 25 mM to 40 mM, 25 mM to 45 mM, 25 mM to 50 mM, 25 mM to 55 mM, 30 mM to 35 mM, 30 mM to 40 mM, 30 mM to 45 mM, 30 mM to 50 mM, 30 mM to 55 mM, 35 mM to 40 mM, 35 mM to 45 mM, 35 mM to 50 mM, 35 mM to 55 mM, 40 mM to 45 mM, 40 mM to 50 mM, 40 mM to 55 mM, 45 mM to 50 mM, 45 mM to 55 mM, or 50 mM to 55 mM. The concentration of calcium in the cheese or cheese-like product may be 10 mM, 15 mM, 20 mM, 25 mM, 30 mM, 35 mM, 40 mM, 45 mM, 50 mM, or 55 mM. The concentration of calcium in the cheese or cheese-like product may be at least 10 mM, 15 mM, 20 mM, 25 mM, 30 mM, 35 mM, 40 mM, 45 mM or 50 mM. The concentration of calcium in the cheese or cheese-like product may be at most 15 mM, 20 mM, 25 mM, 30 mM, 35 mM, 40 mM, 45 mM, 50 mM or 55 mM.

Other Ingredients

In various embodiments the cheese or cheese-like product may comprise one or more additional ingredients.

In various embodiments the cheese or cheese-like product may comprise a source of milk protein.

In various embodiments the source of milk protein may be selected from
  a) whole fat milk, whole milk retentate/concentrate, semi skimmed milk, skimmed milk, skimmed retentate/concentrate, butter milk, butter milk retentate/concentrate and whey protein retentate/concentrate; or
  b) one or more powders, such as whole milk powder, skimmed milk powder, milk protein concentrate powder, micellar milk protein powder, milk protein isolate powder, whey protein concentrate powder, whey protein isolate powder and buttermilk powder or other powders made from milk, reconstituted or dry, singularly or in combination. In various embodiments the source of milk protein may comprise cheese or curd.

In alternative embodiments the cheese or cheese-like product does not comprise a source of milk protein. In some embodiments, the cheese or cheese-like product does not comprise caseinate (such as sodium caseinate), a milk protein concentrate (MPC), lactic casein and/or rennet casein.

In various embodiments the cheese or cheese-like product may comprise
  a) one or more complex carbohydrates, such as one or more maltodextrins, corn syrup, and corn syrup solids,
  b) one or more GRAS cationic compounds including one or more monovalent, divalent or multivalent cations such as potassium, sodium, calcium, magnesium, manganese and/or iron compounds,
  c) one or more GRAS anionic compounds such as citrate, propionate, phosphate, and/or carbonate,
  d) one or more mineral salts,
  e) one or more GRAS acids, including one of more of lactic acid, (L+) lactic acid, acetic acid, citric acid, malic acid, tartaric acid, propionic acid, phosphoric acid, sulfuric acid, and/or hydrochloric acid, and
  f) one or more other GRAS ingredients including preservatives (such as sorbates, for example, potassium sorbate), acidity regulators, colours and/or colouring agents such as pigments, flavours, and flow agents.

In various embodiments the cheese or cheese-like product comprises from about 0.25 to about 7.5% by weight simple carbohydrate and from about 0 to about 45% by weight complex carbohydrate.

In various embodiments the cheese or cheese-like product may comprise one or more lipid replacers. Lipid replacers are useful for reduced fat or no fat cheeses or cheese-like products. In some embodiments, the lipid replacers may comprise one or more polyols, for example, glycerine, sorbitol, allulose, erythritol, xylitol, and/or maltitol. In some embodiments, the lipid replacers comprise one or more long chain carbohydrates/fibres, for example inulin, galacto-oligosaccharides (GOS), fructo-oligosaccharides (FOS), oligofructose, and/or polydextrose. In some embodiments, the lipid replacers comprise both polyols and long chain carbohydrates/fibres.

Manufacturing Methods

The invention also relates to a method for preparing a cheese or cheese-like product, the method comprising
  a) providing a cheese composition comprising
    i. $\alpha_s$-casein, $\beta$-casein, or a combination thereof,
    ii. one or more hydrocolloids, comprising one or more starches,
    iii. optionally one or more lipids, and
    iv. optionally one or more additional ingredients,
  b) heating the composition at a temperature and for a time sufficient to produce a heated cheese mass or cheese-like mass, and
  c) cooling the heated cheese mass or cheese-like mass to produce the cheese or cheese-like product,
  wherein the cheese or cheese-like product comprises
    i. about 0.2 to about 6% by weight of $\alpha_s$-casein, $\beta$-casein, or a combination thereof, and
    ii. at least about 5% by weight of one or more hydrocolloids, and
    iii. from about 0.2 to about 20% by weight total dairy protein,
  wherein total casein in the cheese or cheese-like product comprises
    1. at least about 55% by weight $\alpha_s$-casein, and/or
    2. at least about 40% by weight $\beta$-casein.

Also described herein is a method for preparing a cheese or cheese-like product, the method comprising
  a) providing a composition comprising
    i. $\alpha_s$-casein, the $\alpha_s$-casein comprising $\alpha_{s1}$-casein, $\alpha_{s2}$-casein, or a combination thereof,
    ii. one or more hydrocolloids, comprising at least one of a starch or a gum,
    iii. optionally one or more lipids
    iv. optionally one or more non-dairy proteins,
    v. optionally one or more emulsifying salts, and
    vi. optionally one or more additional ingredients,
  b) heating the composition at a temperature and for a time sufficient to produce a heated cheese mass or cheese-like mass, and
  c) cooling the heated cheese mass or cheese-like mass to produce the cheese or cheese-like product,
wherein the cheese or cheese-like product comprises
    1. about 0.2 to about 35% by weight $\alpha_s$-casein,
    2. optionally about 15 to about 65% by weight moisture, and
    3. optionally about 0.05 to about 35% by weight lipid.

In one embodiment the invention relates to a method for producing a processed cheese or processed cheese product. Exemplary embodiments of the method for producing the processed cheese or processed cheese according to the invention are described as follows. Other suitable variations or alternatives to the embodiments described herein will be apparent to those skilled in the art.

In various embodiments the $\alpha_s$-casein comprises or is provided by an ingredient or composition comprising an $\alpha_s$-casein enriched fraction described herein or lyophilised recombinant $\alpha_s$-casein proteins. In various embodiments the $\beta$-casein comprises or is provided by an ingredient or composition comprising an $\beta$-casein enriched fraction described herein or lyophilised recombinant $\beta$-casein proteins.

In various embodiments the method comprises dispersing the $\alpha_s$-casein and/or $\beta$-casein in water, preferably at a temperature of about 15 to about 55° C., more preferably about 50° C., to substantially completely dissolve the $\alpha_s$-casein and/or $\beta$-casein. In various embodiments, the method comprises dispersing the $\alpha_s$-casein in water at a temperature of about 40 to about 55° C., preferably about 50° C. In various embodiments, the method comprises dispersing the $\beta$-casein in water at a temperature of about 15 to about 30° C., preferably about 20° C.

In one embodiment the water is adjusted to a pH of about 8.5 before adding the $\alpha_s$-casein and/or $\beta$-casein. In another embodiment, the $\alpha_s$-casein and/or $\beta$-casein is added to water and the pH subsequently adjusted to a pH of about 8.0. In one embodiment a salt such as trisodium citrate is added with the $\alpha_s$-casein and/or $\beta$-casein.

In one embodiment the $\alpha_s$-casein and/or $\beta$-casein may be dispersed in water and then added to a mixture of the remaining ingredients or added with other dry ingredients to lipid. In another embodiment the $\alpha_s$-casein and/or $\beta$-casein is combined directly with other dry ingredients or is added directly to the lipid. In some embodiments the lipid is mixed with water to form an emulsion before addition of the dry ingredients.

The ingredients may be combined to produce a composition using any mixer or cheese cooker typically used for cheese preparation. Suitable equipment will be well known to those in the art. Suitable cookers include a Vorwerk Thermomix, and processed cheese cookers. Preferably the ingredients are combined under agitation to ensure even mixing.

The composition is then heated (cooked) for a period at a temperature and for a time sufficient to produce a heated cheese mass or cheese-like mass. In a preferred embodiment the composition is heated for at least about 3 to about 15 minutes at a temperature of at least about 70° C., preferably about 80 to about 85° C. to produce a heated cheese or cheese-like product. Preferably the composition is heated under agitation.

The pH may be adjusted at suitable stages, for example, before, during or after cooking.

In one embodiment the heated cheese mass or cheese-like mass is immediately cooled and packed. In other embodiments the heated cheese is rolled and cast into slices, for example, to form a slice-on-slice (SOS) processed cheese or processed cheese-like product.

The above methods should be considered in no way limiting and suitable variations or alternatives will be apparent to those skilled in the art.

EXAMPLES

Example 1

This example describes the preparation of casein proteins for use in preparing the cheese and cheese-like products of the invention.

Casein was fractionated as described in WO 2009/108074, which is incorporated herein by reference.

Raw whole milk was separated to produce fresh raw skim milk that was subsequently pasteurized at 72.5° C. The temperature was adjusted to about 18° C. and the skim milk inoculated with a blend of standard dairy starter cultures including *Lactobacillus* subsp. *lactis* and *Lactobacillus lac*- tis subsp. *cremoris*. The skim milk was then incubated until microbial fermentation reduced the pH to about 4.6 to produce an acid casein curd. The curd was cut, cooked, separated from the whey, washed, and dried to produce a bulk supply of lactic casein by standard procedures. The composition of the lactic casein is shown below in Table 3.

Approximately 4.5 kg of lactic casein was dispersed into deionized water using sufficient shear to produce 100 L of a solubilized lactic casein slurry comprising 4% total solids. The temperature of the solubilized lactic casein was adjusted to <7° C. and then the pH adjusted to 10.2 by the addition of sodium hydroxide (1 Mol NaOH). Calcium chloride (dihydrate) was blended and dissolved into the prepared slurry to produce a uniform concentration of 0.272 kg $CaCl_2$/kg lactic casein. The treated casein sat quiescently overnight (~14 hours) to produce a coagulum in which syneresis created a curd suspended within a liquid portion. The curd and liquid were separated using a decanting centrifuge and both the curd and liquid were reserved.

The curd received an initial wash with a hydrochloric acid solution to remove residual calcium, which was followed by an additional acid wash ($H_2SO_4$). The curd was then dried to produce an $\alpha_s$-casein enriched fraction.

The pH of the reserved liquid was adjusted to 4.3-4.4 by the addition of 1.0 Mol hydrochloric acid. The acidified mixture sat quiescently until another coagulum formed, which was subsequently separated from the second liquid mixture using a decanter, washed by two acid wash treatments ($H_2SO_4$), and dried to produce the β-casein enriched fraction.

The dried casein fractions were each packaged separately and stored at ambient temperature until use.

Table 3 below shows the compositions of the dried $\alpha_s$-casein enriched and β-casein enriched fractions.

TABLE 3

Composition of lactic casein, $\alpha_s$-casein enriched fraction, and β-casein enriched fraction.

| Component | Lactic casein measured (-%-) | $\alpha_s$-casein enriched | β-casein enriched |
|---|---|---|---|
| Moisture (g/100 g) | 9.31 | 9.33 | 10.1 |
| Total solids (g/100 g) | 90.69 | 90.67 | 89.90 |
| Fat (g/100g) | 1.15 | 0.49 | 0.41 |
| Total protein (g/100 g) | 88.87 | 89.38 | 88.24 |
| Total casein (g/100 g) | NA | 89.38 | 88.24 |
| $\alpha_s$-Casein (g/100 g) | 35.59[a] | 74.55[b] | 27.58[b] |
| β-Casein (g/100 g) | 30.91 | 7.69 | 47.89 |
| κ-Casein (g/100 g) | 11.28[c] | 7.14 | 12.77 |
| CHO | >0.1 | 0.02 | 0.02 |
| Ash (g/100 g) | 1.87 | 2.5 | 1.6 |
| Calcium (mg/100 g) | 0.02 (mg/100 g) | 175 | 34.1 |
| Sodium (mg/100 g) | >0.1 (mg/100 g) | 2.81 | 4.3 |
| pH | 4.38 | 5.27 | 3.73 |

[a] $\alpha_{s1}$-casein only
[b] $\alpha_{s1}$- and $\alpha_{s2}$-casein
[c] κ-casein was calculated based on ratio in Table 1

Example 2

This example describes the preparation of a standard slice-on-slice (SOS) processed cheddar cheese for comparison with the cheese and cheese-like products of the invention.

SOS processed cheddar cheese was prepared using the following method.
  a) Temper cheeses to 4 to 6° C. as required to ensure that all cheese is completely thawed.
  b) Grind cheese.
  c) Weigh citric acid and water (at ambient temperature), and dissolve citric acid into the water.
  d) Weigh cheeses and add weighed cheeses to the processed cheese cooker.
  e) Start low speed agitation in the selected processed cheese cooker, (most trials conducted using Thermomix, Vorwerk, Wuppertal, Germany, using speed setting 1). Suitable agitation in a standard twin screw, laydown processed cheese cooker is approximately 10 to 15 rpm.
  f) Uniformly disperse water/citric acid mixture into the cheese in the cooker.
  g) Weigh and combine all remaining dry ingredients.
  h) Slowly add the combined dry ingredients to the cheese/water/citric acid mixture in the cooker, uniformly distributing the dry ingredients into the cheese mixture.
  i) Moderately increase cooker agitation speed to produce a uniformly mixed blend, such as to speed setting 2 in a Thermomix or about 40 rpm in a twin screw cooker.
  j) Increase agitation and initiate cooking, such as to speed setting 4 in a Thermomix or about 120 rpm in a twin screw cooker.
  k) Cook at a constant rate, increasing the cheese/ingredient blend temperature from about 17-22° C. to about 85° C. within ~5 minutes.
  l) Adjust the agitation speed profile beginning at a moderate speed and increasing to the final agitation speed within about 2.5 min.
  m) Maintain final agitation speed throughout remainder of cooking.
  n) Halt heat application when cheese blend temperature reaches 85° C. and hold the cooked cheese blend at final agitation speed for 6 min.
  o) Discharge molten cheese into cooling and packaging system, roll molten blend with cooling to produce slices of desired thickness (usually 2 mm), cut slices, and wrap in a suitable packaging material.
  p) Cool and package wrapped SOS cheese further as required.
  q) Hold at refrigerated temperatures (4-6° C.) until evaluation.

Table 4 shows the formulation of the comparative SOS processed cheese. Table 5 shows the calculated composition of the final processed cheese.

TABLE 4

Formulation of comparative SOS processed cheddar cheese.

| Component | % |
|---|---|
| Cheddar cheese blend | 76.7 |
| Skim milk powder | 2.0 |
| Trisodium citrate (dihydrate) | 3.6 |
| Salt | 0.2 |
| Citric acid (crystallized) | 0.2 |
| Sorbic acid | 0.2 |

TABLE 4-continued

Formulation of comparative SOS processed cheddar cheese.

| Component | % |
|---|---|
| Water | 17.1 |
| Total | 100.0 |

TABLE 5

Calculated composition of comparative SOS cheddar cheese.

| Component | Amount |
|---|---|
| Total solids | 58.5 w/w |
| Moisture | 41.5 w/w |
| Fat | 29.65 w/w |
| Fat-in-dry matter | 50.65 w/W |
| Total protein | 20.0 w/W |
| Casein | 19.8 w/w |
| Whey protein/NPN | 0.2 w/w |
| Lactose | 1.1 w/W |
| Non-lactose carbohydrate | 0.5 w/w |
| Ash | 2.5 w/w |
| Emulsifying salt | 3.2 w/w |
| Salt | 1.6 w/W |
| Sorbate | 0.2 w/w |
| Calcium (mg/100 g) | 625 |
| Sodium (mg/100 g) | 1475 |

Example 3

This example describes the preparation of processed cheese-like products of the invention comprising potato starch, carrageenan gum and $\alpha_s$-casein. The example also investigates the effect of varying pH in the products of the invention and compares the properties of the products of the invention with those of a control cheese lacking $\alpha_s$-casein.

The applicant acknowledges Emsland-Stärke GmbH as a supplier of some of the base formulations that may be used in the invention.

Method of Manufacture

The processed cheese-like products of the invention were prepared as follows:
a) An $\alpha_s$-casein enriched fraction prepared according to Example 1 was dispersed into water by
   i) Weighing half the water required by the formulation and adjusting to ambient temperature,
   ii) Adding trisodium phosphate (TSP) to the water with constant agitation to increase the pH to 8.5 (continuously measuring the solution pH during TSP addition, which is halted immediately when pH 8.5 is reached),
   iii) Increasing the temperature of the high pH water/TSP solution to 50° C. with low shear, low speed mixing, and
   iv) Adding the $\alpha_s$-casein enriched fraction to the 50° C. high pH water and mixing for 5 minutes to ensure that the powder is dispersed and dissolved;
   v) Adjust the pH to 8.0, while maintaining agitation and hold for 5 minutes to ensure the casein dissolves.
b) A fat and powdered ingredient mixture was prepared by
   i) Heating coconut fat to 60° C., allowing the fat to melt,
   ii) Separately combining modified potato starch, salt, carrageenan and potassium sorbate to produce a dry blend mixture; and
   iii) Gently mixing the dry blended ingredients into the molten fat for 1 minute to produce a smooth uniform blend;
c) The ingredients were combined and cooked by
   i) Combining the remaining water, dissolved $\alpha_s$-casein enriched fraction, and the fat-dry ingredient blend in processed cheese cooker,
   ii) Heating the blended ingredients to 85° C. at a low shear rate (speed setting 2 on the Thermomix),
   iii) Increasing the mixing speed immediately when the temperature reached 85° C. (speed setting 4.0 on the Thermomix) and mixing for 5 minutes, and
d) The pH of the cooked product was adjusted by
   i) Removing a subsample of product and allowing the subsample to cool, while continuing to mix blend in cooker at low shear,
   ii) Measuring the pH when the subsample temperature was ≤65° C.,
   iii) Reducing the cooker blend sample to target pH by adding citric acid, or increasing the cooker blend pH by adding trisodium phosphate,
   iv) Total cook time including pH adjustment was 10 minutes in total.
e) Pouring hot cooked product (85° C.) into suitable plastic containers,
f) Sealing the containers, and
g) Refrigerating the product until further use in testing, cutting into slices as required.

Formulation and Composition of Processed Cheese-Like Products

Table 6 shows the formulations of the processed cheese-like products and a standard processed cheese prepared according to the method of Example 2, while Table 7 shows the calculated final product composition.

TABLE 6

Formulations of processed cheese-like products.

| Component | Control product (-%-) | Inventive product (-%-) |
|---|---|---|
| Water | 54.8 | 54.8 |
| Coconut fat | 19.0 | 19.0 |
| Modified potato starch - oxidized thin boiling (e1404) | 15.1 | 15.1 |
| Modified potato starch - OSA (e1450) | 4.23 | 4.23 |
| Modified potato starch - acetylated distarch phosphate (e1414) | 3.12 | 3.12 |
| Pea protein isolate | 2.0 | 0 |
| $\alpha_s$-Casein enriched fraction | 0 | 2.0 |
| Salt | 1.0 | 1.0 |
| Potassium sorbate | 0.24 | 0.24 |
| Carrageenan | 0.16 | 0.16 |
| Lactic acid | 0.1 | 0.1 |
| Citric acid | 0.1 | As Needed |
| Trisodium phosphate (TSP) | 0 | As Needed |
| Total | 100% by weight | 100% by weight |

TABLE 7

Calculated composition of processed cheese-like products.

| Component | Control product | Inventive product (at all pH) | Processed cheese of Example 2 |
|---|---|---|---|
| Total solids (% by weight) | 41.2 | 41.7 | 58.5 |
| Moisture (% by weight) | 58.8 | 58.3 | 41.5 |
| Fat (% by weight) | 19.2 | 19.1 | 29.6 |
| Fat-in-dry matter (% by weight) | 46.6 | 46.1 | 50.65 |
| Total protein (% by weight) | 1.6 | 2.0 | 20.0 |
| Total casein (% by weight) | 0 | 1.96 | 19.8 |
| $\alpha_s$-Casein (% by weight) | 0 | 1.67 | NA |
| β-Casein (% by weight) | 0 | 0.17 | NA |
| κ-Casein (% by weight) | 0 | 0.16 | NA |
| Carbohydrate (% by weight) | 18.5 | 18.8 | 1.6 |
| Ash (% by weight) | 1.23 | 1.32 | 2.5 |
| Emulsifying salt (% by weight) | 0 | 0.27 | 3.2 |
| Salt (% by weight) | 1 | 1 | 1.6 |
| Sodium (mg/100 g) | 390 | 500 | 1475 |

Melt Properties and Firmness

The meltability of the products was assessed using the Schreiber melt test described herein, upon duplicate samples.

The pH of each product was measured at the time the melt test was conducted.

The following penetrometer procedure measures firmness of cheeses and cheese-like products by determining the amount of force (measured as Newtons) required to push a cylindrical probe through a prepared sample at a constant speed. The force is measured by a load cell on a texture analyser. The maximum force is determined.

Penetrometer firmness was measured using by a TA HDplus Texture Analyzer (Stable Micro Systems, Ltd. Godalming, Surrey, UK) at 13° C. using a 6.3 mm cylindrical probe, with the following settings:

Pre-Test speed 1.0 mm/s

Test speed 1.0 mm/s

Post-Test speed 1.0 mm/s

Distance 10.0 mm

Force 0.1 N

Load cell 50 kg

Trigger: auto

The product temperature was tested at 13° C. Each product was either packaged as a suitable block or consisted of a stack of 25 individual slices.

The data was collected on a computer and analysed by a commercial computer program. The results are shown in Table 8.

TABLE 8

Sample pH and mean Schreiber melt test results.

| | Control product | Processed cheese of Example 2 | Inventive product | Inventive product | Inventive product |
|---|---|---|---|---|---|
| pH measured at time of analysis | 4.71 | 5.65 | 4.79 | 5.51 | 5.92 |
| Melt | 11.8 | 8.0 | 6.2 | 11.3 | 10.5 |
| Penetrometer firmness (N) | 6.0 | 12.3 | 8.4 | 8.1 | 8.8 |

Viscoelasticity

The viscoelastic properties of the products were assessed by rheology according to the following method.

Oscillatory measurements (mechanical spectra) for each sample were performed in a frequency range of 0.1-50 rad/s, using strain values compromised in the linear viscoelastic region for each sample (0.5%). Data were collected using a Modular Compact Rheometer (MCR 300, Anton Paar). The attachment used was a 20 mm smooth parallel plate geometry. Gap was modified based on the thickness of each sample (ensuring the normal force was less than 0.5 N). Experiments were done at 25° C. The recorded data included the components of shear modulus G' (storage modulus) and the viscous component G" (loss modulus). The component tan (delta) were calculated at frequency 1.2 rad/s by dividing G" to G'.

The results are shown in Table 9.

TABLE 9

Rheological analysis.

| | Control product | Dairy SOS control | Inventive product | Inventive product | Inventive product |
|---|---|---|---|---|---|
| Measured pH (at time of analysis) | 4.71 | 5.85 | 4.79 | 5.51 | 5.62 |
| Storage modulus G' (Pa at 1.2 rad/s) | 67721 | 42676 | 35648 | 21958 | 53116 |
| Loss modulus G" (Pa at 1.2 rad/s) | 5915 | 13775 | 5330 | 4626 | 10598 |
| Tan δ (at freq 1.2 rad/s) | 0.087 | 0.323 | 0.15 | 0.211 | 0.20 |

Sensory Properties

The sensory properties of the prepared samples were evaluated by a team of 8 judges experienced in grading pasteurized processed cheese slices. The judges evaluated all samples for flavour including salt, acid, bitter, sweet, intensity of starch flavour, and any noticeable defects, such as oxidized flavours. Additionally, the judges evaluated the cheese samples for firmness and mouthfeel.

The judges generally found the sensory properties of the inventive products to be similar.

Other observations included that:
a) the flavour of the inventive samples was less "powdery" with a reduced starch flavour compared with the control product;
b) the fracturability and mouthfeel of the inventive samples more closely resembled a typical cheddar SOS cheese than the control sample; and c) the firmness and elasticity of the inventive samples more closely resembled a typical cheddar SOS cheese than the control sample.

Example 4

This example describes the preparation of processed cheese-like products of the invention.

Protein Sources $\alpha_s$-Casein enriched and $\beta$-casein enriched fractions were obtained as described in Example 1. The total protein, total casein and casein fraction content for these fractions are provided in Table 3.

Formulations

Table 10 shows the formulations of the processed cheese-like products prepared according to the method outlined below, while Table 11 shows the calculated final product composition.

TABLE 10

Formulations of processed cheese-like samples made from $\alpha_s$-casein enriched and $\beta$-casein enriched fractions

| Component | 0% Protein | 1% Protein high alpha-Cn | 3% Protein high alpha-Cn | 3% Protein 1:1 alpha:beta-Cn | 3% Protein high beta-Cn | 5% Protein high alpha-Cn |
|---|---|---|---|---|---|---|
| Water | 51.61 | 43.05 | 25.46 | 26.50 | 26.80 | 7.87 |
| Coconut fat | 19.13 | 19.13 | 19.13 | 19.13 | 19.13 | 19.13 |
| Modified potato starch - oxidized, thin boiling (e1404) | 15.10 | 15.10 | 15.10 | 15.10 | 15.10 | 15.10 |
| Modified Potato starch - OSA (e1450) | 4.23 | 4.23 | 4.23 | 4.23 | 4.23 | 4.23 |
| Modified potato starch - acetylated distarch phosphate (e1414) | 3.12 | 3.12 | 3.12 | 3.12 | 3.12 | 3.12 |
| $\alpha_s$-Casein enriched fraction solution (10.3% protein) | | 9.60 | 29.33 | 6.90 | | 49.05 |
| $\beta$-Casein enriched fraction solution (10.8% protein) | | | | 21.40 | 28.00 | |
| Salt | 1.01 | 1.01 | 1.01 | 1.01 | 1.01 | 1.01 |
| Potassium sorbate | 0.25 | 0.25 | 0.25 | 0.25 | 0.25 | 0.25 |
| Carrageenan | 0.16 | 0.16 | 0.16 | 0.16 | 0.16 | 0.16 |
| Lactose | 5.38 | 4.34 | 2.20 | 2.19 | 2.19 | 0.07 |
| Citric acid | | As required | As required | As required | As required | As required |
| Trisodium phosphate (TSP) | | As required | As required | As required | As required | As required |
| Total | 100% by weight | 100% by weight | 100% by weight | 100% by weight | 100% by weight | 100% by weight |

TABLE 11

Compositional analysis of processed cheese-like samples made from $\alpha_s$-casein enriched and $\beta$-casein enriched fractions - Base 1 (potato starch)

| Component | 0% Protein Dairy protein free | 1% Protein high alpha-Cn $\alpha$-Enriched fraction | 3% Protein high alpha-Cn $\alpha$-Enriched fraction | 3% Protein 1:1 alpha:beta-Cn $\alpha$-Enriched & $\beta$-Enriched fractions | 3% Protein high beta-Cn $\beta$-Enriched fraction | 5% Protein high alpha-Cn $\alpha$-Enriched fraction |
|---|---|---|---|---|---|---|
| Moisture (g/100 g) | 55.59 | 55.59 | 55.59 | 55.59 | 55.59 | 55.59 |
| Total solids (g/100 g) | 44.41 | 44.41 | 44.41 | 44.41 | 44.41 | 44.41 |
| Fat (g/100 g) | 19.15 | 19.16 | 19.17 | 19.16 | 19.15 | 19.18 |
| Total protein (g/100 g) | 0.03 | 1.00 | 3.00 | 3.00 | 3.00 | 5.00 |
| $\alpha_s$-Casein (g/100 g) | 0.00 | 0.81 | 2.48 | 1.29 | 0.93 | 4.15 |
| $\beta$-Casein g/100 g) | 0.00 | 0.08 | 0.26 | 1.29 | 1.61 | 0.43 |
| $\kappa$-Casein (g/100 g) | 0.00 | 0.08 | 0.24 | 0.38 | 0.43 | 0.40 |
| Total casein (g/100 g) | 0.00 | 0.97 | 2.97 | 2.97 | 2.97 | 4.97 |
| Whey protein (g/100 g) | 0.00 | 0.00 | 0.00 | 0.00 | 0.00 | 0.00 |
| Carbohydrate (total)(g/100 g) | 23.85 | 22.81 | 20.67 | 20.66 | 20.66 | 18.54 |
| Starch solids (g/100 g) | 18.39 | 18.39 | 18.39 | 18.39 | 18.39 | 18.39 |
| Carrageenan (%) | 0.16 | 0.16 | 0.16 | 0.16 | 0.16 | 0.16 |
| Lactose (g/100 g) | 5.11 | 4.12 | 2.09 | 2.08 | 2.08 | 0.07 |
| Fibre (g/100 g) | 0.07 | 0.07 | 0.07 | 0.07 | 0.07 | 0.07 |
| Sugars (g/100 g) | 5.39 | 4.35 | 2.21 | 2.20 | 2.20 | 0.08 |
| Ash (g/100 g) | 0.64 | 0.64 | 0.64 | 0.64 | 0.64 | 0.64 |
| Potassium sorbate[a] (%) | 0.25 | 0.25 | 0.25 | 0.25 | 0.25 | 0.25 |
| Salt (%) | 1.01 | 1.01 | 1.01 | 1.01 | 1.01 | 1.01 |
| pH (Lab) | 5.06 | 5.08 | 5.12 | 5.18 | 5.24 | 5.19 |
| Ca (mg/100 g) | 1.56 | 3.44 | 7.29 | 2.97 | 1.65 | 11.14 |
| Na (mg/100 g) | 433.00 | 432.85 | 432.52 | 432.52 | 432.52 | 432.20 |

[a]Potassium sorbate is also included in the ash content.

Method of Manufacture

Processed cheese manufacture proceeded as follows:
a) Hydrating each individual protein source by
   i) dispersing each protein into water at an appropriate temperature with sufficient agitation to create separate solutions with about 89.5% moisture, and about 10.5% solids:
   ii) The $\alpha_s$-casein enriched casein source solution was made by heating it to 50° C., and adjusting to pH 8 with TSP.
   iii) The β-casein enriched protein source solution was made by heating it to 20° C., adjusting to pH 8 with TSP.
   iv) each solution was held quiescently overnight at refrigeration temperatures from 4 to 5° C.
b) Processed cheese manufacture continued the following day by
   i) heating hydrogenated coconut fat (Confat 92) to 60° C. until completely melted,
   ii) transferring the required amount of protein solution to a Thermomix cooker/mixer, and heating up to 60° C.,
   iii) adding the required amount of the molten coconut fat into the protein solution, then uniformly blending the mixture to produce a uniform blend. Add the remaining water and mix until temperature reaches 60° C.,
   iv) adding all of the remaining ingredients including starches, carrageenan, salt, lactose and potassium sorbate and blend to a uniform paste at 60° C.,
   v) heating the blended ingredients to 85° C. at a low shear rate (speed setting 2 on the Thermomix), and
   vi) increasing the mixing speed immediately when the temperature reached 85° C. (speed setting 4.0 on the Thermomix) and mixing for 5 minutes,
c) The pH of the cooked product was adjusted by
   i) removing a subsample of product and allowing the subsample to cool, while continuing to mix blend in cooker at low shear,
   ii) measuring the pH when the subsample temperature was ≤65° C.,
   iii) reducing the cooker blend sample to target in process pH of 5.2 by adding citric acid, or increasing the cooker blend pH by adding trisodium phosphate,
   iv) total cook time including pH adjustment was 10 minutes in total.
d) Pouring hot cooked product (85° C.) into suitable plastic containers,
e) Sealing the containers, and
f) Refrigerating the product until further use in testing, cutting into slices as required.

Properties of processed cheese-like products of the invention

Table 12 shows the melt, firmness, and viscosity of the processed cheese-like product.

Example 5

This example describes the preparation of processed cheese-like products of the invention.

Protein Sources $\alpha_s$-Casein enriched and β-casein enriched fractions were obtained as described in Example 1. The total protein, total casein, casein fraction content, and lactose content for these fractions are provided in Table 3.

Method of Manufacture

Processed cheese was manufactured as described in Example 4.

Formulation and Composition of Processed Cheese-Like Products

Formulations of processed cheese-like products of the invention are presented in Table 13.

TABLE 13

Formulations of processed cheese-like samples made from $\alpha_s$-casein enriched fractions

| Component | 0% Protein | 1% Protein high alpha-Cn | 5% Protein high alpha-Cn |
|---|---|---|---|
| Water | 51.95 | 43.39 | 8.21 |
| Coconut fat | 19.13 | 19.13 | 19.13 |
| Modified potato starch - oxidised, thin boiling (e1404) | 15.10 | 15.10 | 15.10 |
| Modified maize starch - OSA (e1450) | 4.32 | 4.32 | 4.32 |
| Modified tapioca starch - hydroxypropyl distarch phosphate (e1442) | 2.71 | 2.71 | 2.71 |
| $\alpha_s$-Casein enriched fraction solution 10.3% protein) | | 9.60 | 49.05 |
| Salt | 1.01 | 1.01 | 1.01 |
| Potassium sorbate | 0.25 | 0.25 | 0.25 |
| Locust bean gum | 0.15 | 0.15 | 0.15 |
| Lactose | 5.38 | 4.34 | 0.07 |
| Citric acid | | As required | As required |
| Trisodium phosphate (TSP) | | As required | As required |
| Total | 100% by weight | 100% by weight | 100% by weight |

Table 14 shows the target compositions of processed cheese-like products made by the above method.

TABLE 14

Composition of processed cheese-like products (Base 2)

| Component | 0% Protein Dairy protein free | 1% Protein high alpha-Cn α-Enriched fraction | 5% Protein high alpha-Cn α-Enriched fraction |
|---|---|---|---|
| Moisture (g/100 g) | 55.59 | 55.59 | 55.59 |
| Total solids (g/100 g) | 44.41 | 44.41 | 44.41 |

TABLE 12

Melt, Firmness and Viscosity of processed cheese-like products of the invention (Base 1)

| | 0% Protein | 1% Protein high alpha-Cn | 3% Protein high alpha-Cn | 3% Protein 1:1 alpha:beta-Cn | 3% Protein high beta-Cn | 5% Protein high alpha-Cn |
|---|---|---|---|---|---|---|
| Melt (Sch test units) | 11.5 | 9.3 | 6.4 | 6.9 | 5.9 | 1.4 |
| Penetrometer firmness (N) | 6.3 | 7.3 | 9.7 | 11.4 | 11.0 | 14.2 |
| $\eta_{Hot}$ (mPas)[a] | 781 | 841 | 1143 | 1277 | 1162 | 1203 |

[a] $\eta_{Hot}$ = cheese viscosity measured at 85° C. in a Rapid Visco Analyser RVA4 (Newport Scientific, Warriewood, NSW).

TABLE 14-continued

Composition of processed cheese-like products (Base 2)

| Component | 0% Protein Dairy protein free | 1% Protein high alpha-Cn α-Enriched fraction | 5% Protein high alpha-Cn α-Enriched fraction |
|---|---|---|---|
| Fat (g/100 g) | 19.16 | 19.16 | 19.18 |
| Total protein (g/100 g) | 0.03 | 1.00 | 5.00 |
| $\alpha_s$-Casein (g/100 g) | 0.000 | 0.812 | 4.147 |
| β-Casein g/100 g) | 0.000 | 0.084 | 0.428 |
| κ-Casein (g/100 g) | 0.000 | 0.078 | 0.397 |
| p-κ-Casein (g/100 g) | 0.000 | 0.000 | 0.000 |
| Total Casein (g/100 g) | 0.000 | 0.973 | 4.974 |
| Whey protein (g/100 g) | 0.00 | 0.00 | 0.00 |
| Carbohydrate (total) (g/100 g) | 23.98 | 22.94 | 18.67 |
| Starch solids (g/100 g) | 18.46 | 18.46 | 18.46 |
| Locust bean gum (%) | 0.15 | 0.15 | 0.15 |
| Lactose (g/100 g) | 5.11 | 4.12 | 0.07 |
| Fibre (g/100 g) | 0.14 | 0.14 | 0.14 |
| Sugars (g/100 g) | 5.38 | 4.34 | 0.07 |
| Ash (g/100 g) | 0.52 | 0.52 | 0.52 |
| Potassium sorbate[a] (%) | 0.25 | 0.25 | 0.25 |
| Salt (%) | 1.01 | 1.01 | 1.01 |
| pH (target) | 5.10 | 5.10 | 5.10 |
| pH (lab) | 5.22 | 5.07 | 5.21 |
| Ca (mg/100 g) | 1.56 | 3.16 | 9.76 |
| Na (mg/100 g) | 424 | 424 | 423 |

[a]Potassium sorbate is also included in the ash content.

Properties of Processed Cheese-Like Products of the Invention

Firmness was measured by penetrometry as outlined in previous examples. Melt was measured using the Schreiber Test method as outlined above.

TABLE 15

Melt, Firmness and viscosity of processed cheese-like products of the invention (Base 2)

| | 0% Protein | 1% Protein high alpha-Cn | 5% Protein high alpha-Cn |
|---|---|---|---|
| Melt (Sch test units) | 9.3 | 9.3 | 9.8 |
| Penetrometer firmness (N) | 4.8 | 7.2 | 10.2 |
| $\eta_{Hot}$ (mPas)[a] | 463 | 510 | 836 |

[a]$\eta_{Hot}$ = cheese viscosity measured at 85° C. in a Rapid Visco Analyser RVA4 (Newport Scientific, Warriewood, NSW).

Sensory Properties

The sensory properties of the prepared samples were evaluated by a team of 6 judges experienced in grading pasteurized processed cheese slices. The judges evaluated all samples for flavour including salt, acid, bitter, sweet, intensity of starch flavour, and any noticeable defects, such as oxidized flavours. Additionally, the judges evaluated the cheese samples for firmness and mouthfeel.

The judges generally found the products containing 1% protein were the most similar to a dairy SOS control. Higher levels of protein provided higher firmness, but these products tended to be slower to melt in the mouth and have a drier mouthfeel.

Any documents referred to herein including, but not limited to, patents, patent applications, journal articles, books, and the like, are incorporated herein by reference in their entirety. Any section headings used herein are for organizational purposes only and are not to be construed as limiting the subject matter described.

Although the invention has been described by way of example and with reference to particular embodiments, it is to be understood that modifications and/or improvements may be made without departing from the scope or spirit of the invention.

The invention claimed is:

1. A cheese or cheese-like product comprising:
   a) casein, wherein the casein comprises $\alpha_s$-casein, β-casein, or a combination thereof, and wherein the $\alpha_s$-casein, β-casein, or combination thereof comprises about 0.2 to about 6% by weight of the cheese or cheese like product;
   b) at least about 5% by weight of one or more hydrocolloids, wherein the one or more hydrocolloids comprises one or more starches;
   c) at least about 3% by weight of the one or more starches; and
   d) about 0.2 to about 10% by weight total dairy protein, wherein
   i) the $\alpha_s$-casein comprises at least about 55% by weight of the casein in the cheese or cheese-like product, and/or
   ii) the β-casein comprises at least about 40% by weight of the casein in the cheese or cheese-like product.

2. The cheese or cheese-like product according to claim 1, wherein the $\alpha_s$-casein comprises about 0.2 to about 6% by weight of the cheese or cheese-like product, wherein the $\alpha_s$-casein comprises at least about 55% by weight of the casein in the cheese or cheese-like product, and wherein the cheese or cheese-like product comprises the β-casein, κ-casein, p-κ-casein, or any combination of any two or more thereof.

3. The cheese or cheese-like product according to claim 1, wherein the B-casein comprises about 0.2 to about 6% by weight of the cheese or cheese-like product, wherein the β-casein comprises at least about 40% by weight of the casein in the cheese or cheese-like product, and wherein the cheese or cheese-like product comprises the $\alpha_s$-casein, κ-casein, p-κ-casein, or any combination of any two or more thereof.

4. The cheese or cheese-like product according to claim 1, wherein the $\alpha_s$-casein comprises $\alpha_{s1}$-casein, $\alpha_{s2}$-casein, or a combination thereof.

5. The cheese or cheese-like product according to claim 1, comprising:
   a) from about 0.2 to about 20%, about 0.2 to about 15% or about 0.2 to about 10% by weight of the casein;
   b) at least about 10%, 15% or 20% by weight of the one or more hydrocolloids;
   c) from about 0.2 to about 10%, about 0.2 to about 6%, about 0.2 to about 5%, or about 0.2 to about 3% by weight total protein; or
   d) any combination of any two or more of a) to c).

6. The cheese or cheese-like product according to claim 1, wherein the $\alpha_s$-casein and/or β-casein is provided by a protein ingredient comprising an $\alpha_s$-casein enriched fraction, a β-casein enriched fraction, recombinant $\alpha_{s1}$-casein, recombinant $\alpha_{s2}$-casein, recombinant B-casein, or any combination of any two or more thereof.

7. The cheese or cheese-like product of claim 1, wherein the cheese or cheese-like product comprises
   a) at least about 10% by weight of the one or more starches,
   b) at least about 15% by weight of the one or more starches, or
   c) about 5% to about 30% by weight of the one or more starches.

8. The cheese or cheese-like product according to claim 1, wherein the one or more starches are selected from the group comprising potato starch, maize starch, rice starch, tapioca (cassava) starch, wheat starch, pea starch, sweet potato starch, banana starch, barley starch, oat starch, sago starch, amaranth starch, arrowroot starch, canna starch, sorghum starch, chia seed starch, fava bean starch, jackfruit starch, bamboo starch, chickpea starch, cassava starch, carrot starch, and any combination of any two or more thereof.

9. The cheese or cheese-like product according to claim 8, wherein the one or more starches comprises one or more modified starches, selected from the group comprising pre-gelatinised starch, thin-boiling starch, oxidised starch, octenyl succinic anhydride (OSA) modified starch, or a combination of any two or more thereof.

10. The cheese or cheese-like product of claim 1, wherein the one or more hydrocolloids further comprises one or more gums, selected from the group comprising xanthan gum, guar gum, locust bean gum, tragacanth gum, acacia gum, karaya gum, tara gum, gellan gum, konjac gum (konjac mannan), carboxymethylcellulose (CMC), tragacanth, agar, pectin, alginate, carrageenan (κ-carrageenan, ι-carrageenan, λ-carrageenan), Arabic gum, pectin, alginate, flaxseed gum, guar gum, or any combination of any two or more thereof.

11. The cheese or cheese-like product of claim 1, wherein the cheese or cheese-like product comprises one or more non-dairy proteins, the one or more non-dairy proteins comprising or consisting of one or more plant proteins or hydrolysed plant proteins.

12. The cheese or cheese-like product according to claim 1, wherein the cheese or cheese-like product comprises
   a) one or more emulsifying salts,
   b) about 15 to about 65% by weight moisture,
   c) about 0.05 to about 35% by weight lipid, or c)
   d) any combination of any two or more of a)-c).

13. The cheese or cheese-like product of claim 6, wherein the protein ingredient comprises an $\alpha_s$-casein enriched fraction, and wherein:
   a) total casein in the protein ingredient comprises at least about 50% or at least about 75% by weight $\alpha_s$-casein, and/or
   b) the protein ingredient comprises $\alpha_s$-casein and β-casein in a weight ratio of at least about 50:50, preferably at least about 80:20, and/or
   the protein ingredient comprises a β-casein enriched fraction, and wherein:
   c) total casein in the B-casein enriched fraction comprises at least about 50% by weight β-casein, and/or
   d) the β-casein enriched fraction comprises β-casein and $\alpha_s$-casein in a weight ratio of at least about 50:50.

14. The cheese or cheese-like product of claim 1 wherein the cheese or cheese-like product is a processed cheese or processed cheese-like product.

15. A cheese or cheese-like product comprising:
a) casein, wherein the casein comprises $\alpha_s$-casein, wherein the $\alpha_s$-casein comprises about 0.2 to about 6% by weight of the cheese or cheese-like product;
b) at least about 5% by weight of one or more hydrocolloids, comprising at least one starch;
c) at least about 3% by weight of the at least one starch; and
d) about 0.5 to about 20% by weight total protein, wherein the $\alpha_s$-casein comprises
i) at least about 60% of the casein in the cheese or cheese-like product, and/or
ii) at least about 55% by weight of the total protein in the cheese or cheese-like product.

* * * * *

UNITED STATES PATENT AND TRADEMARK OFFICE
CERTIFICATE OF CORRECTION

PATENT NO. : 12,310,382 B2
APPLICATION NO. : 18/280571
DATED : May 27, 2025
INVENTOR(S) : Puryer Coker et al.

It is certified that error appears in the above-identified patent and that said Letters Patent is hereby corrected as shown below:

On the Title Page

Column 2, Line 7, under item (56) Other Publications, delete "of casinate fractions" and insert --of caseinate fractions--.

On Page 2, Column 1, Line 15, under item (56) Other Publications, delete "McSweeney. Sluwer Academic" and insert --McSweeney. Kluwer Academic--.

In the Specification

In Column 18, Line 38, delete "glycosylation and or phosphorylation" and insert --glycosylation and/or phosphorylation--.

In Column 23, Line 34 (Approx.), delete "is a Saccharomycete." and insert --is a Saccharomycetes.--.

In Column 39, Line 35, delete "triphosphate, Kurroll's salt" and insert --triphosphate, Kurrol's salt--.

In Column 41, Line 2, delete "example, glycerine, sorbitol," and insert --example, glycerin, sorbitol,--.

In Column 45, Line 18 (Approx.) (TABLE 5), delete "w/W" and insert --w/w--.

In Column 45, Line 19 (Approx.) (TABLE 5), delete "w/W" and insert --w/w--.

In Column 45, Line 22 (Approx.) (TABLE 5), delete "w/W" and insert --w/w--.

In Column 45, Line 24 (Approx.) (TABLE 5), delete "w/W" and insert --w/w--.

Signed and Sealed this
Twelfth Day of August, 2025

Coke Morgan Stewart
*Acting Director of the United States Patent and Trademark Office*

CERTIFICATE OF CORRECTION (continued)
U.S. Pat. No. 12,310,382 B2

In Column 53, Line 13 (Approx.) (TABLE 14-continued), delete "β-Casein g/100 g)" and insert --β-Casein (g/100 g)--.

In the Claims

In Column 105, Claim 3, Line 38, delete "the B-casein comprises" and insert --the β-casein comprises--.

In Column 105, Claim 6, Line 62, delete "recombinant B-casein" and insert --recombinant β-casein--.

In Column 106, Claim 12, Line 48, delete "lipid, or c)" and insert --lipid, or--.

In Column 106, Claim 13, Line 61, delete "the B-casein enriched" and insert --the β-casein enriched--.

SEQUENCE LISTING

```
<160> NUMBER OF SEQ ID NOS: 40

<210> SEQ ID NO 1
<211> LENGTH: 214
<212> TYPE: PRT
<213> ORGANISM: Bos taurus
<220> FEATURE:
<221> NAME/KEY: SIGNAL
<222> LOCATION: (1)..(15)

<400> SEQUENCE: 1

Met Lys Leu Leu Ile Leu Thr Cys Leu Val Ala Val Ala Leu Ala Arg
1               5                   10                  15

Pro Lys His Pro Ile Lys His Gln Gly Leu Pro Gln Glu Val Leu Asn
                20                  25                  30

Glu Asn Leu Leu Arg Phe Phe Val Ala Pro Phe Pro Glu Val Phe Gly
            35                  40                  45

Lys Glu Lys Val Asn Glu Leu Ser Lys Asp Ile Gly Ser Glu Ser Thr
        50                  55                  60

Glu Asp Gln Ala Met Glu Asp Ile Lys Gln Met Glu Ala Glu Ser Ile
65                  70                  75                  80

Ser Ser Ser Glu Glu Ile Val Pro Asn Ser Val Glu Gln Lys His Ile
                85                  90                  95

Gln Lys Glu Asp Val Pro Ser Glu Arg Tyr Leu Gly Tyr Leu Glu Gln
```

```
                    100                 105                 110
Leu Leu Arg Leu Lys Lys Tyr Lys Val Pro Gln Leu Glu Ile Val Pro
            115                 120                 125

Asn Ser Ala Glu Glu Arg Leu His Ser Met Lys Glu Gly Ile His Ala
        130                 135                 140

Gln Gln Lys Glu Pro Met Ile Gly Val Asn Gln Glu Leu Ala Tyr Phe
145                 150                 155                 160

Tyr Pro Glu Leu Phe Arg Gln Phe Tyr Gln Leu Asp Ala Tyr Pro Ser
                165                 170                 175

Gly Ala Trp Tyr Tyr Val Pro Leu Gly Thr Gln Tyr Thr Asp Ala Pro
            180                 185                 190

Ser Phe Ser Asp Ile Pro Asn Pro Ile Gly Ser Glu Asn Ser Glu Lys
        195                 200                 205

Thr Thr Met Pro Leu Trp
        210

<210> SEQ ID NO 2
<211> LENGTH: 199
<212> TYPE: PRT
<213> ORGANISM: Bos taurus

<400> SEQUENCE: 2

Arg Pro Lys His Pro Ile Lys His Gln Gly Leu Pro Gln Glu Val Leu
1               5                   10                  15

Asn Glu Asn Leu Leu Arg Phe Phe Val Ala Pro Phe Pro Glu Val Phe
            20                  25                  30

Gly Lys Glu Lys Val Asn Glu Leu Ser Lys Asp Ile Gly Ser Glu Ser
        35                  40                  45

Thr Glu Asp Gln Ala Met Glu Asp Ile Lys Gln Met Glu Ala Glu Ser
    50                  55                  60

Ile Ser Ser Ser Glu Glu Ile Val Pro Asn Ser Val Glu Gln Lys His
65                  70                  75                  80

Ile Gln Lys Glu Asp Val Pro Ser Glu Arg Tyr Leu Gly Tyr Leu Glu
                85                  90                  95

Gln Leu Leu Arg Leu Lys Lys Tyr Lys Val Pro Gln Leu Glu Ile Val
            100                 105                 110

Pro Asn Ser Ala Glu Glu Arg Leu His Ser Met Lys Glu Gly Ile His
        115                 120                 125

Ala Gln Gln Lys Glu Pro Met Ile Gly Val Asn Gln Glu Leu Ala Tyr
    130                 135                 140

Phe Tyr Pro Glu Leu Phe Arg Gln Phe Tyr Gln Leu Asp Ala Tyr Pro
145                 150                 155                 160

Ser Gly Ala Trp Tyr Tyr Val Pro Leu Gly Thr Gln Tyr Thr Asp Ala
                165                 170                 175

Pro Ser Phe Ser Asp Ile Pro Asn Pro Ile Gly Ser Glu Asn Ser Glu
            180                 185                 190

Lys Thr Thr Met Pro Leu Trp
        195

<210> SEQ ID NO 3
<211> LENGTH: 214
<212> TYPE: PRT
<213> ORGANISM: Ovis aries
<220> FEATURE:
<221> NAME/KEY: SIGNAL
<222> LOCATION: (1)..(15)
```

<400> SEQUENCE: 3

Met Lys Leu Leu Ile Leu Thr Cys Leu Val Ala Val Ala Leu Ala Arg
1               5                   10                  15

Pro Lys His Pro Ile Lys His Gln Gly Leu Ser Ser Glu Val Leu Asn
            20                  25                  30

Glu Asn Leu Leu Arg Phe Val Val Ala Pro Phe Pro Glu Val Phe Arg
        35                  40                  45

Lys Glu Asn Ile Asn Glu Leu Ser Lys Asp Ile Gly Ser Glu Ser Ile
50                  55                  60

Glu Asp Gln Ala Met Glu Asp Ala Lys Gln Met Lys Ala Gly Ser Ser
65                  70                  75                  80

Ser Ser Ser Glu Glu Ile Val Pro Asn Ser Ala Glu Gln Lys Tyr Ile
            85                  90                  95

Gln Lys Glu Asp Val Pro Ser Glu Arg Tyr Leu Gly Tyr Leu Glu Gln
            100                 105                 110

Leu Leu Arg Leu Lys Lys Tyr Asn Val Pro Gln Leu Glu Ile Val Pro
        115                 120                 125

Lys Ser Ala Glu Glu Gln Leu His Ser Met Lys Glu Gly Asn Pro Ala
130                 135                 140

His Gln Lys Gln Pro Met Ile Ala Val Asn Gln Glu Leu Ala Tyr Phe
145                 150                 155                 160

Tyr Pro Gln Leu Phe Arg Gln Phe Tyr Gln Leu Asp Ala Tyr Pro Ser
                165                 170                 175

Gly Ala Trp Tyr Tyr Leu Pro Leu Gly Thr Gln Tyr Thr Asp Ala Pro
            180                 185                 190

Ser Phe Ser Asp Ile Pro Asn Pro Ile Gly Ser Glu Asn Ser Gly Lys
        195                 200                 205

Ile Thr Met Pro Leu Trp
            210

<210> SEQ ID NO 4
<211> LENGTH: 199
<212> TYPE: PRT
<213> ORGANISM: Ovis aries

<400> SEQUENCE: 4

Arg Pro Lys His Pro Ile Lys His Gln Gly Leu Ser Ser Glu Val Leu
1               5                   10                  15

Asn Glu Asn Leu Leu Arg Phe Val Val Ala Pro Phe Pro Glu Val Phe
            20                  25                  30

Arg Lys Glu Asn Ile Asn Glu Leu Ser Lys Asp Ile Gly Ser Glu Ser
        35                  40                  45

Ile Glu Asp Gln Ala Met Glu Asp Ala Lys Gln Met Lys Ala Gly Ser
50                  55                  60

Ser Ser Ser Ser Glu Glu Ile Val Pro Asn Ser Ala Glu Gln Lys Tyr
65                  70                  75                  80

Ile Gln Lys Glu Asp Val Pro Ser Glu Arg Tyr Leu Gly Tyr Leu Glu
            85                  90                  95

Gln Leu Leu Arg Leu Lys Lys Tyr Asn Val Pro Gln Leu Glu Ile Val
            100                 105                 110

Pro Lys Ser Ala Glu Glu Gln Leu His Ser Met Lys Glu Gly Asn Pro
        115                 120                 125

Ala His Gln Lys Gln Pro Met Ile Ala Val Asn Gln Glu Leu Ala Tyr
130                 135                 140

```
Phe Tyr Pro Gln Leu Phe Arg Gln Phe Tyr Gln Leu Asp Ala Tyr Pro
145                 150                 155                 160

Ser Gly Ala Trp Tyr Tyr Leu Pro Leu Gly Thr Gln Tyr Thr Asp Ala
                165                 170                 175

Pro Ser Phe Ser Asp Ile Pro Asn Pro Ile Gly Ser Glu Asn Ser Gly
            180                 185                 190

Lys Ile Thr Met Pro Leu Trp
            195

<210> SEQ ID NO 5
<211> LENGTH: 214
<212> TYPE: PRT
<213> ORGANISM: Capra hircus
<220> FEATURE:
<221> NAME/KEY: SIGNAL
<222> LOCATION: (1)..(15)

<400> SEQUENCE: 5

Met Lys Leu Leu Ile Leu Thr Cys Leu Val Ala Val Ala Leu Ala Arg
1               5                   10                  15

Pro Lys His Pro Ile Asn His Arg Gly Leu Ser Pro Glu Val Pro Asn
                20                  25                  30

Glu Asn Leu Leu Arg Phe Val Val Ala Pro Phe Pro Glu Val Phe Arg
            35                  40                  45

Lys Glu Asn Ile Asn Glu Leu Ser Lys Asp Ile Gly Ser Glu Ser Thr
50                  55                  60

Glu Asp Gln Ala Met Glu Asp Ala Lys Gln Met Lys Ala Gly Ser Ser
65                  70                  75                  80

Ser Ser Ser Glu Glu Ile Val Pro Asn Ser Ala Glu Gln Lys Tyr Ile
                85                  90                  95

Gln Lys Glu Asp Val Pro Ser Glu Arg Tyr Leu Gly Tyr Leu Glu Gln
            100                 105                 110

Leu Leu Arg Leu Lys Lys Tyr Asn Val Pro Gln Leu Glu Ile Val Pro
        115                 120                 125

Lys Ser Ala Glu Glu Gln Leu His Ser Met Lys Glu Gly Asn Pro Ala
130                 135                 140

His Gln Lys Gln Pro Met Ile Ala Val Asn Gln Glu Leu Ala Tyr Phe
145                 150                 155                 160

Tyr Pro Gln Leu Phe Arg Gln Phe Tyr Gln Leu Asp Ala Tyr Pro Ser
                165                 170                 175

Gly Ala Trp Tyr Tyr Leu Pro Leu Gly Thr Gln Tyr Thr Asp Ala Pro
            180                 185                 190

Ser Phe Ser Asp Ile Pro Asn Pro Ile Gly Ser Glu Asn Ser Gly Lys
        195                 200                 205

Thr Thr Met Pro Leu Trp
    210

<210> SEQ ID NO 6
<211> LENGTH: 199
<212> TYPE: PRT
<213> ORGANISM: Capra hircus

<400> SEQUENCE: 6

Arg Pro Lys His Pro Ile Asn His Arg Gly Leu Ser Pro Glu Val Pro
1               5                   10                  15

Asn Glu Asn Leu Leu Arg Phe Val Val Ala Pro Phe Pro Glu Val Phe
                20                  25                  30
```

```
Arg Lys Glu Asn Ile Asn Glu Leu Ser Lys Asp Ile Gly Ser Glu Ser
                35                  40                  45

Thr Glu Asp Gln Ala Met Glu Asp Ala Lys Gln Met Lys Ala Gly Ser
 50                      55                  60

Ser Ser Ser Ser Glu Glu Ile Val Pro Asn Ser Ala Glu Gln Lys Tyr
 65                  70                  75                  80

Ile Gln Lys Glu Asp Val Pro Ser Glu Arg Tyr Leu Gly Tyr Leu Glu
                85                  90                  95

Gln Leu Leu Arg Leu Lys Lys Tyr Asn Val Pro Gln Leu Glu Ile Val
                100                 105                 110

Pro Lys Ser Ala Glu Glu Gln Leu His Ser Met Lys Glu Gly Asn Pro
                115                 120                 125

Ala His Gln Lys Gln Pro Met Ile Ala Val Asn Gln Glu Leu Ala Tyr
 130                     135                 140

Phe Tyr Pro Gln Leu Phe Arg Gln Phe Tyr Gln Leu Asp Ala Tyr Pro
 145                     150                 155                 160

Ser Gly Ala Trp Tyr Tyr Leu Pro Leu Gly Thr Gln Tyr Thr Asp Ala
                165                 170                 175

Pro Ser Phe Ser Asp Ile Pro Asn Pro Ile Gly Ser Glu Asn Ser Gly
                180                 185                 190

Lys Thr Thr Met Pro Leu Trp
                195

<210> SEQ ID NO 7
<211> LENGTH: 214
<212> TYPE: PRT
<213> ORGANISM: Bubalus bubalis
<220> FEATURE:
<221> NAME/KEY: SIGNAL
<222> LOCATION: (1)..(15)

<400> SEQUENCE: 7

Met Lys Leu Leu Ile Leu Thr Cys Leu Val Ala Val Ala Leu Ala Arg
 1               5                  10                  15

Pro Lys Gln Pro Ile Lys His Gln Gly Leu Pro Gln Gly Val Leu Asn
                20                  25                  30

Glu Asn Leu Leu Arg Phe Phe Val Ala Pro Phe Pro Glu Val Phe Gly
                35                  40                  45

Lys Glu Lys Val Asn Glu Leu Ser Thr Asp Ile Gly Ser Glu Ser Thr
 50                      55                  60

Glu Asp Gln Ala Met Glu Asp Ile Lys Gln Met Glu Ala Glu Ser Ile
 65                      70                  75                  80

Ser Ser Ser Glu Glu Ile Val Pro Ile Ser Val Glu Gln Lys His Ile
                85                  90                  95

Gln Lys Glu Asp Val Pro Ser Glu Arg Tyr Leu Gly Tyr Leu Glu Gln
                100                 105                 110

Leu Leu Arg Leu Lys Lys Tyr Asn Val Pro Gln Leu Glu Ile Val Pro
                115                 120                 125

Asn Leu Ala Glu Glu Gln Leu His Ser Met Lys Glu Gly Ile His Ala
 130                     135                 140

Gln Gln Lys Glu Pro Met Ile Gly Val Asn Gln Glu Leu Ala Tyr Phe
 145                     150                 155                 160

Tyr Pro Gln Leu Phe Arg Gln Phe Tyr Gln Leu Asp Ala Tyr Pro Ser
                165                 170                 175

Gly Ala Trp Tyr Tyr Val Pro Leu Gly Thr Gln Tyr Pro Asp Ala Pro
                180                 185                 190
```

```
Ser Phe Ser Asp Ile Pro Asn Pro Ile Gly Ser Glu Asn Ser Glu Lys
    195                 200                 205

Thr Thr Met Pro Leu Trp
    210
```

<210> SEQ ID NO 8
<211> LENGTH: 199
<212> TYPE: PRT
<213> ORGANISM: Bubalus bubalis

<400> SEQUENCE: 8

```
Arg Pro Lys Gln Pro Ile Lys His Gln Gly Leu Pro Gln Gly Val Leu
1               5                   10                  15

Asn Glu Asn Leu Leu Arg Phe Phe Val Ala Pro Phe Pro Glu Val Phe
            20                  25                  30

Gly Lys Glu Lys Val Asn Glu Leu Ser Thr Asp Ile Gly Ser Glu Ser
        35                  40                  45

Thr Glu Asp Gln Ala Met Glu Asp Ile Lys Gln Met Glu Ala Glu Ser
    50                  55                  60

Ile Ser Ser Ser Glu Glu Ile Val Pro Ile Ser Val Glu Gln Lys His
65                  70                  75                  80

Ile Gln Lys Glu Asp Val Pro Ser Glu Arg Tyr Leu Gly Tyr Leu Glu
                85                  90                  95

Gln Leu Leu Arg Leu Lys Lys Tyr Asn Val Pro Gln Leu Glu Ile Val
            100                 105                 110

Pro Asn Leu Ala Glu Glu Gln Leu His Ser Met Lys Glu Gly Ile His
        115                 120                 125

Ala Gln Gln Lys Glu Pro Met Ile Gly Val Asn Gln Glu Leu Ala Tyr
    130                 135                 140

Phe Tyr Pro Gln Leu Phe Arg Gln Phe Tyr Gln Leu Asp Ala Tyr Pro
145                 150                 155                 160

Ser Gly Ala Trp Tyr Tyr Val Pro Leu Gly Thr Gln Tyr Pro Asp Ala
                165                 170                 175

Pro Ser Phe Ser Asp Ile Pro Asn Pro Ile Gly Ser Glu Asn Ser Glu
            180                 185                 190

Lys Thr Thr Met Pro Leu Trp
        195
```

<210> SEQ ID NO 9
<211> LENGTH: 212
<212> TYPE: PRT
<213> ORGANISM: Equus caballus
<220> FEATURE:
<221> NAME/KEY: SIGNAL
<222> LOCATION: (1)..(15)

<400> SEQUENCE: 9

```
Met Lys Leu Leu Ile Leu Thr Cys Leu Val Ala Val Ala Leu Ala Arg
1               5                   10                  15

Pro Lys Leu Pro His Arg Gln Pro Glu Ile Ile Gln Asn Glu Gln Asp
            20                  25                  30

Ser Arg Glu Lys Val Leu Lys Glu Arg Lys Phe Pro Ser Phe Ala Leu
        35                  40                  45

Glu Tyr Ile Asn Glu Leu Asn Arg Gln Arg Glu Leu Leu Lys Glu Lys
    50                  55                  60

Gln Lys Asp Glu His Lys Glu Tyr Leu Ile Glu Asp Pro Glu Gln Gln
65                  70                  75                  80
```

```
Glu Ser Ser Ser Thr Ser Ser Ser Glu Glu Val Val Pro Ile Asn Thr
                85                  90                  95

Glu Gln Lys Arg Ile Pro Arg Glu Asp Met Leu Tyr Gln His Thr Leu
            100                 105                 110

Glu Gln Leu Arg Arg Leu Ser Lys Tyr Asn Gln Leu Gln Leu Gln Ala
        115                 120                 125

Ile His Ala Gln Glu Gln Leu Ile Arg Met Lys Glu Asn Ser Gln Arg
    130                 135                 140

Lys Pro Met Arg Val Val Asn Gln Glu Gln Ala Tyr Phe Tyr Leu Glu
145                 150                 155                 160

Pro Phe Gln Pro Ser Tyr Gln Leu Asp Val Tyr Pro Tyr Ala Ala Trp
                165                 170                 175

Phe His Pro Ala Gln Ile Met Gln His Val Ala Tyr Ser Pro Phe His
            180                 185                 190

Asp Thr Ala Lys Leu Ile Ala Ser Glu Asn Ser Glu Lys Thr Asp Ile
        195                 200                 205

Ile Pro Glu Trp
    210

<210> SEQ ID NO 10
<211> LENGTH: 197
<212> TYPE: PRT
<213> ORGANISM: Equus caballus

<400> SEQUENCE: 10

Arg Pro Lys Leu Pro His Arg Gln Pro Glu Ile Ile Gln Asn Glu Gln
1               5                   10                  15

Asp Ser Arg Glu Lys Val Leu Lys Glu Arg Lys Phe Pro Ser Phe Ala
            20                  25                  30

Leu Glu Tyr Ile Asn Glu Leu Asn Arg Gln Arg Glu Leu Leu Lys Glu
        35                  40                  45

Lys Gln Lys Asp Glu His Lys Glu Tyr Leu Ile Glu Asp Pro Glu Gln
    50                  55                  60

Gln Glu Ser Ser Ser Thr Ser Ser Ser Glu Glu Val Val Pro Ile Asn
65                  70                  75                  80

Thr Glu Gln Lys Arg Ile Pro Arg Glu Asp Met Leu Tyr Gln His Thr
                85                  90                  95

Leu Glu Gln Leu Arg Arg Leu Ser Lys Tyr Asn Gln Leu Gln Leu Gln
            100                 105                 110

Ala Ile His Ala Gln Glu Gln Leu Ile Arg Met Lys Glu Asn Ser Gln
        115                 120                 125

Arg Lys Pro Met Arg Val Val Asn Gln Glu Gln Ala Tyr Phe Tyr Leu
    130                 135                 140

Glu Pro Phe Gln Pro Ser Tyr Gln Leu Asp Val Tyr Pro Tyr Ala Ala
145                 150                 155                 160

Trp Phe His Pro Ala Gln Ile Met Gln His Val Ala Tyr Ser Pro Phe
                165                 170                 175

His Asp Thr Ala Lys Leu Ile Ala Ser Glu Asn Ser Glu Lys Thr Asp
            180                 185                 190

Ile Ile Pro Glu Trp
        195

<210> SEQ ID NO 11
<211> LENGTH: 230
<212> TYPE: PRT
```

<213> ORGANISM: Camelus ferus
<220> FEATURE:
<221> NAME/KEY: SIGNAL
<222> LOCATION: (1)..(15)

<400> SEQUENCE: 11

```
Met Lys Leu Leu Ile Leu Thr Cys Leu Val Ala Val Ala Leu Ala Arg
1               5                   10                  15

Pro Lys Tyr Pro Leu Arg Tyr Pro Glu Val Phe Gln Asn Glu Pro Asp
            20                  25                  30

Ser Ile Glu Glu Val Leu Asn Lys Arg Lys Ile Leu Glu Leu Ala Val
        35                  40                  45

Val Ser Pro Ile Gln Phe Arg Gln Glu Asn Ile Asp Glu Leu Lys Asp
    50                  55                  60

Thr Arg Asn Glu Pro Thr Glu Asp His Ile Met Glu Asp Thr Glu Arg
65                  70                  75                  80

Lys Glu Ser Gly Ser Ser Ser Glu Val Val Ser Ser Thr Thr
                85                  90                  95

Glu Gln Lys Asp Ile Leu Lys Glu Asp Met Pro Ser Gln Arg Tyr Leu
                100                 105                 110

Glu Glu Leu His Arg Leu Asn Lys Tyr Lys Leu Leu Gln Leu Glu Ala
            115                 120                 125

Ile Arg Asp Gln Lys Leu Ile Pro Arg Val Lys Leu Ser Ser His Pro
130                 135                 140

Tyr Leu Glu Gln Leu Tyr Arg Ile Asn Glu Asp Asn His Pro Gln Leu
145                 150                 155                 160

Gly Glu Pro Val Lys Val Val Thr Gln Glu Gln Ala Tyr Phe His Leu
                165                 170                 175

Glu Pro Phe Pro Gln Phe Phe Gln Leu Gly Ala Ser Pro Tyr Val Ala
            180                 185                 190

Trp Tyr Tyr Pro Pro Gln Val Met Gln Tyr Ile Ala His Pro Ser Ser
        195                 200                 205

Tyr Asp Thr Pro Glu Gly Ile Ala Ser Glu Asp Gly Lys Thr Asp
    210                 215                 220

Val Met Pro Gln Trp Trp
225                 230
```

<210> SEQ ID NO 12
<211> LENGTH: 215
<212> TYPE: PRT
<213> ORGANISM: Camelus ferus

<400> SEQUENCE: 12

```
Arg Pro Lys Tyr Pro Leu Arg Tyr Pro Glu Val Phe Gln Asn Glu Pro
1               5                   10                  15

Asp Ser Ile Glu Glu Val Leu Asn Lys Arg Lys Ile Leu Glu Leu Ala
            20                  25                  30

Val Val Ser Pro Ile Gln Phe Arg Gln Glu Asn Ile Asp Glu Leu Lys
        35                  40                  45

Asp Thr Arg Asn Glu Pro Thr Glu Asp His Ile Met Glu Asp Thr Glu
    50                  55                  60

Arg Lys Glu Ser Gly Ser Ser Ser Glu Val Val Ser Ser Thr
65                  70                  75                  80

Thr Glu Gln Lys Asp Ile Leu Lys Glu Asp Met Pro Ser Gln Arg Tyr
                85                  90                  95

Leu Glu Glu Leu His Arg Leu Asn Lys Tyr Lys Leu Leu Gln Leu Glu
```

```
            100                 105                 110
Ala Ile Arg Asp Gln Lys Leu Ile Pro Arg Val Lys Leu Ser Ser His
            115                 120                 125

Pro Tyr Leu Glu Gln Leu Tyr Arg Ile Asn Glu Asp Asn His Pro Gln
            130                 135                 140

Leu Gly Glu Pro Val Lys Val Val Thr Gln Glu Gln Ala Tyr Phe His
145                 150                 155                 160

Leu Glu Pro Phe Pro Gln Phe Phe Gln Leu Gly Ala Ser Pro Tyr Val
                    165                 170                 175

Ala Trp Tyr Tyr Pro Pro Gln Val Met Gln Tyr Ile Ala His Pro Ser
                180                 185                 190

Ser Tyr Asp Thr Pro Glu Gly Ile Ala Ser Glu Asp Gly Gly Lys Thr
            195                 200                 205

Asp Val Met Pro Gln Trp Trp
            210                 215
```

<210> SEQ ID NO 13
<211> LENGTH: 185
<212> TYPE: PRT
<213> ORGANISM: Homo sapiens
<220> FEATURE:
<221> NAME/KEY: SIGNAL
<222> LOCATION: (1)..(15)

<400> SEQUENCE: 13

```
Met Arg Leu Leu Ile Leu Thr Cys Leu Val Ala Val Ala Leu Ala Arg
1               5                   10                  15

Pro Lys Leu Pro Leu Arg Tyr Pro Glu Arg Leu Gln Asn Pro Ser Glu
            20                  25                  30

Ser Ser Glu Pro Ile Pro Leu Glu Ser Arg Glu Glu Tyr Met Asn Gly
        35                  40                  45

Met Asn Arg Gln Arg Asn Ile Leu Arg Glu Lys Gln Thr Asp Glu Ile
    50                  55                  60

Lys Asp Thr Arg Asn Glu Ser Thr Gln Asn Cys Val Val Ala Glu Pro
65                  70                  75                  80

Glu Lys Met Glu Ser Ser Ile Ser Ser Ser Glu Glu Met Ser Leu
                85                  90                  95

Ser Lys Cys Ala Glu Gln Phe Cys Arg Leu Asn Glu Tyr Asn Gln Leu
            100                 105                 110

Gln Leu Gln Ala Ala His Ala Gln Glu Gln Ile Arg Arg Met Asn Glu
            115                 120                 125

Asn Ser His Val Gln Val Pro Phe Gln Gln Leu Asn Gln Leu Ala Ala
            130                 135                 140

Tyr Pro Tyr Ala Val Trp Tyr Tyr Pro Gln Ile Met Gln Tyr Val Pro
145                 150                 155                 160

Phe Pro Pro Phe Ser Asp Ile Ser Asn Pro Thr Ala His Glu Asn Tyr
                    165                 170                 175

Glu Lys Asn Asn Val Met Leu Gln Trp
            180                 185
```

<210> SEQ ID NO 14
<211> LENGTH: 170
<212> TYPE: PRT
<213> ORGANISM: Homo sapiens

<400> SEQUENCE: 14

```
Arg Pro Lys Leu Pro Leu Arg Tyr Pro Glu Arg Leu Gln Asn Pro Ser
```

```
1               5                   10                  15
Glu Ser Ser Glu Pro Ile Pro Leu Glu Ser Arg Glu Tyr Met Asn
                20                  25                  30

Gly Met Asn Arg Gln Arg Asn Ile Leu Arg Glu Lys Gln Thr Asp Glu
                35                  40                  45

Ile Lys Asp Thr Arg Asn Glu Ser Thr Gln Asn Cys Val Val Ala Glu
            50                  55                  60

Pro Glu Lys Met Glu Ser Ser Ile Ser Ser Ser Glu Glu Met Ser
65                  70                  75                  80

Leu Ser Lys Cys Ala Glu Gln Phe Cys Arg Leu Asn Glu Tyr Asn Gln
                85                  90                  95

Leu Gln Leu Gln Ala Ala His Ala Gln Glu Gln Ile Arg Arg Met Asn
            100                 105                 110

Glu Asn Ser His Val Gln Val Pro Phe Gln Gln Leu Asn Gln Leu Ala
            115                 120                 125

Ala Tyr Pro Tyr Ala Val Trp Tyr Tyr Pro Gln Ile Met Gln Tyr Val
            130                 135                 140

Pro Phe Pro Pro Phe Ser Asp Ile Ser Asn Pro Thr Ala His Glu Asn
145                 150                 155                 160

Tyr Glu Lys Asn Asn Val Met Leu Gln Trp
                165                 170

<210> SEQ ID NO 15
<211> LENGTH: 222
<212> TYPE: PRT
<213> ORGANISM: Bos taurus
<220> FEATURE:
<221> NAME/KEY: SIGNAL
<222> LOCATION: (1)..(15)

<400> SEQUENCE: 15

Met Lys Phe Phe Ile Phe Thr Cys Leu Leu Ala Val Ala Leu Ala Lys
1               5                   10                  15

Asn Thr Met Glu His Val Ser Ser Ser Glu Glu Ser Ile Ile Ser Gln
                20                  25                  30

Glu Thr Tyr Lys Gln Glu Lys Asn Met Ala Ile Asn Pro Ser Lys Glu
                35                  40                  45

Asn Leu Cys Ser Thr Phe Cys Lys Glu Val Val Arg Asn Ala Asn Glu
            50                  55                  60

Glu Glu Tyr Ser Ile Gly Ser Ser Glu Glu Ser Ala Glu Val Ala
65                  70                  75                  80

Thr Glu Glu Val Lys Ile Thr Val Asp Asp Lys His Tyr Gln Lys Ala
                85                  90                  95

Leu Asn Glu Ile Asn Gln Phe Tyr Gln Lys Phe Pro Gln Tyr Leu Gln
            100                 105                 110

Tyr Leu Tyr Gln Gly Pro Ile Val Leu Asn Pro Trp Asp Gln Val Lys
            115                 120                 125

Arg Asn Ala Val Pro Ile Thr Pro Thr Leu Asn Arg Glu Gln Leu Ser
            130                 135                 140

Thr Ser Glu Glu Asn Ser Lys Lys Thr Val Asp Met Glu Ser Thr Glu
145                 150                 155                 160

Val Phe Thr Lys Lys Thr Lys Leu Thr Glu Glu Glu Lys Asn Arg Leu
                165                 170                 175

Asn Phe Leu Lys Lys Ile Ser Gln Arg Tyr Gln Lys Phe Ala Leu Pro
            180                 185                 190
```

```
Gln Tyr Leu Lys Thr Val Tyr Gln His Gln Lys Ala Met Lys Pro Trp
            195                 200                 205

Ile Gln Pro Lys Thr Lys Val Ile Pro Tyr Val Arg Tyr Leu
    210                 215                 220

<210> SEQ ID NO 16
<211> LENGTH: 207
<212> TYPE: PRT
<213> ORGANISM: Bos taurus

<400> SEQUENCE: 16

Lys Asn Thr Met Glu His Val Ser Ser Glu Glu Ser Ile Ile Ser
1               5                   10                  15

Gln Glu Thr Tyr Lys Gln Glu Lys Asn Met Ala Ile Asn Pro Ser Lys
            20                  25                  30

Glu Asn Leu Cys Ser Thr Phe Cys Lys Glu Val Val Arg Asn Ala Asn
        35                  40                  45

Glu Glu Glu Tyr Ser Ile Gly Ser Ser Ser Glu Ser Ala Glu Val
    50                  55                  60

Ala Thr Glu Glu Val Lys Ile Thr Val Asp Asp Lys His Tyr Gln Lys
65                  70                  75                  80

Ala Leu Asn Glu Ile Asn Gln Phe Tyr Gln Lys Phe Pro Gln Tyr Leu
                85                  90                  95

Gln Tyr Leu Tyr Gln Gly Pro Ile Val Leu Asn Pro Trp Asp Gln Val
            100                 105                 110

Lys Arg Asn Ala Val Pro Ile Thr Pro Thr Leu Asn Arg Glu Gln Leu
        115                 120                 125

Ser Thr Ser Glu Glu Asn Ser Lys Lys Thr Val Asp Met Glu Ser Thr
    130                 135                 140

Glu Val Phe Thr Lys Lys Thr Lys Leu Thr Glu Glu Lys Asn Arg
145                 150                 155                 160

Leu Asn Phe Leu Lys Lys Ile Ser Gln Arg Tyr Gln Lys Phe Ala Leu
                165                 170                 175

Pro Gln Tyr Leu Lys Thr Val Tyr Gln His Gln Lys Ala Met Lys Pro
            180                 185                 190

Trp Ile Gln Pro Lys Thr Lys Val Ile Pro Tyr Val Arg Tyr Leu
        195                 200                 205

<210> SEQ ID NO 17
<211> LENGTH: 223
<212> TYPE: PRT
<213> ORGANISM: Ovis aries
<220> FEATURE:
<221> NAME/KEY: SIGNAL
<222> LOCATION: (1)..(15)

<400> SEQUENCE: 17

Met Lys Phe Phe Ile Phe Thr Cys Leu Leu Ala Val Ala Leu Ala Lys
1               5                   10                  15

His Lys Met Glu His Val Ser Ser Glu Glu Pro Ile Asn Ile Ser
            20                  25                  30

Gln Glu Ile Tyr Lys Gln Glu Lys Asn Met Ala Ile His Pro Arg Lys
        35                  40                  45

Glu Lys Leu Cys Thr Thr Ser Cys Glu Glu Val Val Arg Asn Ala Asp
    50                  55                  60

Glu Glu Glu Tyr Ser Ile Arg Ser Ser Ser Glu Glu Ser Ala Glu Val
65                  70                  75                  80
```

```
Ala Pro Glu Glu Val Lys Ile Thr Val Asp Asp Lys His Tyr Gln Lys
                85                  90                  95

Ala Leu Asn Glu Ile Asn Gln Phe Tyr Gln Lys Phe Pro Gln Tyr Leu
            100                 105                 110

Gln Tyr Leu Tyr Gln Gly Pro Ile Val Leu Asn Pro Trp Asp Gln Val
        115                 120                 125

Lys Arg Asn Ala Gly Pro Phe Thr Pro Thr Val Asn Arg Glu Gln Leu
    130                 135                 140

Ser Thr Ser Glu Glu Asn Ser Lys Lys Thr Ile Asp Met Glu Ser Thr
145                 150                 155                 160

Glu Val Phe Thr Lys Lys Thr Lys Leu Thr Glu Glu Lys Asn Arg
                165                 170                 175

Leu Asn Phe Leu Lys Lys Ile Ser Gln Tyr Tyr Gln Lys Phe Ala Trp
            180                 185                 190

Pro Gln Tyr Leu Lys Thr Val Asp Gln His Gln Lys Ala Met Lys Pro
        195                 200                 205

Trp Thr Gln Pro Lys Thr Asn Ala Ile Pro Tyr Val Arg Tyr Leu
    210                 215                 220

<210> SEQ ID NO 18
<211> LENGTH: 208
<212> TYPE: PRT
<213> ORGANISM: Ovis aries

<400> SEQUENCE: 18

Lys His Lys Met Glu His Val Ser Ser Glu Glu Pro Ile Asn Ile
1               5                   10                  15

Ser Gln Glu Ile Tyr Lys Gln Glu Lys Asn Met Ala Ile His Pro Arg
            20                  25                  30

Lys Glu Lys Leu Cys Thr Thr Ser Cys Glu Glu Val Val Arg Asn Ala
        35                  40                  45

Asp Glu Glu Glu Tyr Ser Ile Arg Ser Ser Glu Glu Ser Ala Glu
    50                  55                  60

Val Ala Pro Glu Glu Val Lys Ile Thr Val Asp Asp Lys His Tyr Gln
65                  70                  75                  80

Lys Ala Leu Asn Glu Ile Asn Gln Phe Tyr Gln Lys Phe Pro Gln Tyr
                85                  90                  95

Leu Gln Tyr Leu Tyr Gln Gly Pro Ile Val Leu Asn Pro Trp Asp Gln
            100                 105                 110

Val Lys Arg Asn Ala Gly Pro Phe Thr Pro Thr Val Asn Arg Glu Gln
        115                 120                 125

Leu Ser Thr Ser Glu Glu Asn Ser Lys Lys Thr Ile Asp Met Glu Ser
    130                 135                 140

Thr Glu Val Phe Thr Lys Lys Thr Lys Leu Thr Glu Glu Lys Asn
145                 150                 155                 160

Arg Leu Asn Phe Leu Lys Lys Ile Ser Gln Tyr Tyr Gln Lys Phe Ala
                165                 170                 175

Trp Pro Gln Tyr Leu Lys Thr Val Asp Gln His Gln Lys Ala Met Lys
            180                 185                 190

Pro Trp Thr Gln Pro Lys Thr Asn Ala Ile Pro Tyr Val Arg Tyr Leu
        195                 200                 205

<210> SEQ ID NO 19
<211> LENGTH: 223
<212> TYPE: PRT
<213> ORGANISM: Capra hircus
```

-continued

```
<220> FEATURE:
<221> NAME/KEY: SIGNAL
<222> LOCATION: (1)..(15)

<400> SEQUENCE: 19

Met Lys Phe Phe Ile Phe Thr Cys Leu Leu Ala Val Ala Leu Ala Lys
1               5                   10                  15

His Lys Met Glu His Val Ser Ser Glu Glu Pro Ile Asn Ile Phe
            20                  25                  30

Gln Glu Ile Tyr Lys Gln Glu Lys Asn Met Ala Ile His Pro Arg Lys
                35                  40                  45

Glu Lys Leu Cys Thr Thr Ser Cys Glu Glu Val Val Arg Asn Ala Asn
50                  55                  60

Glu Glu Glu Tyr Ser Ile Arg Ser Ser Glu Glu Ser Ala Glu Val
65                  70                  75                  80

Ala Pro Glu Glu Ile Lys Ile Thr Val Asp Asp Lys His Tyr Gln Lys
                85                  90                  95

Ala Leu Asn Glu Ile Asn Gln Phe Tyr Gln Lys Phe Pro Gln Tyr Leu
                100                 105                 110

Gln Tyr Pro Tyr Gln Gly Pro Ile Val Leu Asn Pro Trp Asp Gln Val
            115                 120                 125

Lys Arg Asn Ala Gly Pro Phe Thr Pro Thr Val Asn Arg Glu Gln Leu
130                 135                 140

Ser Thr Ser Glu Glu Asn Ser Lys Lys Thr Ile Asp Met Glu Ser Thr
145                 150                 155                 160

Glu Val Phe Thr Lys Lys Thr Lys Leu Thr Glu Glu Glu Lys Asn Arg
                165                 170                 175

Leu Asn Phe Leu Lys Lys Ile Ser Gln Tyr Tyr Gln Lys Phe Ala Trp
                180                 185                 190

Pro Gln Tyr Leu Lys Thr Val Asp Gln His Gln Lys Ala Met Lys Pro
            195                 200                 205

Trp Thr Gln Pro Lys Thr Asn Ala Ile Pro Tyr Val Arg Tyr Leu
    210                 215                 220

<210> SEQ ID NO 20
<211> LENGTH: 208
<212> TYPE: PRT
<213> ORGANISM: Capra hircus

<400> SEQUENCE: 20

Lys His Lys Met Glu His Val Ser Ser Glu Glu Pro Ile Asn Ile
1               5                   10                  15

Phe Gln Glu Ile Tyr Lys Gln Glu Lys Asn Met Ala Ile His Pro Arg
                20                  25                  30

Lys Glu Lys Leu Cys Thr Thr Ser Cys Glu Glu Val Val Arg Asn Ala
                35                  40                  45

Asn Glu Glu Glu Tyr Ser Ile Arg Ser Ser Glu Glu Ser Ala Glu
50                  55                  60

Val Ala Pro Glu Glu Ile Lys Ile Thr Val Asp Asp Lys His Tyr Gln
65                  70                  75                  80

Lys Ala Leu Asn Glu Ile Asn Gln Phe Tyr Gln Lys Phe Pro Gln Tyr
                85                  90                  95

Leu Gln Tyr Pro Tyr Gln Gly Pro Ile Val Leu Asn Pro Trp Asp Gln
                100                 105                 110

Val Lys Arg Asn Ala Gly Pro Phe Thr Pro Thr Val Asn Arg Glu Gln
            115                 120                 125
```

Leu Ser Thr Ser Glu Glu Asn Ser Lys Lys Thr Ile Asp Met Glu Ser
    130                 135                 140

Thr Glu Val Phe Thr Lys Lys Thr Leu Thr Glu Glu Glu Lys Asn
145             150                 155                 160

Arg Leu Asn Phe Leu Lys Lys Ile Ser Gln Tyr Tyr Gln Lys Phe Ala
                165                 170                 175

Trp Pro Gln Tyr Leu Lys Thr Val Asp Gln His Gln Lys Ala Met Lys
            180                 185                 190

Pro Trp Thr Gln Pro Lys Thr Asn Ala Ile Pro Tyr Val Arg Tyr Leu
                195                 200                 205

<210> SEQ ID NO 21
<211> LENGTH: 222
<212> TYPE: PRT
<213> ORGANISM: Bubalus bubalis
<220> FEATURE:
<221> NAME/KEY: SIGNAL
<222> LOCATION: (1)..(15)

<400> SEQUENCE: 21

Met Lys Phe Phe Ile Phe Thr Cys Leu Leu Ala Val Ala Leu Ala Lys
1               5                   10                  15

His Thr Met Glu His Val Ser Ser Ser Glu Glu Ser Ile Ile Ser Gln
            20                  25                  30

Glu Thr Tyr Lys Gln Glu Lys Asn Met Ala Ile His Pro Ser Lys Glu
        35                  40                  45

Asn Leu Cys Ser Thr Phe Cys Lys Glu Val Ile Arg Asn Ala Asn Glu
50                  55                  60

Glu Glu Tyr Ser Ile Gly Ser Ser Ser Glu Glu Ser Ala Glu Val Ala
65                  70                  75                  80

Thr Glu Glu Val Lys Ile Thr Val Asp Asp Lys His Tyr Gln Lys Ala
                85                  90                  95

Leu Asn Glu Ile Asn Gln Phe Tyr Gln Lys Phe Pro Gln Tyr Leu Gln
            100                 105                 110

Tyr Leu Tyr Gln Gly Pro Ile Val Leu Asn Pro Trp Asp Gln Val Lys
        115                 120                 125

Arg Asn Ala Val Pro Ile Thr Pro Thr Leu Asn Arg Glu Gln Leu Ser
130                 135                 140

Thr Ser Glu Glu Asn Ser Lys Lys Thr Val Asp Met Glu Ser Thr Glu
145                 150                 155                 160

Val Phe Thr Lys Lys Thr Lys Leu Thr Glu Glu Asp Lys Asn Arg Leu
                165                 170                 175

Asn Phe Leu Lys Lys Ile Ser Gln His Tyr Gln Lys Phe Ala Trp Pro
            180                 185                 190

Gln Tyr Leu Lys Thr Val Tyr Gln Tyr Gln Lys Ala Met Lys Pro Trp
        195                 200                 205

Thr Gln Pro Lys Thr Asn Val Ile Pro Tyr Val Arg Tyr Leu
210                 215                 220

<210> SEQ ID NO 22
<211> LENGTH: 207
<212> TYPE: PRT
<213> ORGANISM: Bubalus bubalis

<400> SEQUENCE: 22

Lys His Thr Met Glu His Val Ser Ser Ser Glu Glu Ser Ile Ile Ser
1               5                   10                  15

Gln Glu Thr Tyr Lys Gln Lys Asn Met Ala Ile His Pro Ser Lys
                20                  25                  30

Glu Asn Leu Cys Ser Thr Phe Cys Lys Glu Val Ile Arg Asn Ala Asn
            35                  40                  45

Glu Glu Glu Tyr Ser Ile Gly Ser Ser Glu Glu Ser Ala Glu Val
        50                  55                  60

Ala Thr Glu Glu Val Lys Ile Thr Val Asp Asp Lys His Tyr Gln Lys
 65                  70                  75                  80

Ala Leu Asn Glu Ile Asn Gln Phe Tyr Gln Lys Phe Pro Gln Tyr Leu
                85                  90                  95

Gln Tyr Leu Tyr Gln Gly Pro Ile Val Leu Asn Pro Trp Asp Gln Val
            100                 105                 110

Lys Arg Asn Ala Val Pro Ile Thr Pro Thr Leu Asn Arg Glu Gln Leu
        115                 120                 125

Ser Thr Ser Glu Glu Asn Ser Lys Lys Thr Val Asp Met Glu Ser Thr
130                 135                 140

Glu Val Phe Thr Lys Lys Thr Lys Leu Thr Glu Glu Asp Lys Asn Arg
145                 150                 155                 160

Leu Asn Phe Leu Lys Lys Ile Ser Gln His Tyr Gln Lys Phe Ala Trp
                165                 170                 175

Pro Gln Tyr Leu Lys Thr Val Tyr Gln Tyr Gln Lys Ala Met Lys Pro
            180                 185                 190

Trp Thr Gln Pro Lys Thr Asn Val Ile Pro Tyr Val Arg Tyr Leu
        195                 200                 205

<210> SEQ ID NO 23
<211> LENGTH: 214
<212> TYPE: PRT
<213> ORGANISM: Equus caballus
<220> FEATURE:
<221> NAME/KEY: SIGNAL
<222> LOCATION: (1)..(15)

<400> SEQUENCE: 23

Met Lys Phe Phe Ile Phe Thr Cys Leu Leu Ala Val Ala Leu Ala Lys
1               5                   10                  15

His Asn Met Glu His Arg Ser Ser Glu Asp Ser Val Asn Ile Ser
                20                  25                  30

Gln Glu Lys Phe Lys Gln Glu Lys Tyr Val Val Ile Pro Thr Ser Lys
            35                  40                  45

Glu Ser Ile Cys Ser Thr Ser Cys Glu Glu Ala Thr Arg Asn Ile Asn
        50                  55                  60

Glu Met Glu Ser Ala Lys Phe Pro Thr Glu Arg Glu Glu Lys Glu Val
 65                  70                  75                  80

Glu Glu Lys His His Leu Lys Gln Leu Asn Lys Ile Asn Gln Phe Tyr
                85                  90                  95

Glu Lys Leu Asn Phe Leu Gln Tyr Leu Gln Ala Leu Arg Gln Pro Arg
            100                 105                 110

Ile Val Leu Thr Pro Trp Asp Gln Thr Lys Thr Gly Asp Ser Pro Phe
        115                 120                 125

Ile Pro Ile Val Asn Thr Glu Gln Leu Phe Thr Ser Glu Glu Ile Pro
130                 135                 140

Lys Lys Thr Val Asp Met Glu Ser Thr Glu Val Val Thr Glu Lys Thr
145                 150                 155                 160

Glu Leu Thr Glu Glu Glu Lys Asn Tyr Leu Lys Leu Leu Tyr Tyr Glu

```
                165                 170                 175
Lys Phe Thr Leu Pro Gln Tyr Phe Lys Ile Val Arg Gln His Gln Thr
            180                 185                 190

Thr Met Asp Pro Arg Ser His Arg Lys Thr Asn Ser Tyr Gln Ile Ile
        195                 200                 205

Pro Val Leu Arg Tyr Phe
    210

<210> SEQ ID NO 24
<211> LENGTH: 199
<212> TYPE: PRT
<213> ORGANISM: Equus caballus

<400> SEQUENCE: 24

Lys His Asn Met Glu His Arg Ser Ser Ser Glu Asp Ser Val Asn Ile
1               5                   10                  15

Ser Gln Glu Lys Phe Lys Gln Glu Lys Tyr Val Val Ile Pro Thr Ser
            20                  25                  30

Lys Glu Ser Ile Cys Ser Thr Ser Cys Glu Glu Ala Thr Arg Asn Ile
        35                  40                  45

Asn Glu Met Glu Ser Ala Lys Phe Pro Thr Glu Arg Glu Glu Lys Glu
    50                  55                  60

Val Glu Glu Lys His His Leu Lys Gln Leu Asn Lys Ile Asn Gln Phe
65                  70                  75                  80

Tyr Glu Lys Leu Asn Phe Leu Gln Tyr Leu Gln Ala Leu Arg Gln Pro
                85                  90                  95

Arg Ile Val Leu Thr Pro Trp Asp Gln Thr Lys Thr Gly Asp Ser Pro
            100                 105                 110

Phe Ile Pro Ile Val Asn Thr Glu Gln Leu Phe Thr Ser Glu Glu Ile
        115                 120                 125

Pro Lys Lys Thr Val Asp Met Glu Ser Thr Glu Val Val Thr Glu Lys
    130                 135                 140

Thr Glu Leu Thr Glu Glu Glu Lys Asn Tyr Leu Lys Leu Leu Tyr Tyr
145                 150                 155                 160

Glu Lys Phe Thr Leu Pro Gln Tyr Phe Lys Ile Val Arg Gln His Gln
                165                 170                 175

Thr Thr Met Asp Pro Arg Ser His Arg Lys Thr Asn Ser Tyr Gln Ile
            180                 185                 190

Ile Pro Val Leu Arg Tyr Phe
        195

<210> SEQ ID NO 25
<211> LENGTH: 193
<212> TYPE: PRT
<213> ORGANISM: Camelus ferus
<220> FEATURE:
<221> NAME/KEY: SIGNAL
<222> LOCATION: (1)..(15)

<400> SEQUENCE: 25

Met Lys Phe Phe Ile Phe Thr Cys Leu Leu Ala Val Val Leu Ala Lys
1               5                   10                  15

His Glu Met Asp Gln Gly Ser Ser Ser Glu Gly Ser Ile Asn Val Ser
            20                  25                  30

Gln Gln Lys Phe Lys Gln Val Lys Lys Val Ala Ile His Pro Ser Lys
        35                  40                  45

Glu Asp Ile Cys Ser Thr Phe Cys Glu Glu Ala Val Arg Asn Ile Lys
```

```
                    50                  55                  60
Glu Val Glu Ser Ala Glu Val Pro Thr Glu Asn Lys Ile Ser Gln Phe
65                  70                  75                  80

Tyr Gln Lys Trp Lys Phe Leu Gln Tyr Leu Gln Ala Leu His Gln Gly
                85                  90                  95

Gln Ile Val Met Asn Pro Trp Asp Gln Gly Lys Thr Arg Ala Tyr Pro
                100                 105                 110

Phe Ile Pro Thr Val Asn Thr Glu Gln Leu Ser Ile Ser Glu Glu Ser
            115                 120                 125

Thr Glu Val Pro Thr Glu Glu Ser Thr Glu Val Phe Thr Lys Lys Thr
        130                 135                 140

Glu Leu Thr Glu Glu Glu Lys Asp His Gln Lys Phe Leu Asn Lys Ile
145                 150                 155                 160

Tyr Gln Tyr Tyr Gln Thr Phe Leu Trp Pro Glu Tyr Leu Lys Thr Val
                165                 170                 175

Tyr Gln Tyr Gln Lys Thr Met Thr Pro Trp Asn His Ile Lys Arg Tyr
                180                 185                 190

Phe

<210> SEQ ID NO 26
<211> LENGTH: 178
<212> TYPE: PRT
<213> ORGANISM: Camelus ferus

<400> SEQUENCE: 26

Lys His Glu Met Asp Gln Gly Ser Ser Ser Glu Glu Ser Ile Asn Val
1               5                   10                  15

Ser Gln Gln Lys Phe Lys Gln Val Lys Lys Val Ala Ile His Pro Ser
                20                  25                  30

Lys Glu Asp Ile Cys Ser Thr Phe Cys Glu Glu Ala Val Arg Asn Ile
            35                  40                  45

Lys Glu Val Glu Ser Ala Glu Val Pro Thr Glu Asn Lys Ile Ser Gln
        50                  55                  60

Phe Tyr Gln Lys Trp Lys Phe Leu Gln Tyr Leu Gln Ala Leu His Gln
65                  70                  75                  80

Gly Gln Ile Val Met Asn Pro Trp Asp Gln Gly Lys Thr Arg Ala Tyr
                85                  90                  95

Pro Phe Ile Pro Thr Val Asn Thr Glu Gln Leu Ser Ile Ser Glu Glu
            100                 105                 110

Ser Thr Glu Val Pro Thr Glu Glu Ser Thr Glu Val Phe Thr Lys Lys
        115                 120                 125

Thr Glu Leu Thr Glu Glu Glu Lys Asp His Gln Lys Phe Leu Asn Lys
130                 135                 140

Ile Tyr Gln Tyr Tyr Gln Thr Phe Leu Trp Pro Glu Tyr Leu Lys Thr
145                 150                 155                 160

Val Tyr Gln Tyr Gln Lys Thr Met Thr Pro Trp Asn His Ile Lys Arg
                165                 170                 175

Tyr Phe

<210> SEQ ID NO 27
<211> LENGTH: 224
<212> TYPE: PRT
<213> ORGANISM: Bos taurus
<220> FEATURE:
<221> NAME/KEY: SIGNAL
<222> LOCATION: (1)..(15)
```

<400> SEQUENCE: 27

```
Met Lys Val Leu Ile Leu Ala Cys Leu Val Ala Leu Ala Leu Ala Arg
1               5                   10                  15

Glu Leu Glu Glu Leu Asn Val Pro Gly Glu Ile Val Glu Ser Leu Ser
            20                  25                  30

Ser Ser Glu Glu Ser Ile Thr Arg Ile Asn Lys Lys Ile Glu Lys Phe
        35                  40                  45

Gln Ser Glu Glu Gln Gln Gln Thr Glu Asp Glu Leu Gln Asp Lys Ile
    50                  55                  60

His Pro Phe Ala Gln Thr Gln Ser Leu Val Tyr Pro Phe Pro Gly Pro
65                  70                  75                  80

Ile Pro Asn Ser Leu Pro Gln Asn Ile Pro Pro Leu Thr Gln Thr Pro
                85                  90                  95

Val Val Val Pro Pro Phe Leu Gln Pro Glu Val Met Gly Val Ser Lys
            100                 105                 110

Val Lys Glu Ala Met Ala Pro Lys His Lys Glu Met Pro Phe Pro Lys
        115                 120                 125

Tyr Pro Val Glu Pro Phe Thr Glu Ser Gln Ser Leu Thr Leu Thr Asp
    130                 135                 140

Val Glu Asn Leu His Leu Pro Leu Pro Leu Leu Gln Ser Trp Met His
145                 150                 155                 160

Gln Pro His Gln Pro Leu Pro Pro Thr Val Met Phe Pro Pro Gln Ser
                165                 170                 175

Val Leu Ser Leu Ser Gln Ser Lys Val Leu Pro Val Pro Gln Lys Ala
            180                 185                 190

Val Pro Tyr Pro Gln Arg Asp Met Pro Ile Gln Ala Phe Leu Leu Tyr
        195                 200                 205

Gln Glu Pro Val Leu Gly Pro Val Arg Gly Pro Phe Pro Ile Ile Val
    210                 215                 220
```

<210> SEQ ID NO 28
<211> LENGTH: 209
<212> TYPE: PRT
<213> ORGANISM: Bos taurus

<400> SEQUENCE: 28

```
Arg Glu Leu Glu Glu Leu Asn Val Pro Gly Glu Ile Val Glu Ser Leu
1               5                   10                  15

Ser Ser Ser Glu Glu Ser Ile Thr Arg Ile Asn Lys Lys Ile Glu Lys
            20                  25                  30

Phe Gln Ser Glu Glu Gln Gln Gln Thr Glu Asp Glu Leu Gln Asp Lys
        35                  40                  45

Ile His Pro Phe Ala Gln Thr Gln Ser Leu Val Tyr Pro Phe Pro Gly
    50                  55                  60

Pro Ile Pro Asn Ser Leu Pro Gln Asn Ile Pro Pro Leu Thr Gln Thr
65                  70                  75                  80

Pro Val Val Val Pro Pro Phe Leu Gln Pro Glu Val Met Gly Val Ser
                85                  90                  95

Lys Val Lys Glu Ala Met Ala Pro Lys His Lys Glu Met Pro Phe Pro
            100                 105                 110

Lys Tyr Pro Val Glu Pro Phe Thr Glu Ser Gln Ser Leu Thr Leu Thr
        115                 120                 125

Asp Val Glu Asn Leu His Leu Pro Leu Pro Leu Leu Gln Ser Trp Met
    130                 135                 140
```

```
His Gln Pro His Gln Pro Leu Pro Pro Thr Val Met Phe Pro Pro Gln
145                 150                 155                 160

Ser Val Leu Ser Leu Ser Gln Ser Lys Val Leu Pro Val Pro Gln Lys
                165                 170                 175

Ala Val Pro Tyr Pro Gln Arg Asp Met Pro Ile Gln Ala Phe Leu Leu
            180                 185                 190

Tyr Gln Glu Pro Val Leu Gly Pro Val Arg Gly Pro Phe Pro Ile Ile
        195                 200                 205

Val

<210> SEQ ID NO 29
<211> LENGTH: 222
<212> TYPE: PRT
<213> ORGANISM: Ovis aries
<220> FEATURE:
<221> NAME/KEY: SIGNAL
<222> LOCATION: (1)..(15)

<400> SEQUENCE: 29

Met Lys Val Leu Ile Leu Ala Cys Leu Val Ala Leu Ala Leu Ala Arg
1               5                   10                  15

Glu Gln Glu Glu Leu Asn Val Val Gly Glu Thr Val Glu Ser Leu Ser
            20                  25                  30

Ser Ser Glu Glu Ser Ile Thr His Ile Asn Lys Lys Ile Glu Lys Phe
        35                  40                  45

Gln Ser Glu Glu Gln Gln Gln Thr Glu Asp Glu Leu Gln Asp Lys Ile
    50                  55                  60

His Pro Phe Ala Gln Ala Gln Ser Leu Val Tyr Pro Phe Thr Gly Pro
65                  70                  75                  80

Ile Pro Asn Ser Leu Pro Gln Asn Ile Leu Pro Leu Thr Gln Thr Pro
                85                  90                  95

Val Val Val Pro Pro Phe Leu Gln Pro Glu Ile Met Gly Val Pro Lys
            100                 105                 110

Val Lys Glu Thr Met Val Pro Lys His Lys Glu Met Pro Phe Pro Lys
        115                 120                 125

Tyr Pro Val Glu Pro Phe Thr Glu Ser Gln Ser Leu Thr Leu Thr Asp
    130                 135                 140

Val Glu Lys Leu His Leu Pro Leu Pro Leu Val Gln Ser Trp Met His
145                 150                 155                 160

Gln Pro Pro Gln Pro Leu Pro Pro Thr Val Met Phe Pro Pro Gln Ser
                165                 170                 175

Val Leu Ser Leu Ser Gln Pro Lys Val Leu Pro Val Pro Gln Lys Ala
            180                 185                 190

Val Pro Gln Arg Asp Met Pro Ile Gln Ala Phe Leu Leu Tyr Gln Glu
        195                 200                 205

Pro Val Leu Gly Pro Val Arg Gly Pro Phe Pro Ile Leu Val
    210                 215                 220

<210> SEQ ID NO 30
<211> LENGTH: 207
<212> TYPE: PRT
<213> ORGANISM: Ovis aries

<400> SEQUENCE: 30

Arg Glu Gln Glu Glu Leu Asn Val Val Gly Glu Thr Val Glu Ser Leu
1               5                   10                  15
```

-continued

```
Ser Ser Ser Glu Glu Ser Ile Thr His Ile Asn Lys Lys Ile Glu Lys
            20                  25                  30

Phe Gln Ser Glu Glu Gln Gln Thr Glu Asp Glu Leu Gln Asp Lys
        35                  40                  45

Ile His Pro Phe Ala Gln Ala Gln Ser Leu Val Tyr Pro Phe Thr Gly
    50                  55                  60

Pro Ile Pro Asn Ser Leu Pro Gln Asn Ile Leu Pro Leu Thr Gln Thr
65                  70                  75                  80

Pro Val Val Val Pro Pro Phe Leu Gln Pro Glu Ile Met Gly Val Pro
                85                  90                  95

Lys Val Lys Glu Thr Met Val Pro Lys His Lys Glu Met Pro Phe Pro
            100                 105                 110

Lys Tyr Pro Val Glu Pro Phe Thr Glu Ser Gln Ser Leu Thr Leu Thr
        115                 120                 125

Asp Val Glu Lys Leu His Leu Pro Leu Pro Leu Val Gln Ser Trp Met
    130                 135                 140

His Gln Pro Pro Gln Pro Leu Pro Pro Thr Val Met Phe Pro Pro Gln
145                 150                 155                 160

Ser Val Leu Ser Leu Ser Gln Pro Lys Val Leu Pro Val Pro Gln Lys
                165                 170                 175

Ala Val Pro Gln Arg Asp Met Pro Ile Gln Ala Phe Leu Leu Tyr Gln
            180                 185                 190

Glu Pro Val Leu Gly Pro Val Arg Gly Pro Phe Pro Ile Leu Val
        195                 200                 205

<210> SEQ ID NO 31
<211> LENGTH: 222
<212> TYPE: PRT
<213> ORGANISM: Capra hircus
<220> FEATURE:
<221> NAME/KEY: SIGNAL
<222> LOCATION: (1)..(15)

<400> SEQUENCE: 31

Met Lys Val Leu Ile Leu Ala Cys Leu Val Ala Leu Ala Ile Ala Arg
1               5                   10                  15

Glu Gln Glu Glu Leu Asn Val Val Gly Glu Thr Val Glu Ser Leu Ser
            20                  25                  30

Ser Ser Glu Glu Ser Ile Thr His Ile Asn Lys Lys Ile Glu Lys Phe
        35                  40                  45

Gln Ser Glu Glu Gln Gln Gln Thr Glu Asp Glu Leu Gln Asp Lys Ile
    50                  55                  60

His Pro Phe Ala Gln Ala Gln Ser Leu Val Tyr Pro Phe Thr Gly Pro
65                  70                  75                  80

Ile Pro Asn Ser Leu Pro Gln Asn Ile Leu Pro Leu Thr Gln Thr Pro
                85                  90                  95

Val Val Val Pro Pro Phe Leu Gln Pro Glu Ile Met Gly Val Pro Lys
            100                 105                 110

Val Lys Glu Thr Met Val Pro Lys His Lys Glu Met Pro Phe Pro Lys
        115                 120                 125

Tyr Pro Val Glu Pro Phe Thr Glu Ser Gln Ser Leu Thr Leu Thr Asp
    130                 135                 140

Val Glu Lys Leu His Leu Pro Leu Pro Leu Val Gln Ser Trp Met His
145                 150                 155                 160

Gln Pro Pro Gln Pro Leu Ser Pro Thr Val Met Phe Pro Pro Gln Ser
                165                 170                 175
```

```
Val Leu Ser Leu Ser Gln Pro Lys Val Leu Val Pro Gln Lys Ala
            180                 185                 190

Val Pro Gln Arg Asp Met Pro Ile Gln Ala Phe Leu Leu Tyr Gln Glu
        195                 200                 205

Pro Val Leu Gly Pro Val Arg Gly Pro Phe Pro Ile Leu Val
    210                 215                 220
```

<210> SEQ ID NO 32
<211> LENGTH: 207
<212> TYPE: PRT
<213> ORGANISM: Capra hircus

<400> SEQUENCE: 32

```
Arg Glu Gln Glu Glu Leu Asn Val Val Gly Glu Thr Val Glu Ser Leu
1               5                   10                  15

Ser Ser Ser Glu Glu Ser Ile Thr His Ile Asn Lys Lys Ile Glu Lys
            20                  25                  30

Phe Gln Ser Glu Glu Gln Gln Gln Thr Glu Asp Glu Leu Gln Asp Lys
            35                  40                  45

Ile His Pro Phe Ala Gln Ala Gln Ser Leu Val Tyr Pro Phe Thr Gly
50                  55                  60

Pro Ile Pro Asn Ser Leu Pro Gln Asn Ile Leu Pro Leu Thr Gln Thr
65                  70                  75                  80

Pro Val Val Val Pro Pro Phe Leu Gln Pro Glu Ile Met Gly Val Pro
                85                  90                  95

Lys Val Lys Glu Thr Met Val Pro Lys His Lys Glu Met Pro Phe Pro
            100                 105                 110

Lys Tyr Pro Val Glu Pro Phe Thr Glu Ser Gln Ser Leu Thr Leu Thr
        115                 120                 125

Asp Val Glu Lys Leu His Leu Pro Leu Pro Leu Val Gln Ser Trp Met
130                 135                 140

His Gln Pro Pro Gln Pro Leu Ser Pro Thr Val Met Phe Pro Pro Gln
145                 150                 155                 160

Ser Val Leu Ser Leu Ser Gln Pro Lys Val Leu Pro Val Pro Gln Lys
                165                 170                 175

Ala Val Pro Gln Arg Asp Met Pro Ile Gln Ala Phe Leu Leu Tyr Gln
            180                 185                 190

Glu Pro Val Leu Gly Pro Val Arg Gly Pro Phe Pro Ile Leu Val
        195                 200                 205
```

<210> SEQ ID NO 33
<211> LENGTH: 224
<212> TYPE: PRT
<213> ORGANISM: Bubalus bubalis
<220> FEATURE:
<221> NAME/KEY: SIGNAL
<222> LOCATION: (1)..(15)

<400> SEQUENCE: 33

```
Met Lys Val Leu Ile Leu Ala Cys Leu Val Ala Leu Ala Leu Ala Arg
1               5                   10                  15

Glu Leu Glu Glu Leu Asn Val Pro Gly Glu Ile Val Glu Ser Leu Ser
            20                  25                  30

Ser Ser Glu Glu Ser Ile Thr His Ile Asn Lys Lys Ile Glu Lys Phe
            35                  40                  45

Gln Ser Glu Glu Gln Gln Gln Met Glu Asp Glu Leu Gln Asp Lys Ile
50                  55                  60
```

His Pro Phe Ala Gln Thr Gln Ser Leu Val Tyr Pro Phe Pro Gly Pro
65                  70                  75                  80

Ile Pro Lys Ser Leu Pro Gln Asn Ile Pro Pro Leu Thr Gln Thr Pro
            85                  90                  95

Val Val Val Pro Pro Phe Leu Gln Pro Glu Ile Met Gly Val Ser Lys
        100                 105                 110

Val Lys Glu Ala Met Ala Pro Lys His Lys Glu Met Pro Phe Pro Lys
        115                 120                 125

Tyr Pro Val Glu Pro Phe Thr Glu Ser Gln Ser Leu Thr Leu Thr Asp
        130                 135                 140

Val Glu Asn Leu His Leu Pro Leu Pro Leu Leu Gln Ser Trp Met His
145                 150                 155                 160

Gln Pro Pro Gln Pro Leu Pro Pro Thr Val Met Phe Pro Pro Gln Ser
                165                 170                 175

Val Leu Ser Leu Ser Gln Ser Lys Val Leu Pro Val Pro Gln Lys Ala
        180                 185                 190

Val Pro Tyr Pro Gln Arg Asp Met Pro Ile Gln Ala Phe Leu Leu Tyr
        195                 200                 205

Gln Glu Pro Val Leu Gly Pro Val Arg Gly Pro Phe Pro Ile Ile Val
210                 215                 220

<210> SEQ ID NO 34
<211> LENGTH: 209
<212> TYPE: PRT
<213> ORGANISM: Bubalus bubalis

<400> SEQUENCE: 34

Arg Glu Leu Glu Glu Leu Asn Val Pro Gly Glu Ile Val Glu Ser Leu
1               5                   10                  15

Ser Ser Ser Glu Glu Ser Ile Thr His Ile Asn Lys Lys Ile Glu Lys
            20                  25                  30

Phe Gln Ser Glu Glu Gln Gln Met Glu Asp Glu Leu Gln Asp Lys
        35                  40                  45

Ile His Pro Phe Ala Gln Thr Gln Ser Leu Val Tyr Pro Phe Pro Gly
        50                  55                  60

Pro Ile Pro Lys Ser Leu Pro Gln Asn Ile Pro Pro Leu Thr Gln Thr
65                  70                  75                  80

Pro Val Val Val Pro Pro Phe Leu Gln Pro Glu Ile Met Gly Val Ser
                85                  90                  95

Lys Val Lys Glu Ala Met Ala Pro Lys His Lys Glu Met Pro Phe Pro
        100                 105                 110

Lys Tyr Pro Val Glu Pro Phe Thr Glu Ser Gln Ser Leu Thr Leu Thr
        115                 120                 125

Asp Val Glu Asn Leu His Leu Pro Leu Pro Leu Leu Gln Ser Trp Met
        130                 135                 140

His Gln Pro Pro Gln Pro Leu Pro Pro Thr Val Met Phe Pro Pro Gln
145                 150                 155                 160

Ser Val Leu Ser Leu Ser Gln Ser Lys Val Leu Pro Val Pro Gln Lys
                165                 170                 175

Ala Val Pro Tyr Pro Gln Arg Asp Met Pro Ile Gln Ala Phe Leu Leu
        180                 185                 190

Tyr Gln Glu Pro Val Leu Gly Pro Val Arg Gly Pro Phe Pro Ile Ile
        195                 200                 205

Val

<210> SEQ ID NO 35
<211> LENGTH: 241
<212> TYPE: PRT
<213> ORGANISM: Equus caballus
<220> FEATURE:
<221> NAME/KEY: SIGNAL
<222> LOCATION: (1)..(15)

<400> SEQUENCE: 35

Met Lys Ile Leu Ile Leu Ala Cys Leu Val Ala Leu Ala Leu Ala Arg
1               5                   10                  15

Glu Lys Glu Glu Leu Asn Val Ser Ser Glu Thr Val Glu Ser Leu Ser
            20                  25                  30

Ser Asn Glu Pro Asp Ser Ser Glu Glu Ser Ile Thr His Ile Asn
        35                  40                  45

Lys Glu Lys Leu Gln Lys Phe Lys His Glu Gly Gln Gln Gln Arg Glu
    50                  55                  60

Val Glu Arg Gln Asp Lys Ile Ser Arg Phe Val Gln Pro Gln Pro Val
65                  70                  75                  80

Val Tyr Pro Tyr Ala Glu Pro Val Pro Tyr Ala Val Val Pro Gln Ser
                85                  90                  95

Ile Leu Pro Leu Ala Gln Pro Ile Leu Pro Phe Leu Gln Pro Glu
            100                 105                 110

Ile Met Glu Val Ser Gln Ala Lys Glu Thr Ile Leu Pro Lys Arg Lys
            115                 120                 125

Val Met Pro Phe Leu Lys Ser Pro Ile Val Pro Phe Ser Glu Arg Gln
            130                 135                 140

Ile Leu Asn Pro Thr Asn Gly Glu Asn Leu Arg Leu Pro Val His Leu
145                 150                 155                 160

Ile Gln Pro Phe Met His Gln Val Pro Gln Ser Leu Leu Gln Thr Leu
            165                 170                 175

Met Leu Pro Ser Gln Pro Val Leu Ser Pro Pro Gln Ser Lys Val Ala
            180                 185                 190

Pro Phe Pro Gln Pro Val Val Pro Tyr Pro Gln Arg Asp Thr Pro Val
            195                 200                 205

Gln Ala Phe Leu Leu Tyr Gln Asp Pro Arg Leu Gly Pro Thr Gly Glu
        210                 215                 220

Leu Asp Pro Ala Thr Gln Pro Ile Val Ala Val His Asn Pro Val Ile
225                 230                 235                 240

Val

<210> SEQ ID NO 36
<211> LENGTH: 226
<212> TYPE: PRT
<213> ORGANISM: Equus caballus

<400> SEQUENCE: 36

Arg Glu Lys Glu Glu Leu Asn Val Ser Ser Glu Thr Val Glu Ser Leu
1               5                   10                  15

Ser Ser Asn Glu Pro Asp Ser Ser Glu Glu Ser Ile Thr His Ile
            20                  25                  30

Asn Lys Glu Lys Leu Gln Lys Phe Lys His Glu Gly Gln Gln Gln Arg
    35                  40                  45

Glu Val Glu Arg Gln Asp Lys Ile Ser Arg Phe Val Gln Pro Gln Pro
50                  55                  60

Val Val Tyr Pro Tyr Ala Glu Pro Val Pro Tyr Ala Val Val Pro Gln
65                  70                  75                  80

Ser Ile Leu Pro Leu Ala Gln Pro Pro Ile Leu Pro Phe Leu Gln Pro
                85                  90                  95

Glu Ile Met Glu Val Ser Gln Ala Lys Glu Thr Ile Leu Pro Lys Arg
            100                 105                 110

Lys Val Met Pro Phe Leu Lys Ser Pro Ile Val Pro Phe Ser Glu Arg
        115                 120                 125

Gln Ile Leu Asn Pro Thr Asn Gly Glu Asn Leu Arg Leu Pro Val His
    130                 135                 140

Leu Ile Gln Pro Phe Met His Gln Val Pro Gln Ser Leu Leu Gln Thr
145                 150                 155                 160

Leu Met Leu Pro Ser Gln Pro Val Leu Ser Pro Pro Gln Ser Lys Val
                165                 170                 175

Ala Pro Phe Pro Gln Pro Val Val Pro Tyr Pro Gln Arg Asp Thr Pro
            180                 185                 190

Val Gln Ala Phe Leu Leu Tyr Gln Asp Pro Arg Leu Gly Pro Thr Gly
        195                 200                 205

Glu Leu Asp Pro Ala Thr Gln Pro Ile Val Ala Val His Asn Pro Val
    210                 215                 220

Ile Val
225

<210> SEQ ID NO 37
<211> LENGTH: 232
<212> TYPE: PRT
<213> ORGANISM: Camelus dromedarius
<220> FEATURE:
<221> NAME/KEY: SIGNAL
<222> LOCATION: (1)..(15)

<400> SEQUENCE: 37

Met Lys Val Leu Ile Leu Ala Cys Arg Val Ala Leu Ala Leu Ala Arg
1               5                   10                  15

Glu Lys Glu Glu Phe Lys Thr Ala Gly Glu Ala Leu Glu Ser Ile Ser
            20                  25                  30

Ser Ser Glu Glu Ser Ile Thr His Ile Asn Lys Gln Lys Ile Glu Lys
        35                  40                  45

Phe Lys Ile Glu Glu Gln Gln Gln Thr Glu Asp Glu Gln Gln Asp Lys
    50                  55                  60

Ile Tyr Thr Phe Pro Gln Pro Gln Ser Leu Val Tyr Ser His Thr Glu
65                  70                  75                  80

Pro Ile Pro Tyr Pro Ile Leu Pro Gln Asn Phe Leu Pro Pro Leu Gln
                85                  90                  95

Pro Ala Val Met Val Pro Phe Leu Gln Pro Lys Val Met Asp Val Pro
            100                 105                 110

Lys Thr Lys Glu Thr Ile Ile Pro Lys Arg Lys Glu Met Pro Leu Leu
        115                 120                 125

Gln Ser Pro Val Val Pro Phe Thr Glu Ser Gln Ser Leu Thr Leu Thr
    130                 135                 140

Asp Leu Glu Asn Leu His Leu Pro Leu Pro Leu Leu Gln Ser Leu Met
145                 150                 155                 160

Tyr Gln Ile Pro Gln Pro Val Pro Gln Thr Pro Met Ile Pro Pro Gln
                165                 170                 175

Ser Leu Leu Ser Leu Ser Gln Phe Lys Val Leu Pro Val Pro Gln Gln
            180                 185                 190

```
Met Val Pro Tyr Pro Gln Arg Ala Met Pro Val Gln Ala Val Leu Pro
        195                 200                 205

Phe Gln Glu Pro Val Pro Asp Pro Val Arg Gly Leu His Pro Val Pro
    210                 215                 220

Gln Pro Leu Val Pro Val Ile Ala
225                 230

<210> SEQ ID NO 38
<211> LENGTH: 217
<212> TYPE: PRT
<213> ORGANISM: Camelus dromedarius

<400> SEQUENCE: 38

Arg Glu Lys Glu Glu Phe Lys Thr Ala Gly Glu Ala Leu Glu Ser Ile
1               5                   10                  15

Ser Ser Ser Glu Glu Ser Ile Thr His Ile Asn Lys Gln Lys Ile Glu
            20                  25                  30

Lys Phe Lys Ile Glu Glu Gln Gln Gln Thr Glu Asp Glu Gln Gln Asp
        35                  40                  45

Lys Ile Tyr Thr Phe Pro Gln Pro Gln Ser Leu Val Tyr Ser His Thr
    50                  55                  60

Glu Pro Ile Pro Tyr Pro Ile Leu Pro Gln Asn Phe Leu Pro Pro Leu
65                  70                  75                  80

Gln Pro Ala Val Met Val Pro Phe Leu Gln Pro Lys Val Met Asp Val
                85                  90                  95

Pro Lys Thr Lys Glu Thr Ile Ile Pro Lys Arg Lys Glu Met Pro Leu
            100                 105                 110

Leu Gln Ser Pro Val Val Pro Phe Thr Glu Ser Gln Ser Leu Thr Leu
        115                 120                 125

Thr Asp Leu Glu Asn Leu His Leu Pro Leu Pro Leu Leu Gln Ser Leu
    130                 135                 140

Met Tyr Gln Ile Pro Gln Pro Val Pro Gln Thr Pro Met Ile Pro Pro
145                 150                 155                 160

Gln Ser Leu Leu Ser Leu Ser Gln Phe Lys Val Leu Pro Val Pro Gln
                165                 170                 175

Gln Met Val Pro Tyr Pro Gln Arg Ala Met Pro Val Gln Ala Val Leu
            180                 185                 190

Pro Phe Gln Glu Pro Val Pro Asp Pro Val Arg Gly Leu His Pro Val
        195                 200                 205

Pro Gln Pro Leu Val Pro Val Ile Ala
    210                 215

<210> SEQ ID NO 39
<211> LENGTH: 226
<212> TYPE: PRT
<213> ORGANISM: Homo sapiens
<220> FEATURE:
<221> NAME/KEY: SIGNAL
<222> LOCATION: (1)..(15)

<400> SEQUENCE: 39

Met Lys Val Leu Ile Leu Ala Cys Leu Val Ala Leu Ala Leu Ala Arg
1               5                   10                  15

Glu Thr Ile Glu Ser Leu Ser Ser Ser Glu Glu Ser Ile Thr Glu Tyr
            20                  25                  30

Lys Gln Lys Val Glu Lys Val Lys His Glu Asp Gln Gln Gln Gly Glu
        35                  40                  45
```

```
Asp Glu His Gln Asp Lys Ile Tyr Pro Ser Phe Gln Pro Gln Pro Leu
                50                  55                  60

Ile Tyr Pro Phe Val Glu Pro Ile Pro Tyr Gly Phe Leu Pro Gln Asn
 65                  70                  75                  80

Ile Leu Pro Leu Ala Gln Pro Ala Val Val Leu Pro Val Pro Gln Pro
                    85                  90                  95

Glu Ile Met Glu Val Pro Lys Ala Lys Asp Thr Val Tyr Thr Lys Gly
                100                 105                 110

Arg Val Met Pro Val Leu Lys Ser Pro Thr Ile Pro Phe Phe Asp Pro
                115                 120                 125

Gln Ile Pro Lys Leu Thr Asp Leu Glu Asn Leu His Leu Pro Leu Pro
                130                 135                 140

Leu Leu Gln Pro Leu Met Gln Gln Val Pro Gln Pro Ile Pro Gln Thr
145                 150                 155                 160

Leu Ala Leu Pro Pro Gln Pro Leu Trp Ser Val Pro Gln Pro Lys Val
                165                 170                 175

Leu Pro Ile Pro Gln Gln Val Val Pro Tyr Pro Gln Arg Ala Val Pro
                180                 185                 190

Val Gln Ala Leu Leu Leu Asn Gln Glu Leu Leu Leu Asn Pro Thr His
                195                 200                 205

Gln Ile Tyr Pro Val Thr Gln Pro Leu Ala Pro Val His Asn Pro Ile
210                 215                 220

Ser Val
225

<210> SEQ ID NO 40
<211> LENGTH: 211
<212> TYPE: PRT
<213> ORGANISM: Homo sapiens

<400> SEQUENCE: 40

Arg Glu Thr Ile Glu Ser Leu Ser Ser Ser Glu Glu Ser Ile Thr Glu
 1               5                  10                  15

Tyr Lys Gln Lys Val Glu Lys Val Lys His Glu Asp Gln Gln Gln Gly
                20                  25                  30

Glu Asp Glu His Gln Asp Lys Ile Tyr Pro Ser Phe Gln Pro Gln Pro
                35                  40                  45

Leu Ile Tyr Pro Phe Val Glu Pro Ile Pro Tyr Gly Phe Leu Pro Gln
 50                  55                  60

Asn Ile Leu Pro Leu Ala Gln Pro Ala Val Val Leu Pro Val Pro Gln
 65                  70                  75                  80

Pro Glu Ile Met Glu Val Pro Lys Ala Lys Asp Thr Val Tyr Thr Lys
                85                  90                  95

Gly Arg Val Met Pro Val Leu Lys Ser Pro Thr Ile Pro Phe Phe Asp
                100                 105                 110

Pro Gln Ile Pro Lys Leu Thr Asp Leu Glu Asn Leu His Leu Pro Leu
                115                 120                 125

Pro Leu Leu Gln Pro Leu Met Gln Gln Val Pro Gln Pro Ile Pro Gln
130                 135                 140

Thr Leu Ala Leu Pro Pro Gln Pro Leu Trp Ser Val Pro Gln Pro Lys
145                 150                 155                 160

Val Leu Pro Ile Pro Gln Gln Val Val Pro Tyr Pro Gln Arg Ala Val
                165                 170                 175

Pro Val Gln Ala Leu Leu Leu Asn Gln Glu Leu Leu Leu Asn Pro Thr
```

```
              180                 185                 190
His Gln Ile Tyr Pro Val Thr Gln Pro Leu Ala Pro Val His Asn Pro
        195                 200                 205

Ile Ser Val
    210
```